United States Patent
Yasui

(10) Patent No.: US 8,139,463 B2
(45) Date of Patent: Mar. 20, 2012

(54) OBJECTIVE LENS, OPTICAL PICKUP, AND OPTICAL DISC APPARATUS

(75) Inventor: Toshifumi Yasui, Tokyo (JP)

(73) Assignee: Sony Corporation, Tokyo (JP)

( * ) Notice: Subject to any disclaimer, the term of this patent is extended or adjusted under 35 U.S.C. 154(b) by 83 days.

(21) Appl. No.: 12/797,733

(22) Filed: Jun. 10, 2010

(65) Prior Publication Data

US 2010/0322059 A1 Dec. 23, 2010

(30) Foreign Application Priority Data

Jun. 18, 2009 (JP) ................... 2009-145725
Aug. 25, 2009 (JP) ................... 2009-194748

(51) Int. Cl.
*G11B 7/00* (2006.01)

(52) U.S. Cl. ......... 369/112.03; 369/112.07; 369/112.12; 369/112.23; 359/558

(58) Field of Classification Search ............. 369/112.03, 369/112.07, 112.12, 112.23; 359/558
See application file for complete search history.

(56) References Cited

U.S. PATENT DOCUMENTS

| | | | | |
|---|---|---|---|---|
| 6,088,322 A * | 7/2000 | Broome et al. | ........... | 369/112.26 |
| 6,118,594 A * | 9/2000 | Maruyama | ................... | 359/719 |
| 7,038,862 B2 * | 5/2006 | Maruyama et al. | ........... | 359/719 |
| 7,411,743 B2 * | 8/2008 | Sugi | .............................. | 359/719 |
| 7,430,159 B2 * | 9/2008 | Koreeda et al. | ........... | 369/112.08 |
| 7,623,434 B2 * | 11/2009 | Kimura et al. | ........... | 369/112.08 |
| 7,738,345 B2 * | 6/2010 | Koreeda et al. | .......... | 369/112.06 |
| 7,742,370 B2 * | 6/2010 | Koreeda et al. | ............ | 369/44.23 |
| 2003/0185134 A1 * | 10/2003 | Kimura et al. | ........... | 369/112.08 |
| 2005/0190679 A1 * | 9/2005 | Mimori | .................... | 369/112.05 |

FOREIGN PATENT DOCUMENTS

| | | |
|---|---|---|
| JP | 2004-265573 | 9/2004 |
| JP | 2009-076163 | 4/2009 |

* cited by examiner

*Primary Examiner* — Wayne Young
*Assistant Examiner* — Brenda Bernardi
(74) *Attorney, Agent, or Firm* — Wolf, Greenfield & Sacks, P.C.

(57) ABSTRACT

Provided is an objective lens for selectively focusing each of light beams having three wavelengths $\lambda 1$, $\lambda 2$, and $\lambda 3$ on a signal recording surface of a corresponding optical disc, the wavelengths $\lambda 1$, $\lambda 2$, and $\lambda 3$ satisfying at least a relationship $\lambda 1 < \lambda 2 < \lambda 3$, the objective lens including a diffraction section disposed on an entry-side surface thereof, the diffraction section including a first region disposed in an innermost radius portion, a second region disposed outside the first region, and a third region disposed outside the second region, the first to third regions being formed so that an aperture of the light beams are appropriately limited, the first region including a staircase-like diffractive structure having a certain number of levels configured so that diffracted light of a predetermined order has the highest diffraction efficiency and optical-path-difference phase amounts for the levels of the diffractive structure has a certain relationship.

12 Claims, 34 Drawing Sheets

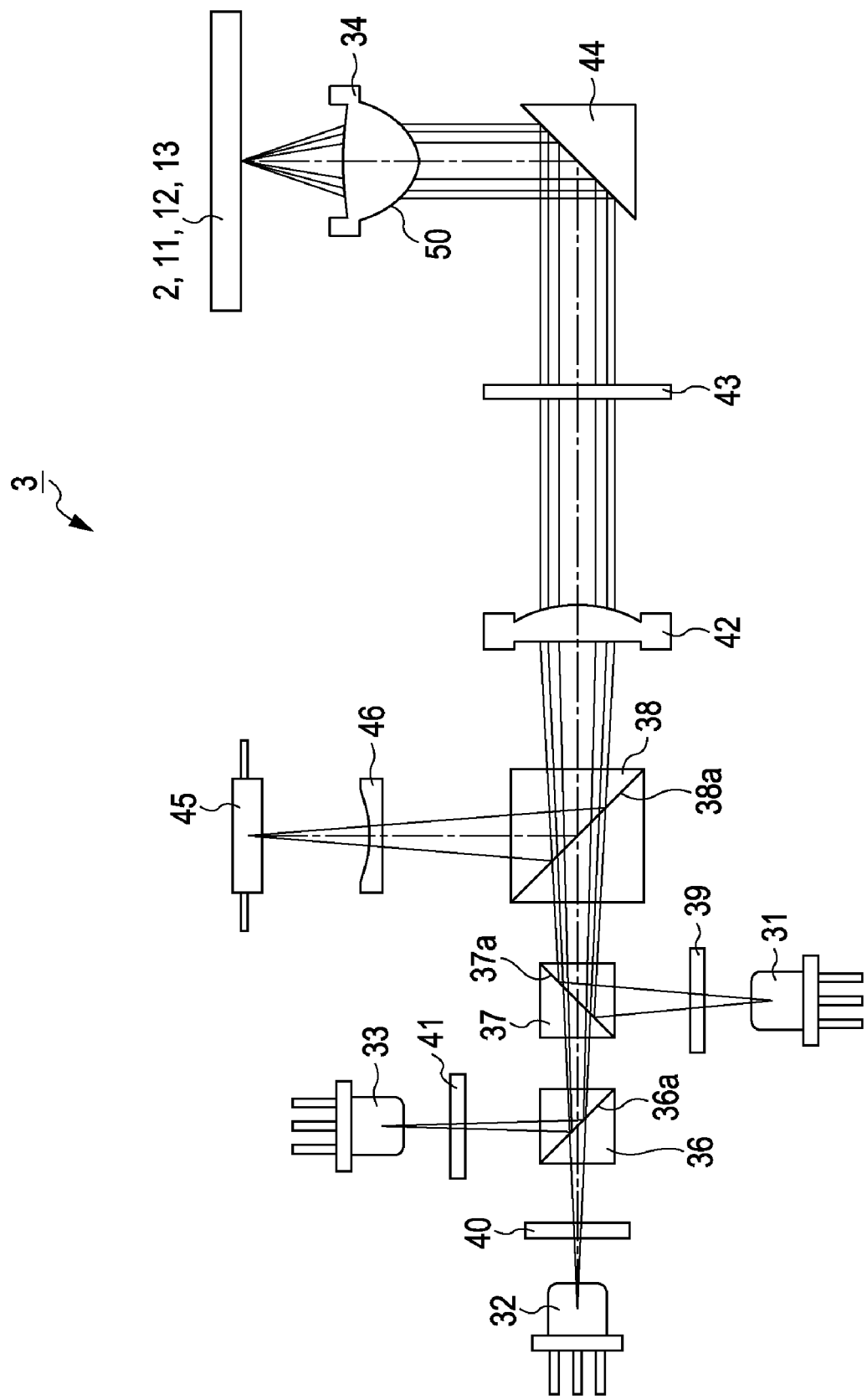

(+1-ORDER DIFFRACTED LIGHT)

(−2-ORDER DIFFRACTED LIGHT)

(−3-ORDER DIFFRACTED LIGHT)

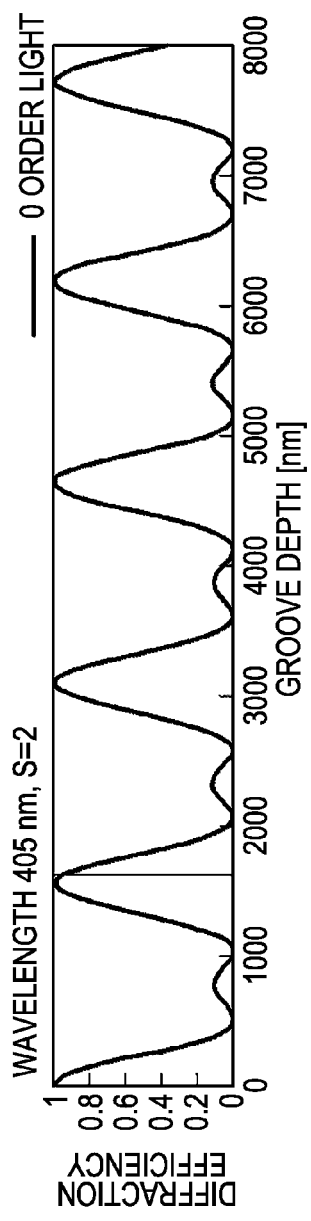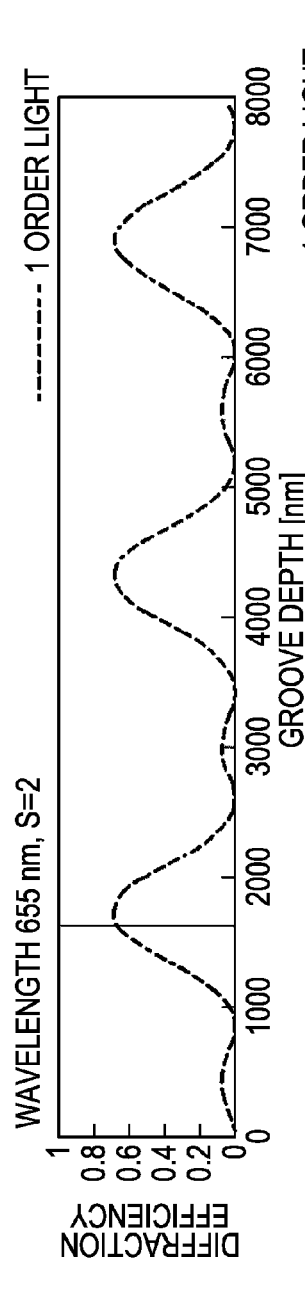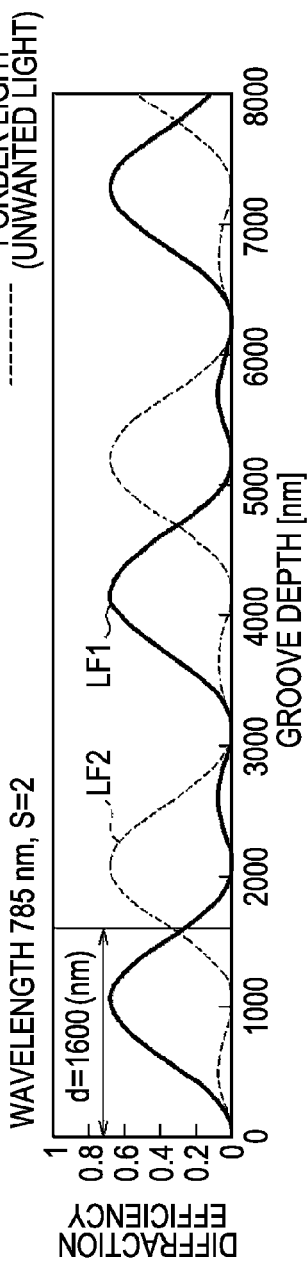
FIG. 11A
FIG. 11B
FIG. 11C

FIG. 18
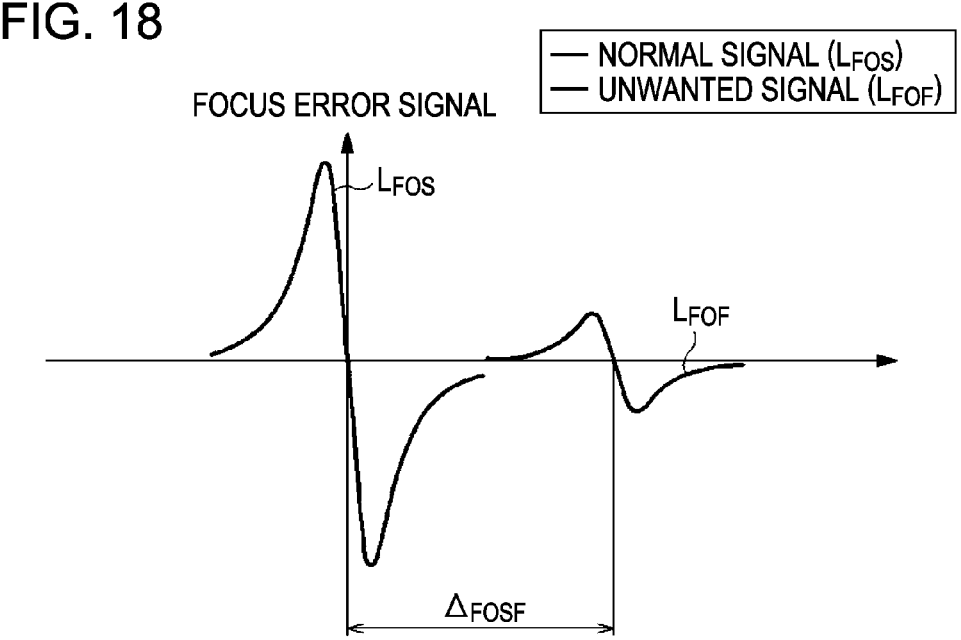
FIG. 19
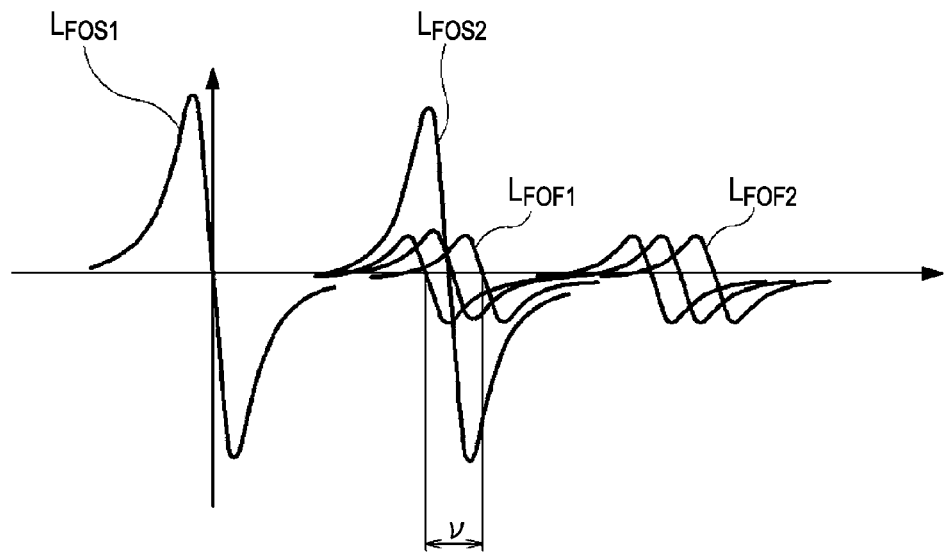

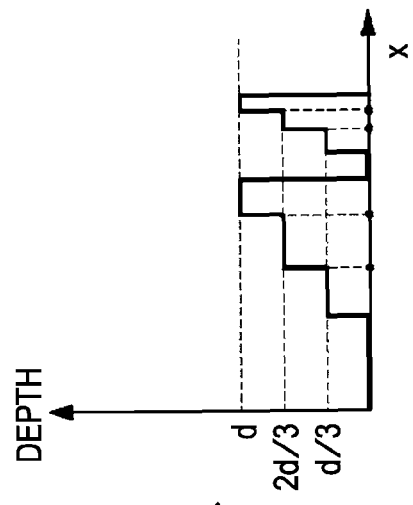
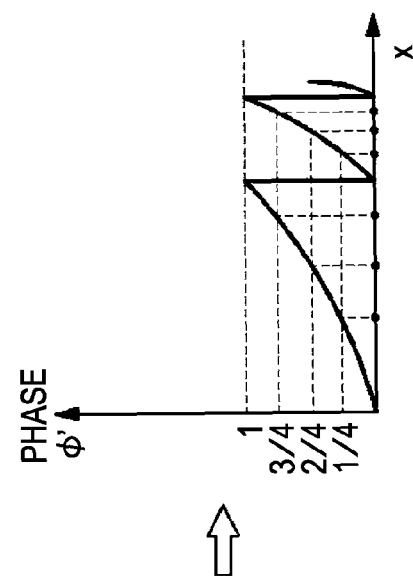
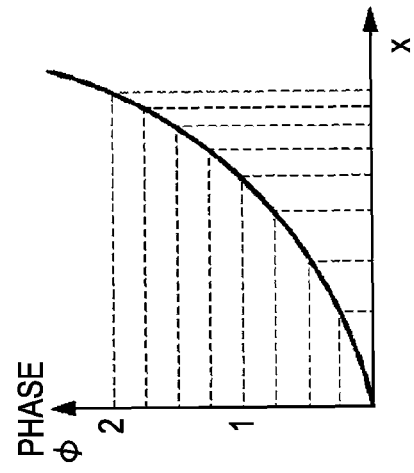
FIG. 32A
FIG. 32B
FIG. 32C

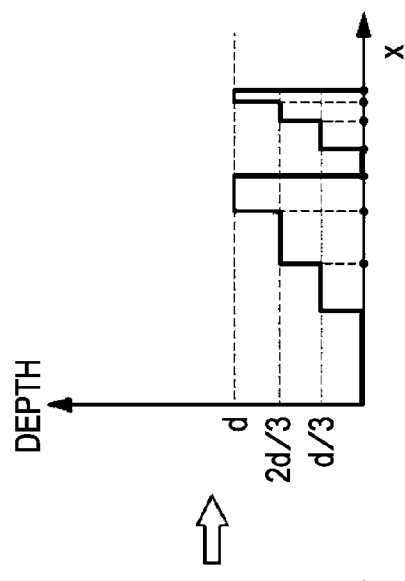
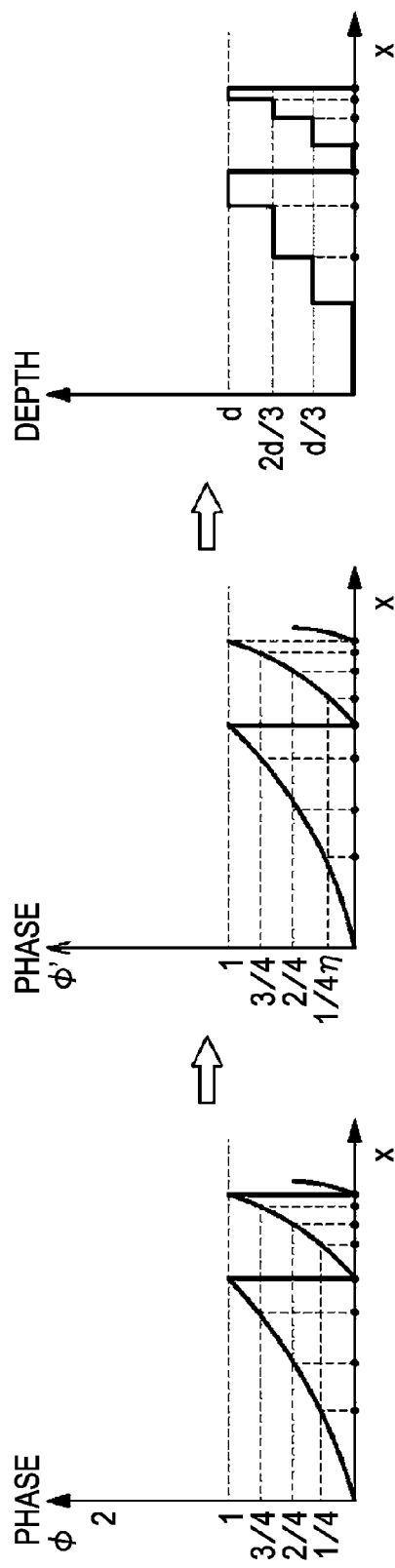

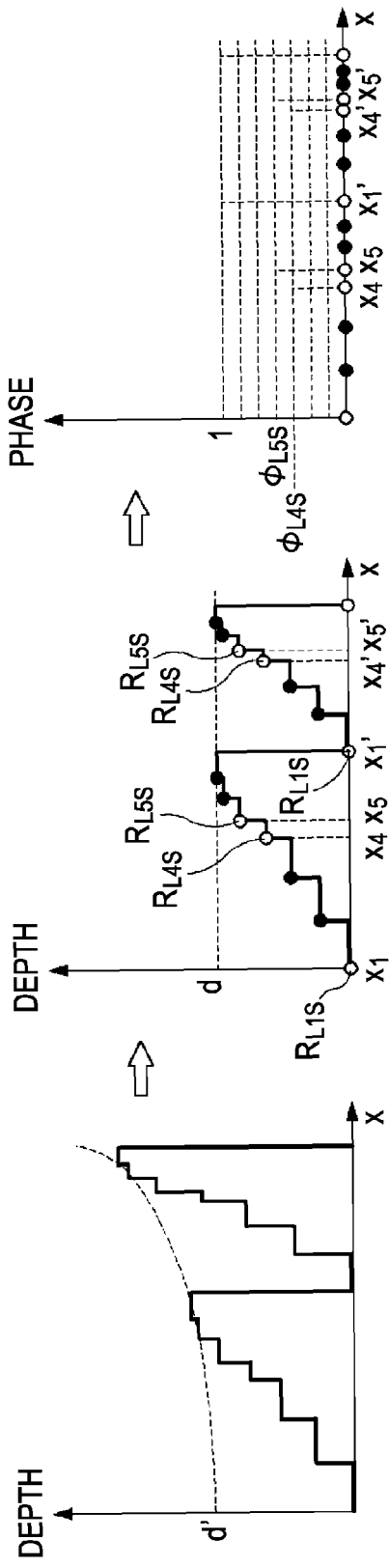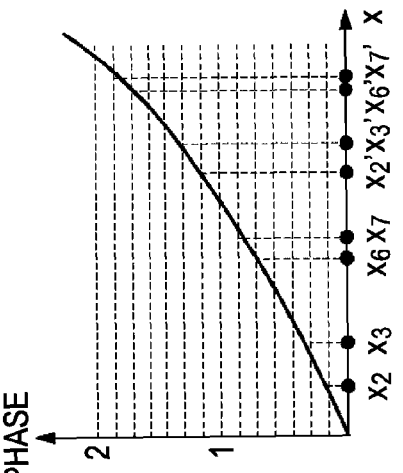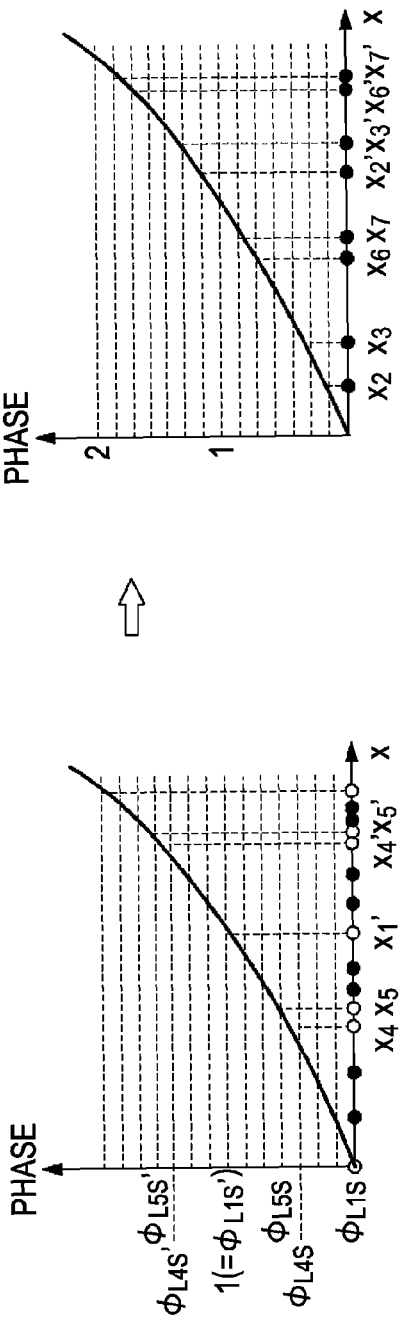

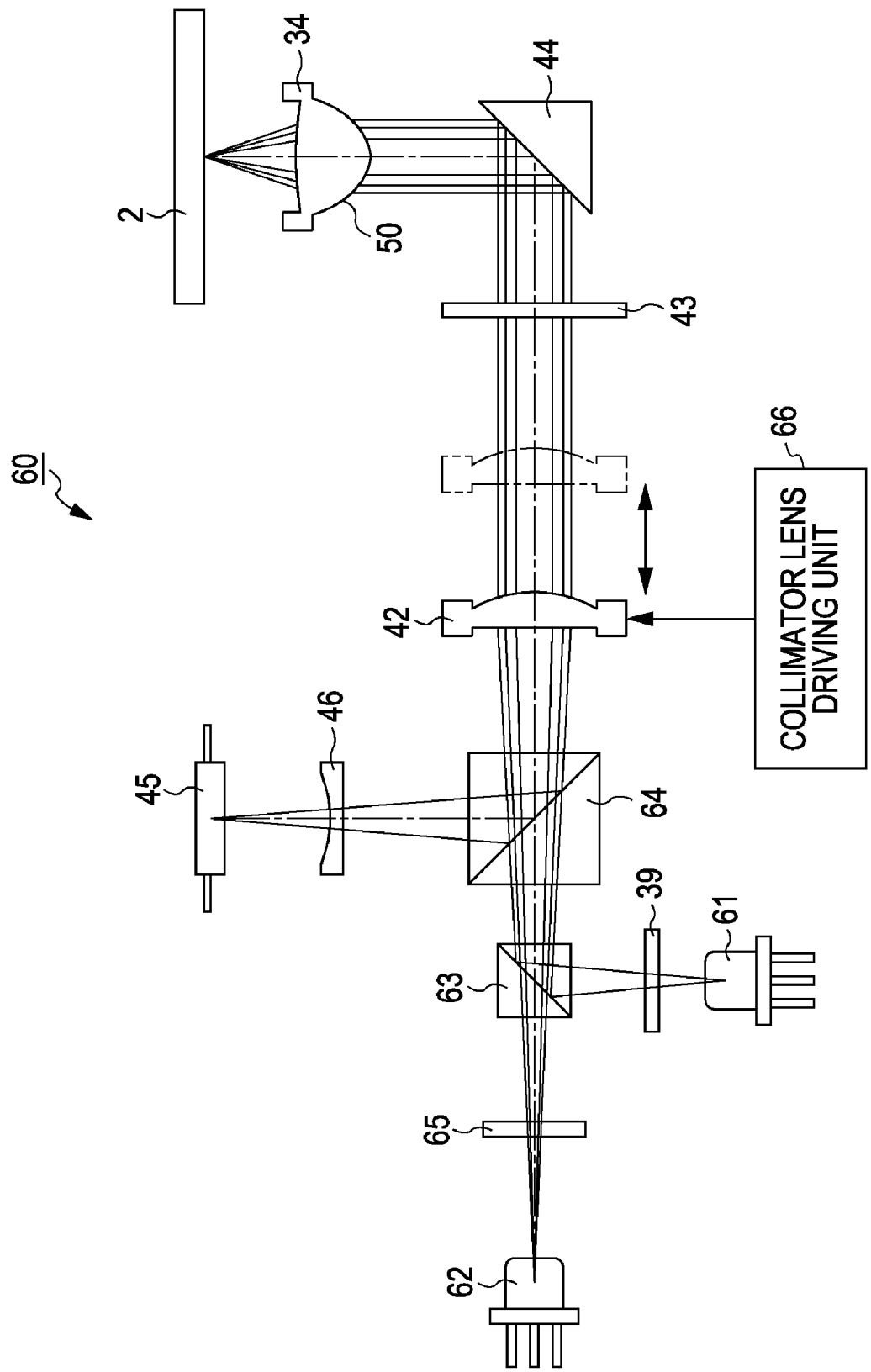

OBJECTIVE LENS, OPTICAL PICKUP, AND OPTICAL DISC APPARATUS

BACKGROUND OF THE INVENTION

1. Field of the Invention

The present invention relates to an objective lens used in an optical pickup for recording information signals to and/or reproducing information signals from three different types of optical discs. The present invention also relates to an optical disc apparatus including the optical pickup.

2. Description of the Related Art

In recent years, an optical disc in a next-generation optical disc format that allows high-density recording and reproduction of signals using a light beam having a wavelength of about 405 nm emitted from a blue-violet semiconductor laser has been proposed (hereinafter referred to as a "high-density-recording optical disc"). Such a high-density-recording optical disc has a thin cover layer for protecting a signal recording layer. The cover layer has a thickness of, for example, 0.1 mm.

When producing an optical pickup for such a high-density-recording optical disc, it is desirable that the optical pickup be compatible with existing optical discs. That is, it is desirable that the optical pickup be compatible with existing optical discs in different formats such as the compact disc (CD) format using a wavelength of about 785 nm and the digital versatile disc (DVD) format using a wavelength of about 655 nm. Thus, it is desirable that the optical pickup and an optical disc apparatus including the optical pickup be compatible with optical discs in different formats having different disc structures and adapted to different laser specifications.

An existing method for recording information signals to and reproducing information signals from the optical discs in three different formats uses two types of objective lenses. To be specific, an optical pickup using the method includes two types of objective lenses and optical systems, one for DVDs and CDs and the other for high-density-recording optical discs. The optical pickup switches between the objective lenses in accordance with the used wavelength.

However, because the optical pickup has two objective lenses, each of the objective lenses may not be mounted on a lens holder of an actuator at an appropriate angle. Therefore, the angles between the objective lens and the optical disc may not be optimal, so that the quality of a reproduced signal may be reduced. The optical pickup has a large number of components because it is necessary to provide optical components to the optical paths of two optical systems. Therefore, the production cost and the size of the optical pickup increase. Moreover, the weight of the actuator increases because it is necessary to mount two objective lenses to the actuator for driving the objective lenses. Therefore, the sensitivity of the optical pickup is reduced.

To address such problems and to simplify the optical components, optical pickups including a single objective lens compatible with a plurality of types of optical discs and compatible with three used wavelengths are being developed. The basic idea behind using a single objective lens for three wavelengths is to provide a diffraction section on the optical path and diffract light with the diffraction section in a divergent direction or in a convergent direction, so as to correct spherical aberration generated in accordance with a combination of a wavelength and a medium.

However, such optical pickups that have been developed, which use a single objective lens to achieve three-wavelength compatibility, do not take into account an increase in unwanted diffracted light generated by a diffractive structure, which is caused by variations in temperature and wavelength. The problem is that, because the unwanted light forms an image on a light-receiving element in the same manner as the normal light, a signal from another layer leaks into a focus servo signal and thereby focus servo control is not stably performed in particular when reproducing information signals from a double-layer optical disc (Japanese Unexamined Patent Application Publication No. 2004-265573).

SUMMARY OF THE INVENTION

It is desirable to provide an objective lens, an optical pickup including the objective lens, and an optical disc apparatus including the optical pickup, the objective lens being capable of performing, with a simple structure, recording of information signals to and/or reproduction of information signals from three types of optical discs using different wavelengths, by focusing a light beam on the optical disc, and thereby achieving excellent recording and reproducing characteristics irrespective of variation in temperature and variation in wavelength.

According to an embodiment of the present invention, there is provided an objective lens for selectively focusing each of light beams having three wavelengths $\lambda 1$, $\lambda 2$, and $\lambda 3$ on a signal recording surface of a corresponding optical disc, the wavelengths $\lambda 1$, $\lambda 2$, and $\lambda 3$ satisfying at least a relationship $\lambda 1 < \lambda 2 < \lambda 3$, the objective lens including a diffraction section disposed on an entry-side surface of the objective lens, the diffraction section including a predetermined diffractive structure, the diffraction section including a first region for diffracting a light beam, the first region being disposed in an innermost radius portion, the first region including a diffractive structure that is a staircase-like structure having $(N_1 - 1)$ steps and $N_1$ levels, a second region for diffracting a light beam, the second region being disposed outside the first region, and a third region disposed outside the second region, wherein the first to third regions are formed so that an aperture of the light beam having the wavelength $\lambda 1$ is limited to a diameter corresponding to the first to third regions, an aperture of the light beam having the wavelength $\lambda 2$ is limited to a diameter corresponding to the first and second regions, and an aperture of the light beam having the wavelength $\lambda 3$ is limited to a diameter corresponding to the first region, and wherein the objective lens satisfies $|\phi_{i2}| < |\phi_i(x_2)|$ or $|\phi_{iN1}| > |\phi_i(x_{N1})|$ when $k1im - k1is > 0$, satisfies $|\phi_{i2}| > |\phi_i(x_2)|$ or $|\phi_{iN1}| < |\phi_i(x_{N1})|$ when $k1im - k1is < 0$, and satisfies one of relational expressions $n_{d1}|(1/P_{1m}) - (1/P_{1s})| \geq 27$ μm, $n_{d1}|(1/P_{1m}) - (1/P_{1s})| < 18$ μm, $n_{d2}|(1/P_{2m}) - (1/P_{2s})| \geq 61$ μm, and $n_{d2}|(1/P_{2m}) - (1/P_{2s})| \leq 35$ μm, where, assuming that a positive diffraction order means that an incident light beam is diffracted toward an optical axis, $k1im$, $k2im$, and $k3im$ respectively are orders having highest diffraction efficiencies for the first region for the wavelength $\lambda 1$, $\lambda 2$, and $\lambda 3$, $k1is$, $k2is$, and $k3is$ are respectively orders of unwanted diffracted light adjacent to $k1im$, $k2im$, and $k3im$ and having a higher diffraction efficiency between orders adjacent to $k1im$, $k2im$, and $k3im$, $P_{1m}$, $P_{2m}$, $P_{1s}$, and $P_{2s}$ respectively are total lens powers applied to light beams of the orders $k1im$, $k2im$, $k1is$, and $k2is$ with a diffractive power of the diffraction section and refractive powers of the entry-side surface and an exit-side surface of the objective lens, and $n_{d1}$ and $n_{d2}$ respectively are refractive indices of an optical disc for the wavelength $\lambda 1$ and $\lambda 2$, where $\phi_i(X) = C_1 X^2 + C_2 X^4 + C_3 X^6 + C_4 X^8 + C_5 X^{10}$ is an approximated relational expression representing an optical-path-difference phase amount for a radial position X, the approximated relational expression being calculated by adding back an integer multiple of a phase for each of a plurality of periods of the staircase-like structure to an optical-pathdifference phase amount for the wavelength λ1 owing to the diffractive structure in the first region and by connecting estimated phase amounts for starting point positions of levels in each period excluding a second level and an $N_1$-th level, and where $\phi_{i2}$ and $\phi_{iN1}$ respectively are the optical-path-difference phase amounts for the starting point positions of the second level and the $N_1$-th level, and $\phi_i(x_2)$ and $\phi_i(x_{N1})$ respectively are calculated using the approximated relational expression for a radial position $x_2$ of the starting point of the second level and a radial position $x_{N1}$ of the starting point of the $N_1$-th level.

According to an embodiment of the present invention, there is provided an objective lens for selectively focusing each of light beams having three wavelengths λ1, λ2, and λ3 on a signal recording surface of a corresponding optical disc, the wavelengths λ1, λ2, and λ3 satisfying at least a relationship λ1<λ2<λ3, the objective lens including a diffraction section disposed on an entry-side surface of the objective lens, the diffraction section including a predetermined diffractive structure, the diffraction section including a first region for diffracting a light beam, the first region being disposed in an innermost radius portion, the first region including a diffractive structure that is a staircase-like structure having ($N_1-1$) steps and $N_1$ levels, a second region for diffracting a light beam, the second region being disposed outside the first region, and a third region disposed outside the second region, wherein the first to third regions are formed so that an aperture of the light beam having the wavelength λ1 is limited to a diameter corresponding to the first to third regions, an aperture of the light beam having the wavelength λ2 is limited to a diameter corresponding to the first and second regions, and an aperture of the light beam having the wavelength λ3 is limited to a diameter corresponding to the first region, and wherein the objective lens satisfies $|\phi_{i2}|<|\phi_i(x_2)|$ or $|\phi_{iN1}|>|\phi_i(x_{N1})|$ when k1$im$−k1$is$>0 and satisfies $|\phi_{i2}|>|\phi_i(x_2)|$ or $|\phi_{iN1}|<|\phi_i(x_{N1})|$ when k1$im$−k1$is$<0, where, assuming that a positive diffraction order means that an incident light beam is diffracted toward an optical axis, k1$im$, k2$im$, and k3$im$ respectively are orders having highest diffraction efficiencies for the first region for the wavelength λ1, λ2, and λ3, and k1$is$, k2$is$, and k3$is$ are respectively orders of unwanted diffracted light adjacent to k1$im$, k2$im$, and k3$im$ and having a higher diffraction efficiency between orders adjacent to k1$im$, k2$im$, and k3$im$, where $\phi_i(X)=C_1X^2+C_2X^4+C_3X^6+C_4X^8+C_5X^{10}$ is an approximated relational expression for representing an optical-path-difference phase amount for a radial position X, the approximated relational expression being calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each period excluding a second level and an $N_1$-th level, and where $\phi_{i2}$ and $\phi_{iN1}$ respectively are the optical-path-difference phase amounts for the starting point positions of the second level and the $N_1$-th level, and $\phi_i(x_2)$ and $\phi_i(x_{N1})$ respectively are calculated using the approximated relational expression for a radial position $x_2$ of the starting point of the second level and a radial position $x_{N1}$ of the starting point of the $N_1$-th level.

According to an embodiment of the present invention, there is provided an objective lens for selectively focusing each of light beams having three wavelengths λ1, λ2, and λ3 on a signal recording surface of a corresponding optical disc, the wavelengths λ1, λ2, and λ3 satisfying at least a relationship λ1<λ2<λ3, the objective lens including a diffraction section disposed on an entry-side surface of the objective lens, the diffraction section including a predetermined diffractive structure, the diffraction section including a first region for diffracting a light beam, the first region being disposed in an innermost radius portion, a second region for diffracting a light beam, the second region being disposed outside the first region, and a third region disposed outside the second region, wherein the first to third regions are formed so that an aperture of the light beam having the wavelength λ1 is limited to a diameter corresponding to the first to third regions, an aperture of the light beam having the wavelength λ2 is limited to a diameter corresponding to the first and second regions, and an aperture of the light beam having the wavelength λ3 is limited to a diameter corresponding to the first region, and wherein the objective lens satisfies one of relational expressions $n_{d1}|(1/P_{1m})-(1/P_{1s})|\geq 27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|\leq 35$ μm, where, assuming that a positive diffraction order means that an incident light beam is diffracted toward an optical axis, k1$im$, k2$im$, and k3$im$ respectively are orders having highest diffraction efficiencies for the first region for the wavelength λ1, λ2, and λ3, k1$is$, k2$is$, and k3$is$ are respectively orders of unwanted diffracted light adjacent to k1$im$, k2$im$, and k3$im$ and having a higher diffraction efficiency between orders adjacent to k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelength λ1 and λ2.

According to an embodiment of the present invention, there is provided an optical pickup including an objective lens that light beams enter, the light beams having three wavelengths satisfying at least a relationship λ1<λ2<λ3; and a diffraction section disposed on a surface of an optical element disposed on optical paths of the light beams having the three wavelengths λ1, λ2, and λ3 or on a surface of the objective lens, the diffraction section selectively focusing each of the light beams having the three wavelengths λ1, λ2, and λ3 on a signal recording surface of a corresponding optical disc using the objective lens, the diffraction section including a first region for diffracting a light beam, the first region being disposed in an innermost radius portion, the first region including a diffractive structure that is a staircase-like structure having ($N_1-1$) steps and $N_1$ levels, a second region for diffracting a light beam, the second region being disposed outside the first region, and a third region disposed outside the second region, wherein the first to third regions are formed so that an aperture of the light beam having the wavelength λ1 is limited to a diameter corresponding to the first to third regions, an aperture of the light beam having the wavelength λ2 is limited to a diameter corresponding to the first and second regions, and an aperture of the light beam having the wavelength λ3 is limited to a diameter corresponding to the first region, and wherein the optical pickup satisfies $|\phi_{i2}|<|\phi_i(x_2)|$ or $|\phi_{iN1}|>|\phi_i(x_{N1})|$ when k1$im$−k1$is$>0, satisfies $|\phi_{i2}|>|\phi_i(x_2)|$ or $|\phi_{iN1}|<|\phi_i(x_{N1})|$ when k1$im$−k1$is$<0, and satisfies one of relational expressions $n_{d1}|(1/P_{1m})-(1/P_{1s})|\geq 27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|35$ μm, where, assuming that a positive diffraction order means that an incident light beam is diffracted toward an optical axis, k1$im$, k2$im$, and k3$im$ respectively are orders having highest diffraction efficiencies for the first region for the wavelength λ1, λ2, and λ3, k1$is$, k2$is$, and k3$is$ are respectively orders of unwanted diffracted light adjacent to k1$im$, k2$im$, and k3$im$ and having a higher diffraction efficiency between orders adjacent to k1$im$, k2$im$, and k3$im$, $P_{1m}$, $P_{2m}$, $P_{1s}$, and $P_{2s}$ respectively are total lens powers applied to light beams of the orders k1*im*, k2*im*, k1*is*, and k2*is* with a diffractive power of the diffraction section and refractive powers of the entry-side surface and an exit-side surface of the objective lens, and $n_{d1}$ and $n_{d2}$ respectively are refractive indices of an optical disc for the wavelength λ1 and λ2, where $\phi_i(X)=C_1X^2+C_2X^4+C_3X^6+C_4X^8+C_5X^{10}$ is an approximated relational expression representing an optical-path-difference phase amount for a radial position X, the approximated relational expression being calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each period excluding a second level and an $N_1$-th level, and where $\phi_{i2}$ and $\phi_{iN1}$ respectively are the optical-path-difference phase amounts for the starting point positions of the second level and the $N_1$-th level, and $\phi_i(x_2)$ and $\phi_i(x_{N1})$ respectively are calculated using the approximated relational expression for a radial position $x_2$ of the starting point of the second level and a radial position $x_{N1}$ of the starting point of the $N_1$-th level.

According to an embodiment of the present invention, there is provided an optical pickup including an objective lens that light beams enter, the light beams having three wavelengths satisfying at least a relationship λ1<λ2<λ3; and a diffraction section disposed on a surface of an optical element disposed on optical paths of the light beams having the three wavelengths λ1, λ2, and λ3 or on a surface of the objective lens, the diffraction section selectively focusing each of the light beams having the three wavelengths λ1, λ2, and λ3 on a signal recording surface of a corresponding optical disc using the objective lens, the diffraction section including a first region for diffracting a light beam, the first region being disposed in an innermost radius portion, the first region including a diffractive structure that is a staircase-like structure having ($N_1$-1) steps and $N_1$ levels, a second region for diffracting a light beam, the second region being disposed outside the first region, and a third region disposed outside the second region, wherein the first to third regions are formed so that an aperture of the light beam having the wavelength λ1 is limited to a diameter corresponding to the first to third regions, an aperture of the light beam having the wavelength λ2 is limited to a diameter corresponding to the first and second regions, and an aperture of the light beam having the wavelength λ3 is limited to a diameter corresponding to the first region, and wherein the optical pickup satisfies $|\phi_{i2}|<|\phi_i(x_2)|$ or $|\phi_{iN1}|>|\phi_i(x_{N1})|$ when k1*im*−k1*is*>0 and satisfies $|\phi_{i2}|>|\phi_i(x_2)|$ or $|\phi_{iN1}|<|\phi_i(x_{N1})|$ when k1*im*−k1*is*<0, where, assuming that a positive diffraction order means that an incident light beam is diffracted toward an optical axis, k1*im*, k2*im*, and k3*im* respectively are orders having highest diffraction efficiencies for the first region for the wavelength λ1, λ2, and λ3, and k1*is*, k2*is*, and k3*is* are respectively orders of unwanted diffracted light adjacent to k1*im*, k2*im*, and k3*im* and having a higher diffraction efficiency between orders adjacent to k1*im*, k2*im*, and k3*im*, where $\phi_i(X)=C_2X^2+C_2X^4+C_3X^6+C_4X^8+C_5X^{10}$ is an approximated relational expression representing an optical-path-difference phase amount for a radial position X, the approximated relational expression being calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each period excluding a second level and an $N_1$-th level, and where $\phi_{i2}$ and $\phi_{iN1}$ respectively are the optical-path-difference phase amounts for the starting point positions of the second level and the $N_1$-th level, and $\phi_i(x_2)$ and $\phi_i(x_{N1})$ respectively are calculated using the approximated relational expression for a radial position $x_2$ of the starting point of the second level and a radial position $x_{N1}$ of the starting point of the $N_1$-th level.

According to an embodiment of the present invention, there is provided an optical pickup including an objective lens that light beams enter, the light beams having three wavelengths satisfying at least a relationship λ1<λ2<λ3; and a diffraction section disposed on a surface of an optical element disposed on optical paths of the light beams having the three wavelengths λ1, λ2, and λ3 or on a surface of the objective lens, the diffraction section selectively focusing each of the light beams having the three wavelengths λ1, λ2, and λ3 on a signal recording surface of a corresponding optical disc using the objective lens, the diffraction section including a first region for diffracting a light beam, the first region being disposed in an innermost radius portion, a second region for diffracting a light beam, the second region being disposed outside the first region, and a third region disposed outside the second region, wherein the first to third regions are formed so that an aperture of the light beam having the wavelength λ1 is limited to a diameter corresponding to the first to third regions, an aperture of the light beam having the wavelength λ2 is limited to a diameter corresponding to the first and second regions, and an aperture of the light beam having the wavelength λ3 is limited to a diameter corresponding to the first region, and wherein the optical pickup satisfies one of relational expressions $n_{d1}|(1/P_{1m})-(1/P_{1s})|\geq 27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|\leq 35$ μm, where, assuming that a positive diffraction order means that an incident light beam is diffracted toward an optical axis, k1*im*, k2*im*, and k3*im* respectively are orders having highest diffraction efficiencies for the first region for the wavelength λ1, λ2, and λ3, k1*is*, k2*is*, and k3*is* are respectively orders of unwanted diffracted light adjacent to k1*im*, k2*im*, and k3*im* and having a higher diffraction efficiency between orders adjacent to k1*im*, k2*im*, and k3*im*, $P_{1m}$, $P_{2m}$, $P_{1s}$, and $P_{2s}$ respectively are total lens powers applied to light beams of the orders k1*im*, k2*im*, k1*is*, and k2*is* with a diffractive power of the diffraction section and refractive powers of the entry-side surface and an exit-side surface of the objective lens, and $n_{d1}$ and $n_{d2}$ respectively are refractive indices of an optical disc for the wavelength λ1 and λ2.

According to an embodiment of the present invention, there is provided an optical disc apparatus including the optical pickup for recording an information signal to and/or reproducing an information signal from an optical disc of one of a plurality of types, the optical disc being rotated, by selectively irradiating the optical disc with a corresponding one of a plurality of light beams having different wavelengths.

With the embodiments of the present invention, the diffraction section enables the single optical lens to appropriately focus a corresponding light beam on the signal recording surface of each of three types of optical discs. Moreover, servo control is prevented from becoming unstable owing to increase in the unwanted diffracted light generated by the diffractive section caused by variations in temperature and wavelength. Thus, recording and reproduction characteristics are prevented from deteriorating, whereby excellent recording and reproduction characteristics can be realized.

BRIEF DESCRIPTION OF THE DRAWINGS

FIG. 2 is a diagram illustrating the optical path in an optical system of the optical pickup according to the embodiment of the present invention;

FIGS. 3A to 3C are diagrams illustrating the function of a diffraction section included in the optical pickup illustrated in FIG. 2 and illustrating the function a diffractive optical element and the function of the objective lens having a refractive function, using an example in which a diffractive section is disposed on the diffractive optical element that is different from the objective lens, in which FIG. 3A illustrates, for example, +1-order diffracted light of a light beam having a first wavelength generated toward the first optical disc, FIG. 3B illustrates, for example, −2-order diffracted light of a light beam having a second wavelength generated toward the second optical disc, and FIG. 3C illustrates −3-order diffracted light of a light beam having a third wavelength generated toward the third optical disc.

FIGS. 4A and 4B illustrate an example of an objective lens included in the optical pickup illustrated in FIG. 2 and having a continuous aspheric surface in the outer annular zone thereof, in which FIG. 4A is a plan view of the objective lens and FIG. 4B is a sectional view of the objective lens;

FIGS. 5A and 5B illustrate another example of an objective lens included in the optical pickup illustrated in FIG. 2 and having a diffractive region in the outer annular zone thereof, in which FIG. 5A is a plan view of the objective lens and FIG. 5B is a sectional view of the objective lens;

FIGS. 6A and 6B illustrate an example of a focusing optical device included in the optical pickup illustrated in FIG. 2, which is a modification corresponding to FIGS. 4A and 4B, in which FIG. 6A is a side view of the focusing optical device including an objective lens having an entry-side surface on which a diffraction section is integrally formed and FIG. 6B is a side view of the focusing optical device including an objective lens and a diffractive optical element having a diffraction section on an entry-side surface thereof;

FIGS. 7A and 7B illustrate an example of a focusing optical device included in the optical pickup illustrated in FIG. 2, which is a modification corresponding to FIGS. 5A and 5B, in which FIG. 7A is a side view of the focusing optical device including an objective lens having an entry-side surface on which a diffraction section is integrally formed and FIG. 7B is a side view of the focusing optical device including an objective lens and a diffractive optical element having a diffraction section on an entry-side surface thereof;

FIGS. 8A and 8B illustrate the structure of a diffraction section formed on a surface of the objective lens illustrated in FIGS. 4A to 5B, in which FIG. 8A is a sectional view illustrating the shape of a first region, which is a diffractive region formed in an inner annular zone of the diffractive section, with respect to a reference surface, and FIG. 8B is a sectional view of a diffractive structure of an example compared with the inner annular zone illustrated in FIG. 8A;

FIGS. 10A and 10B illustrate the structure of a diffraction section formed on a surface of the objective lenses illustrated in FIGS. 4A to 5B, in which FIG. 10A is a sectional view illustrating the shape of a second region, which is a diffractive region formed in a middle annular zone of the diffractive section, with respect to a reference surface, and FIG. 10B is a sectional view illustrating the shape of a third region, which is a diffractive region formed in an outer annular zone of the diffractive section illustrated in FIG. 5B, with respect to a reference surface;

FIGS. 11A to 11C are graphs used for calculating the diffraction efficiencies for an example diffractive structure of the middle annular zone, illustrating the change in the diffraction efficiency for the light beams having the first to third wavelengths with respect to the groove depth d of the diffractive structure when S=2 and (k1$m$, k2$m$, k3$m$, k3$m$')=(0, −1, +1, −1);

FIG. 18 is a graph illustrating the influence of variations in the efficiency of unwanted diffracted light, which is caused by variations in environmental conditions, on a focus error signal, in which a focus search waveform (for a single layer) is illustrated;

FIG. 19 is a graph illustrating the influence of variations in the efficiency of unwanted diffracted light, which is caused by variations in environmental conditions, on a focus error signal, in which focus search waveforms (for double layers) are illustrated;

FIGS. 20A and 20B are graphs illustrating the relationship between the distance Δreal between the focal positions of the normal light and unwanted diffracted light and the value Δcalc obtained by simulating the distance, in which FIG. 20A is a graph illustrating Δreal and Δcalc for the first wavelength λ1 and the range of the interlayer thickness for BD format, and FIG. 20B is a graph illustrating Δreal and Δcalc for the second wavelength λ2 and the range of the interlayer thickness for DVD format;

FIGS. 21A and 21B are graphs illustrating the cause of difference between the distance Δreal between the focal position of the normal light and the unwanted diffracted light and the value Δcalc obtained by simulating the distance, in which FIG. 21A illustrates the longitudinal aberration when the coefficient C1 used for estimating Δcalc is considered, and FIG. 21B illustrates the longitudinal aberration when the coefficients C1 and C2 that have an influence on Δreal are considered;

Figure 24A:
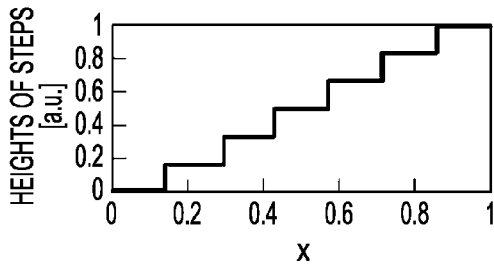
Figure 24E:
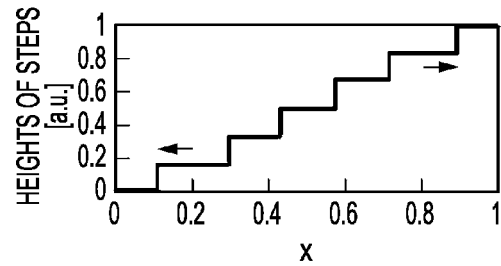
Figure 24B:
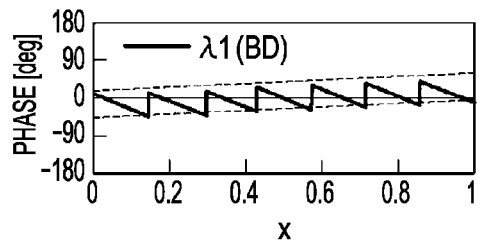
Figure 24F:
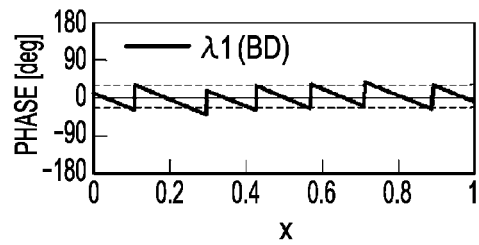
Figure 24C:
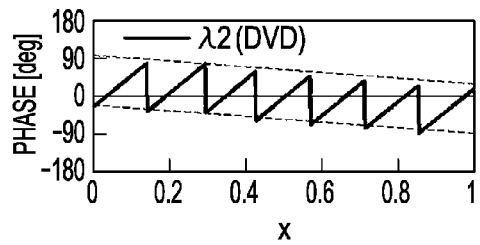
Figure 24G:
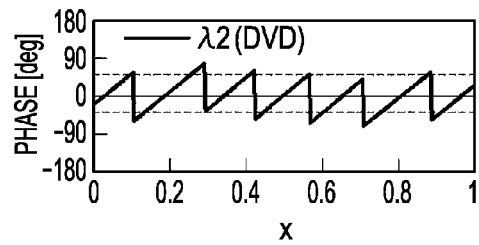
Figure 24D:
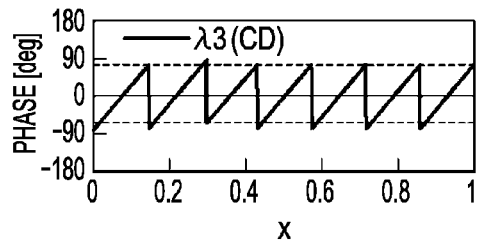
Figure 25:
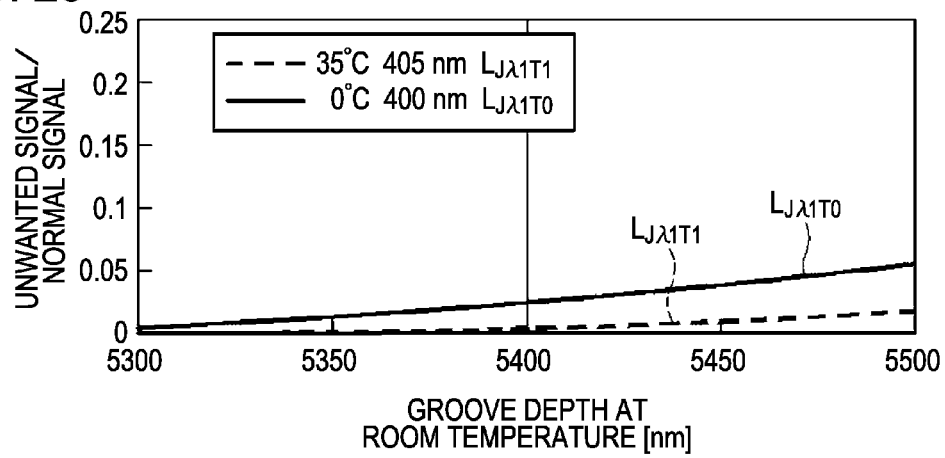
Figure 26:
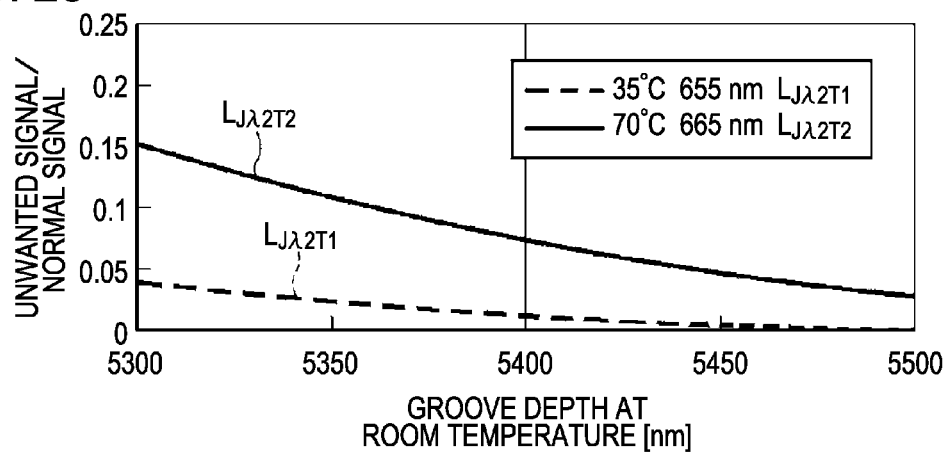
Figure 27:
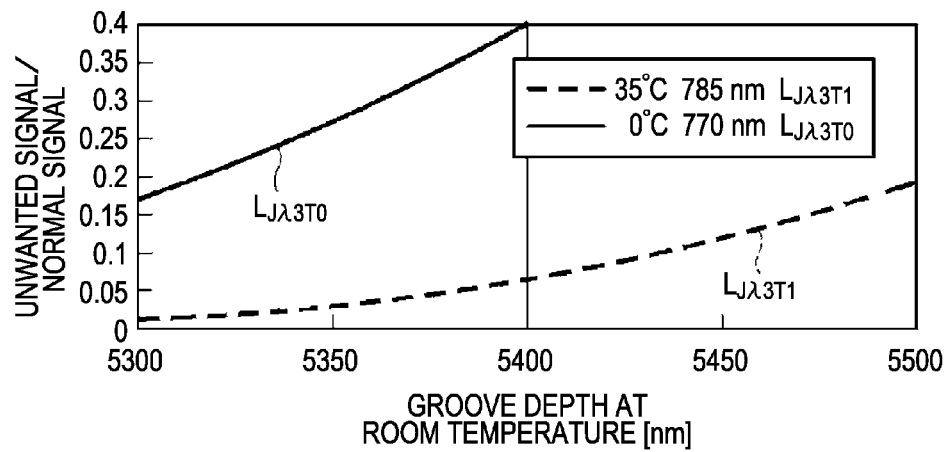
Figure 28A:
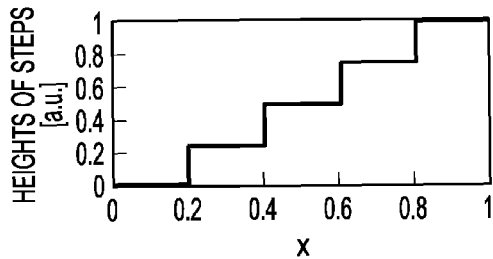
Figure 28E:
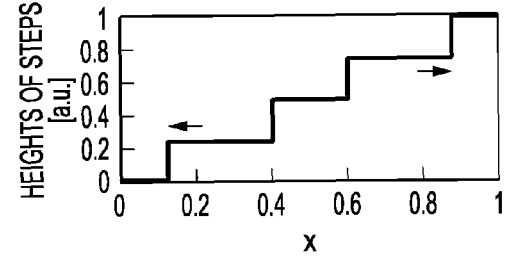
Figure 28B:
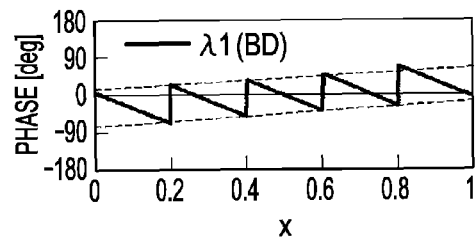
Figure 28F:
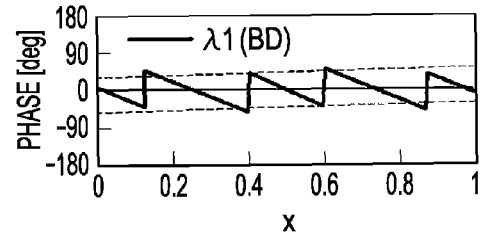
Figure 28C:
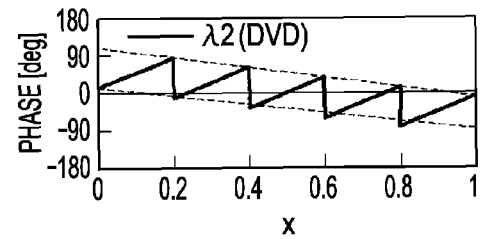
Figure 28G:
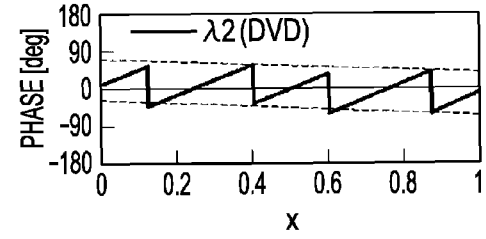
Figure 28D:
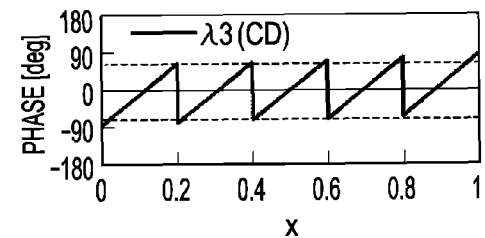
Figure 28H:
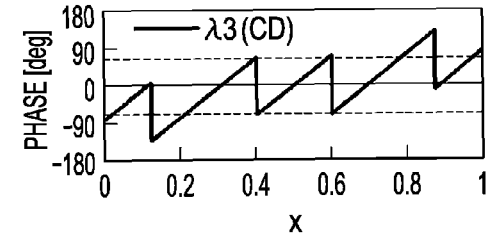
Figure 29A:
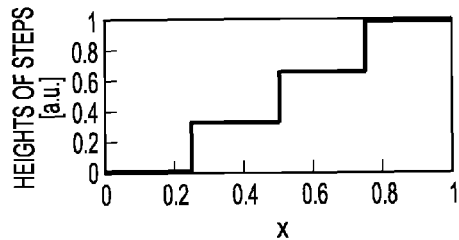
Figure 29E:
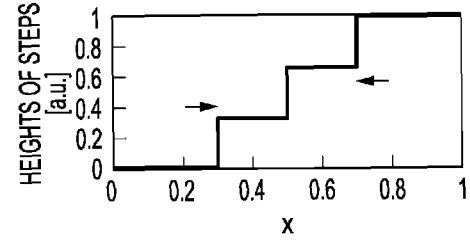
Figure 29B:
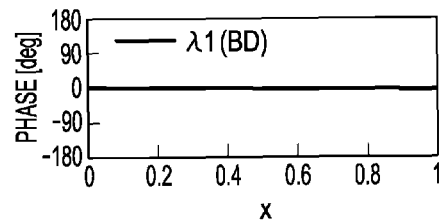
Figure 29F:
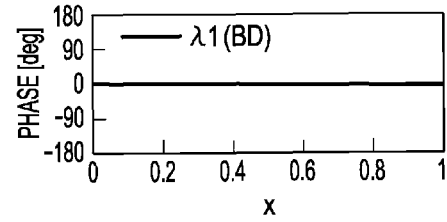
Figure 29C:
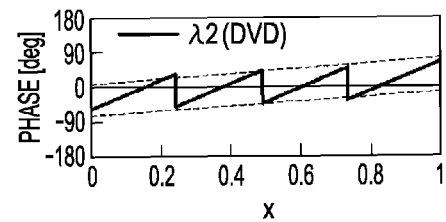
Figure 29G:
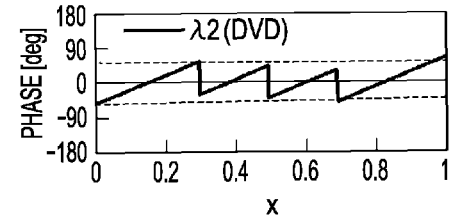
Figure 29D:
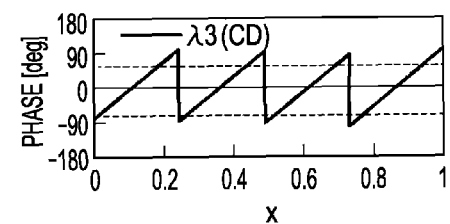
Figure 29H:
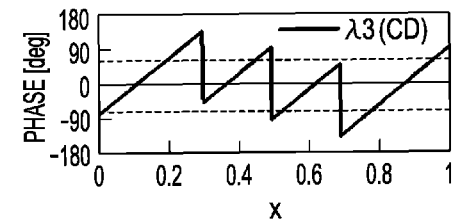
Figure 30A:
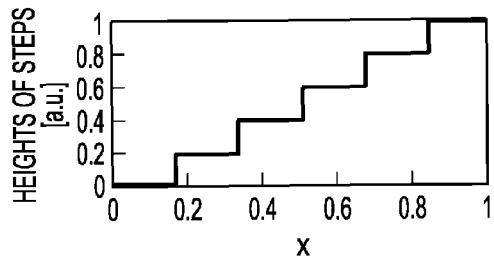
Figure 30E:
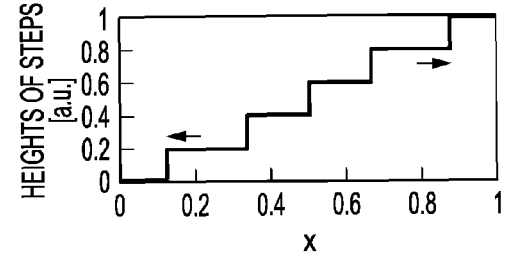
Figure 30B:
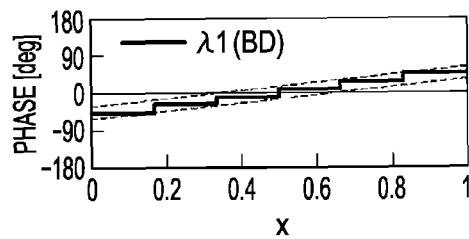
Figure 30F:
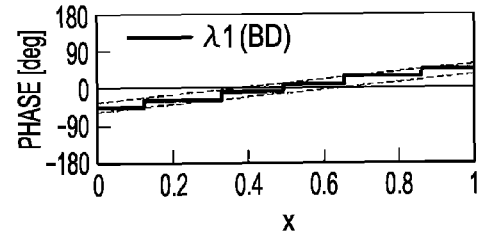
Figure 30C:
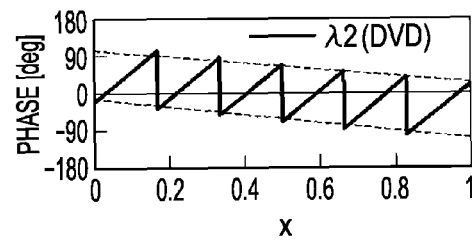
Figure 30G:
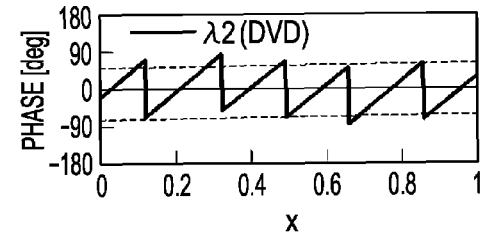
Figure 30D:
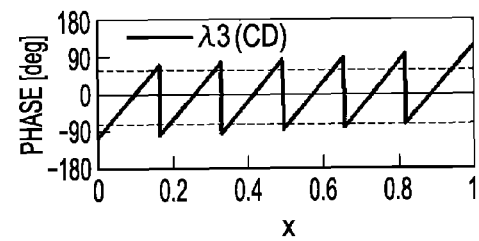
Figure 30H:
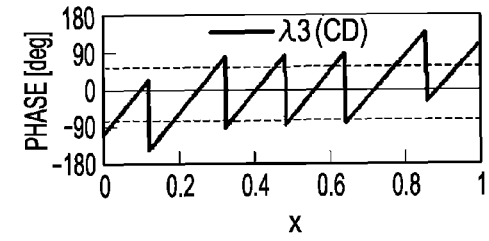
Figure 31A:
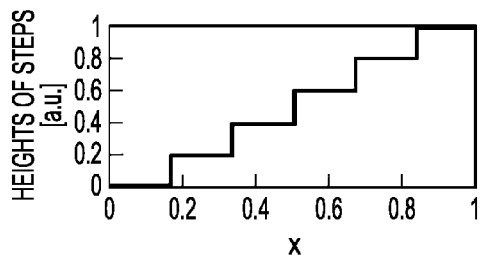
Figure 31E:
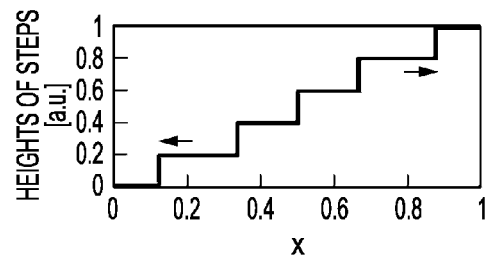
Figure 31B:
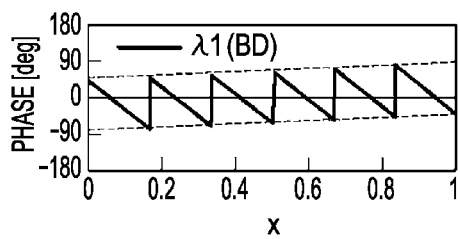
Figure 31F:
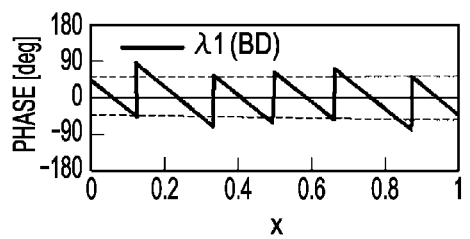
Figure 31C:
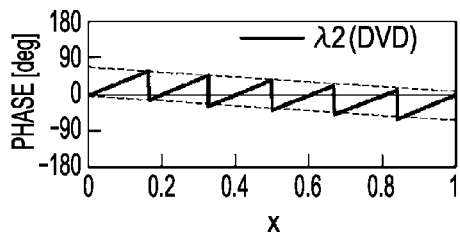
Figure 31G:
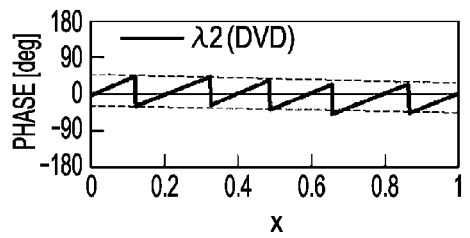
Figure 31D:
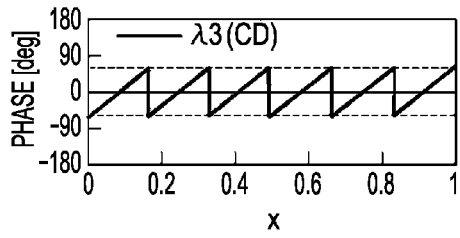
Figure 31H:
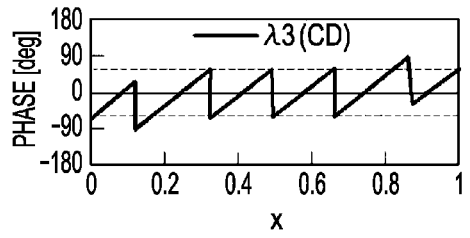
Figure 35:
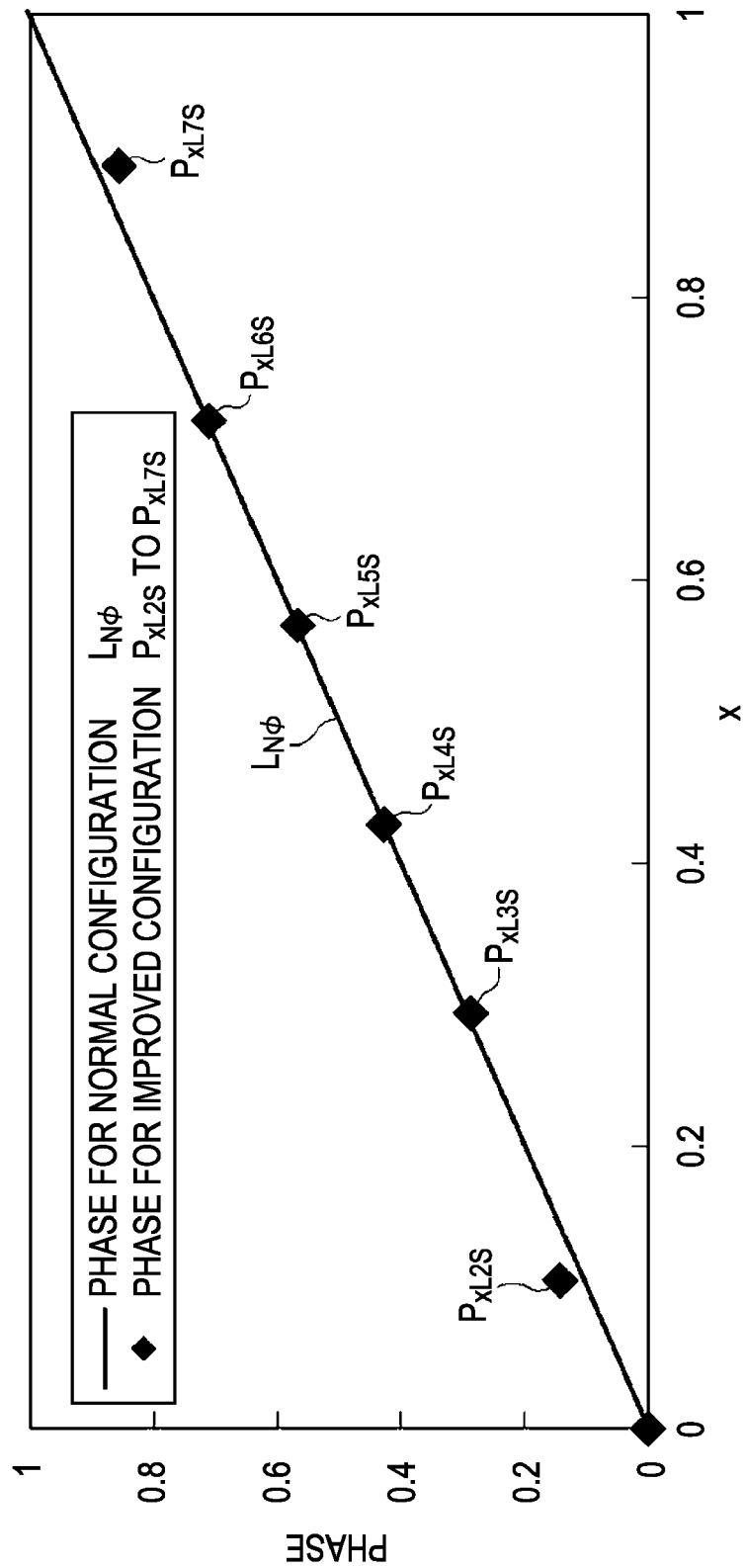
Figure 36A:
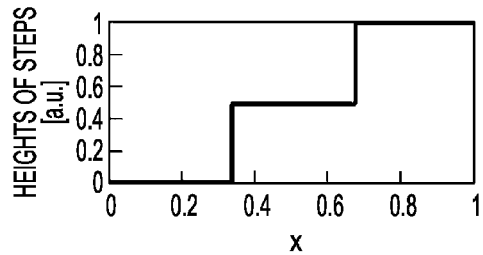
Figure 36D:
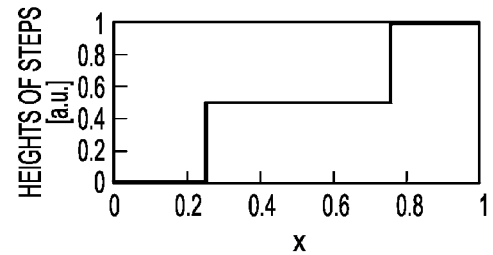
Figure 36B:
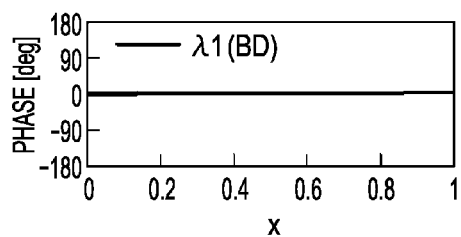
Figure 36E:
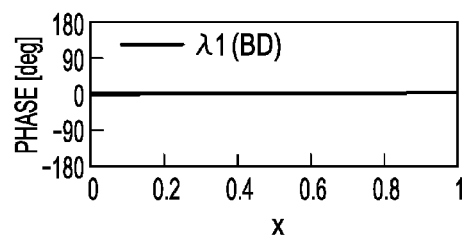
Figure 36C:
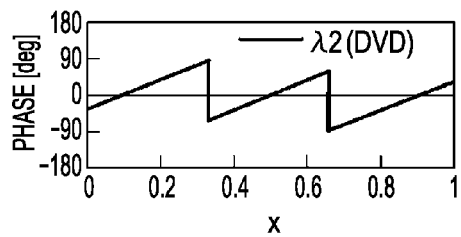
Figure 36F:
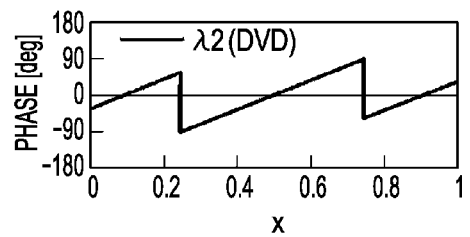
Figure 37A:
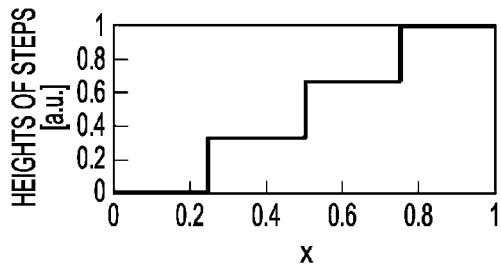
Figure 37D:
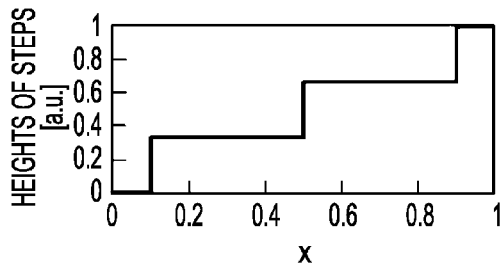
Figure 37B:
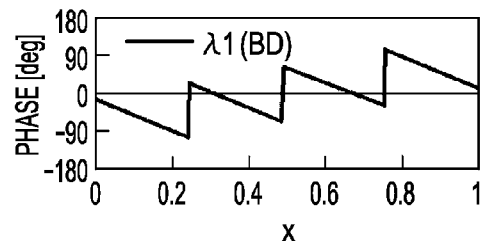
Figure 37E:
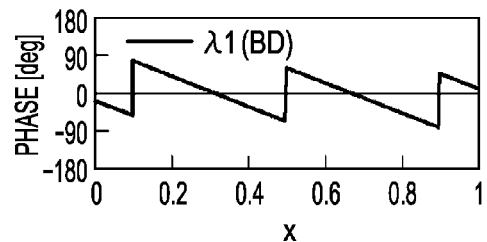
Figure 37C:
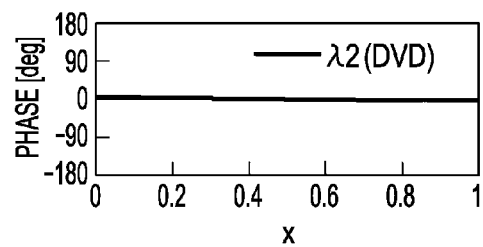
Figure 37F:
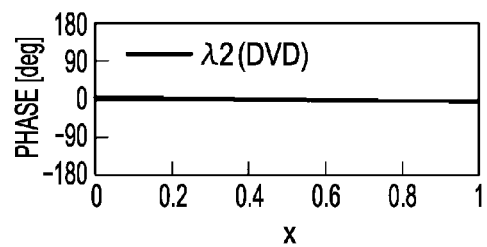

FIG. λ3 is a graph illustrating the change in the unwanted signal/normal signal ratio for the second optical disc (DVD) with respect to the change in the groove depth of a diffractive structure having an equal-step-width staircase-like shape;

FIGS. 24A to 24H are graphs illustrating a technique for reducing the amount of unwanted signals by changing the shape of the diffractive structure using an example when (k1$i$, k2$i$, k3$i$)=(1, −2, −3), in which FIG. 24A illustrates the relationship between the radial position and the grid height for one period of the diffractive structure having an equal-step-width staircase-like shape having six steps and seven levels, which is a normal configuration before being modified, FIGS. 24B to 24D respectively illustrate the phase amount applied by the normal configuration (illustrated in FIG. 24A) to the diffracted light of a selected order for the first to third wavelengths λ1, λ2, and λ3, FIG. 24E illustrates the relationship between the radial position and the grid height for one period of the diffractive structure having an improved configuration modified from the normal configuration illustrated in FIG. 24A, and FIGS. 24F to 24H respectively illustrate the phase amount applied by the improved configuration (illustrated in FIG. 24E) to the diffracted light of a selected order for the first to third wavelength λ1, λ2, and λ3;

FIG. 25 is a graph illustrating the change in the unwanted signal/normal signal ratio for the first optical disc (BD) with respect to the change in the groove depth of the diffractive structure having the improved configuration;

FIG. 26 is a graph illustrating the change in the unwanted signal/normal signal ratio for the second optical disc (DVD) with respect to the change in the groove depth of the diffractive structure having the improved configuration;

FIG. 27 is a graph illustrating the change in the unwanted signal/normal signal ratio for the third optical disc (CD) with respect to the change in the groove depth of the diffractive structure having the improved configuration;

FIGS. 28A to 28H are graphs illustrating a technique for reducing the amount of unwanted signals by changing the shape of the diffractive structure using an example when (k1$i$, k2$i$, k3$i$)=(1, −1, −2), in which FIG. 28A illustrates the relationship between the radial position and the grid height for one period of the diffractive structure having an equal-step-width staircase-like shape having four steps and five levels, which is a normal configuration before being modified, FIGS. 28B to 28D respectively illustrate the phase amount applied by the normal configuration (illustrated in FIG. 28A) to the diffracted light of a selected order for the first to third wavelengths λ1, λ2, and λ3, FIG. 28E illustrates the relationship between the radial position and the grid height for one period of the diffractive structure having an improved configuration modified from the normal configuration illustrated in FIG. 28A, and FIGS. 28F to 28H respectively illustrate the phase amount applied by the improved configuration (illustrated in FIG. 28E) to the diffracted light of a selected order for the first to third wavelength λ1, λ2, and λ3;

FIGS. 29A to 29H are graphs illustrating a technique for reducing the amount of unwanted signals by changing the shape of the diffractive structure using an example when (k1$i$, k2$i$, k3$i$)=(0, −1, −2), in which FIG. 29A illustrates the relationship between the radial position and the grid height for one period of the diffractive structure having an equal-step-width staircase-like shape having three steps and four levels, which is a normal configuration before being modified, FIGS. 29B to 29D respectively illustrate the phase amount applied by the normal configuration (illustrated in FIG. 29A) to the diffracted light of a selected order for the first to third wavelengths λ1, λ2, and λ3, FIG. 29E illustrates the relationship between the radial position and the grid height for one period of the diffractive structure having an improved configuration modified from the normal configuration illustrated in FIG. 29A, and FIGS. 29F to 29H respectively illustrate the phase amount applied by the improved configuration (illustrated in FIG. 29E) to the diffracted light of a selected order for the first to third wavelength λ1, λ2, and λ3;

FIGS. 30A to 30H are graphs illustrating a technique for reducing the amount of unwanted signals by changing the shape of the diffractive structure using an example when (k1$i$, k2$i$, k3$i$)=(0, −2, −3), in which FIG. 30A illustrates the relationship between the radial position and the grid height for one period of the diffractive structure having an equal-step-width staircase-like shape having five steps and six levels, which is a normal configuration before being modified, FIGS. 30B to 30D respectively illustrate the phase amount applied by the normal configuration (illustrated in FIG. 30A) to the diffracted light of a selected order for the first to third wavelengths λ1, λ2, and λ3, FIG. 30E illustrates the relationship between the radial position and the grid height for one period of the diffractive structure having an improved configuration modified from the normal configuration illustrated in FIG. 30A, and FIGS. 30F to 30H respectively illustrate the phase amount applied by the improved configuration (illustrated in FIG. 30E) to the diffracted light of a selected order for the first to third wavelength λ1, λ2, and λ3;

FIGS. 31A to 31H are graphs illustrating a technique for reducing the amount of unwanted signals by changing the shape of the diffractive structure using an example when (k1$i$, k2$i$, k3$i$)=(2, −1, −2), in which FIG. 31A illustrates the relationship between the radial position and the grid height for one period of the diffractive structure having an equal-step-width staircase-like shape having five steps and six levels, which is a normal configuration before being modified, FIGS. 31B to 31D respectively illustrate the phase amount applied by the normal configuration (illustrated in FIG. 31A) to the diffracted light of a selected order for the first to third wavelengths λ1, λ2, and λ3, FIG. 31E illustrates the relationship between the radial position and the grid height for one period of the diffractive structure having an improved configuration modified from the normal configuration illustrated in FIG. 31A, and FIGS. 31F to 31H respectively illustrate the phase amount applied by the improved configuration (illustrated in FIG. 31E) to the diffracted light of a selected order for the first to third wavelength λ1, λ2, and λ3;

FIGS. 32A to 32C are graphs illustrating a technique for determining the radial positions of step boundaries and the depths of the steps in the diffractive structure having the normal configuration;

FIGS. 33A to 33C are graphs illustrating a technique for determining the radial positions of step boundaries and the depths of the steps in the diffractive structure having the improved configuration;

FIGS. 34A to 34E are graphs illustrating a technique for estimating the phase from the lens shape and a technique for checking the improved configuration;

FIG. 35 is a graph comparing the phase points at the starting points of the levels of the improved configuration with those of the normal configuration;

FIGS. 36A to 36F are graphs illustrating a technique for reducing the amount of unwanted signals in the middle annular zone using a typical example when (k1m, k2m)=(0, −1), in which FIG. 36A illustrates the relationship between the radial position and the grid height for one period of the diffractive structure having two steps and three levels, which is a normal configuration, FIGS. 36B and 36C respectively illustrate the phase amount applied by the normal configuration (illustrated in FIG. 36A) to the diffracted light of a selected order for the first and second wavelengths λ1 and λ2, FIG. 36D illustrates the relationship between the radial position and the grid height for one period of the diffractive structure having an improved configuration modified from the normal configuration illustrated in FIG. 36A, and FIGS. 36E and 36F respectively illustrate the phase amount applied by the improved configuration (illustrated in FIG. 36D) to the diffracted light of a selected order for the first and second wavelengths λ1 and λ2;

FIGS. 37A to 37F are graphs illustrating a technique for reducing the amount of unwanted signals in the middle annular zone using a typical example when (k1m, k2m)=(1, 0), in which FIG. 37A illustrates the relationship between the radial position and the grid height for one period of the diffractive structure having three steps and four levels, which is a normal configuration, FIGS. 37B and 37C respectively illustrate the phase amount applied by the normal configuration (illustrated in FIG. 37A) to the diffracted light of a selected order for the first and second wavelengths λ1 and λ2, FIG. 37D illustrates the relationship between the radial position and the grid height for one period of the diffractive structure having an improved configuration modified from the normal configuration illustrated in FIG. 37A, and FIGS. 37E and 37F respectively illustrate the phase amount applied by the improved configuration (illustrated in FIG. 37D) to the diffracted light of a selected order for the first and second wavelengths λ1 and λ2; and FIG. 38 is a diagram illustrating the optical path in an optical system of an optical pickup according to another embodiment of the present invention.

DESCRIPTION OF THE PREFERRED EMBODIMENTS

Hereinafter, best modes for carrying out the invention will be described in the order of the sections listed below.
1. Overall Structure of Optical Disc Apparatus
2. Overall Structure of Optical Pickup
3. Objective Lens according to Embodiment of the Invention
4. Objective Lens according to Another Embodiment of the Invention
5. Technique for Preventing Increase in Unwanted Diffracted Light due to Variations in Temperature and Wavelength
6. Example of Diffraction Section used in Optical Pickup according to Embodiment of the Invention (modification of 3)
7. Another Example of Diffraction Section used in Optical Pickup according to Embodiment of the Invention (modification of 4)
8. Optical Pickup according to Embodiment of the Invention
9. Optical Pickup according to Another Embodiment of the Invention

[1. Overall Structure of Optical Disc Apparatus]

Hereinafter, an optical disc apparatus including an optical pickup according to an embodiment of the present invention will be described with reference to the drawings.

Figure 1:
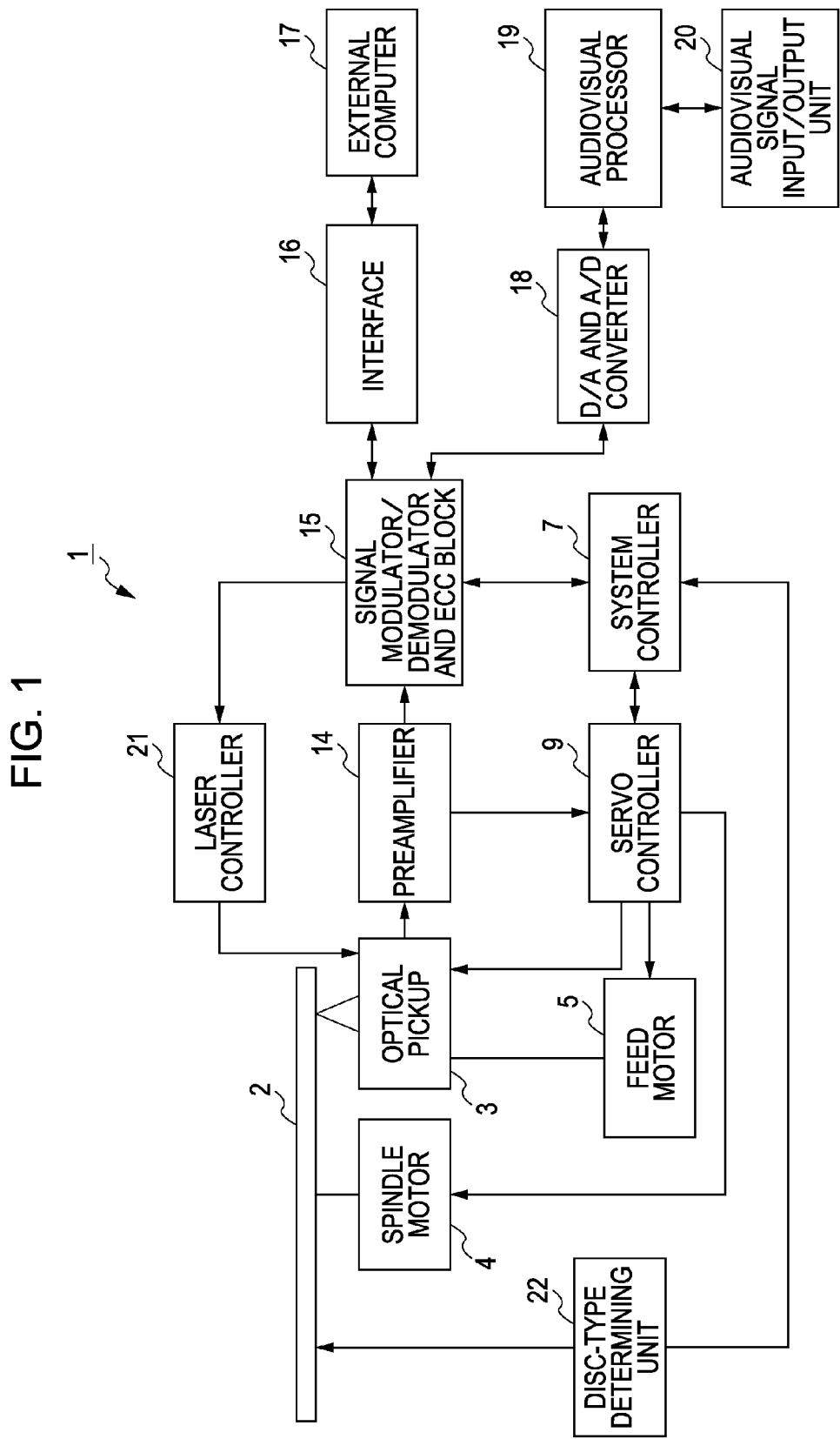
FIG. 1 is a block diagram of an optical disc apparatus according to an embodiment of the present invention.

As illustrated in FIG. 1, an optical disc apparatus 1 according to an embodiment of the present invention includes an optical pickup 3, which records information to and reproduces information from an optical disc 2, and a spindle motor 4, which serves as a driving mechanism for rotating the optical disc 2. The optical disc apparatus 1 further includes a feed motor 5, which moves the optical pickup 3 along the radius of the optical disc 2. The optical disc apparatus 1 has three-format compatibility in that the optical disc apparatus 1 can record information to and/or reproduce information from optical discs in three different formats and optical discs having recording layers.

Examples of the optical discs used here include an optical disc using a semiconductor laser having an emission wavelength of about 785 nm, such as a compact disc (CD), a CD-R (recordable), or a CD-RW (rewritable). Examples of optical discs used here include an optical disc using a semiconductor laser having an emission wavelength of about 655 nm, such as a digital versatile disc (DVD), a DVD-R (recordable), a DVD-RW (rewritable), or a DVD+RW (rewritable). Examples of optical discs used here include a high-density-recording optical disc using a semiconductor laser having a shorter emission wavelength of about 405 nm (blue-violet), such as a Blu-ray Disc (registered trademark) (BD).

In the description that follows, first to third optical discs 11, 12, and 13 in three formats are used as the optical disc 2 to which information is recorded and from which information is reproduced by the optical disc apparatus 1. The first optical disc 11 is a high-density-recording optical disc, such as a BD, including a protective layer having a first thickness of about 0.1 mm and using a light beam having a wavelength of about 405 nm for recording and reproduction. The first optical disc 11 may have a single recording layer (cover layer thickness 100 μm), double recording layers (double-layer optical disc), or a larger number of recording layers. In a double-layer optical disc, a cover layer for a recording layer L0 has a thickness of about 100 μm, and a cover layer for a recording layer L1 has a thickness of about 75 μm. The second optical disc 12 is an optical disc, such as a DVD, including a protective layer having a second thickness of about 0.6 mm and using a light beam having a wavelength of about 655 nm for recording and reproduction. The second optical disc 12 may have a plurality of recording layers. The third optical disc 13 is an optical disc, such as a CD, including a protective layer having a third thickness of about 1.1 mm and using a light beam having a wavelength of about 785 nm for recording and reproduction.

In the optical disc apparatus 1, the spindle motor 4 and the feed motor 5 are controlled by a servo controller 9 in accordance with the format of the disc, and the servo controller 9 is controlled on the basis of instruction from a system controller 7 that also serves as a disc format determining unit. The spindle motor 4 and the feed motor 5 rotates at a predetermined number of revolutions that corresponds to the first optical disc 11, the second optical disc 12, or the third optical disc 13.

The optical pickup 3, which has three-wavelength compatibility, emits light beams having different wavelengths toward recording layers of optical discs in different formats from the protective layer side, and detects light beams reflected from the recording layers. The optical pickup 3 outputs a signal that corresponds to the reflected light that has been detected.

The optical disc apparatus 1 includes a preamplifier 14 that generates a focus error signal, a tracking error signal, an RF signal, and the like on the basis of the signal output from the optical pickup 3. The optical disc apparatus 1 includes a signal modulator/demodulator and error-correcting code block (hereinafter referred to as a "signal modulator/demodulator and ECC block") 15 that demodulates a signal from the preamplifier 14 or modulates a signal from an external computer 17. The optical disc apparatus 1 includes an interface 16, a D/A and A/D converter 18, an audiovisual processor 19, and an audiovisual signal input/output unit 20.

The preamplifier 14 generates a focus error signal by using an astigmatic method or the like on the basis of an output from a photo detection unit, and generates a tracking error signal by using a three beam method, a DPD method, a DPP method, or the like. The preamplifier 14 generates an RF signal, and outputs the RF signal to the signal modulator/demodulator and ECC block 15. The preamplifier 14 outputs the focus error signal and the tracking error signal to the servo controller 9.

When recording data to the first optical disc 11, the signal modulator/demodulator and ECC block 15 performs the following processing on a digital signal that has been input from the interface 16 or the D/A and A/D converter 18. That is, when recording data to the first optical disc 11, the signal modulator/demodulator and ECC block 15 performs error correction on the input digital signal by using an error correcting method such as LDC-ECC and BIS. Next, the signal modulator/demodulator and ECC block 15 performs modulation such as 1-7 PP modulation. When recording data on the second optical disc 12, the signal modulator/demodulator and ECC block 15 performs error correction by using an error correcting method such as a product code (PC) method, and performs modulation such as 8-16 modulation. When recoding data on the third optical disc 13, the signal modulator/demodulator and ECC block 15 performs error correction by using an error correcting method such as CIRC, and performs modulation such as 8-14 modulation. The signal modulator/demodulator and ECC block 15 outputs the modulated data to a laser controller 21. When reproducing data from the optical discs, the signal modulator/demodulator and ECC block 15 performs demodulation corresponding to the modulation method used to record the data on the basis of an RF signal that is input from the preamplifier 14. The signal modulator/demodulator and ECC block 15 performs error correction on the data, and outputs the data to the interface 16 or the D/A and A/D converter 18.

In order to compress data to be recorded, a compression/decompression unit may be provided between the signal modulator/demodulator and ECC block 15 and the interface 16 or between the signal modulator/demodulator and ECC block 15 and the D/A and A/D converter 18. In this case, the data is compressed by using a method such as MPEG2 or MPEG4.

The focus error signal and the tracking error signal from the preamplifier 14 are input to the servo controller 9. The servo controller 9 generates a focus servo signal and a tracking servo signal for eliminating the focus error signal and the tracking error signal, and controls an objective lens driving mechanism, such as a two-axis actuator, on the basis of the focus servo signal and the tracking servo signal. The servo controller 9 detects a synchronization signal and the like in the output from the preamplifier 14, and servo-controls the spindle motor by using a method such as a constant linear velocity (CLV) method, a constant angular velocity (CAV) method, or a combination of these methods.

The laser controller 21 controls a laser light source of the optical pickup 3. In particular, in this embodiment, the laser controller 21 controls the laser light source so that the laser light source emits laser light with different powers in the recording mode and in the reproduction mode. The laser controller 21 controls the laser light source so that the laser light source emits laser light with different powers in accordance with the type of the optical disc 2. The laser controller 21 switches between the laser light sources in the optical pickup 3 in accordance with the type of the optical disc 2 detected by a disc-type determining unit 22.

The disc-type determining unit 22 detects a change in the amount of reflected light, the change being caused by the differences in the surface reflectivity and the shapes of the first to third optical discs 11, 12, and 13, and thereby detects the format of the optical disc 2.

The blocks constituting the optical disc apparatus 1 are structured so that, in accordance with the detection result obtained by the disc-type determining unit 22, signal processing corresponding to the specifications of the optical disc 2 that is mounted is performed.

The system controller 7 controls the entire apparatus in accordance with the format of the optical disc 2 detected by the disc-type determining unit 22. In accordance with a user input, the system controller 7 controls the blocks on the basis of address information and table of contents (TOC) information recorded in pre-mastered pits and grooves formed in the innermost radius region of the optical disc. That is, on the basis of such information, the system controller 7 specifies a recording position and a reproduction position of an optical disc at which recording and reproduction are to be performed, and controls the blocks on the basis of the positions that have been specified.

The optical disc apparatus 1 rotates the optical disc 2 with the spindle motor 4. The optical disc apparatus 1 controls the feed motor 5 in accordance with a control signal from the servo controller 9 so as to move the optical pickup 3 to a desired recording track of the optical disc 2, and records information to and reproduces information from the optical disc 2.

To be specific, when the optical disc apparatus 1 performs recording and reproduction, the servo controller 9 rotates the optical disc 2 by using a method such as the CAV method, the CLV method, or a combination of these methods. The optical pickup 3 emits a light beam from the light source and receives a returning light beam reflected from the optical disc 2 with the photodetection unit, and generates a focus error signal and a tracking error signal.

The optical pickup 3 moves the objective lens with the objective lens driving mechanism on the basis of the focus error signal and the tracking error signal so as to perform focus servo and tracking servo.

When the optical disc apparatus 1 performs recording, a signal from the external computer 17 is input to the signal modulator/demodulator and ECC block 15 through the interface 16. The signal modulator/demodulator and ECC block 15 adds a predetermined error-correcting code to a digital data that has been input from the interface 16 or the D/A and A/D converter 18, performs predetermined modulation on the data, and generates a recording signal. The laser controller 21 controls the laser light source of the optical pickup 3 on the basis of the recording signal generated by the signal modulator/demodulator and ECC block 15, and performs recording on a predetermined optical disc.

When the optical disc apparatus 1 reproduces information recorded on the optical disc 2, the signal modulator/demodulator and ECC block 15 demodulates a signal detected by the photodetection unit. If the recording signal demodulated by the signal modulator/demodulator and ECC block 15 is to be stored in a computer, the data is output to the external computer 17 through the interface 16. Thus, the external computer 17 can operate on the basis of the data recorded on the optical disc 2. If the recording signal demodulated by the signal modulator/demodulator and ECC block 15 is an audiovisual signal, the recording signal is subjected to digital-analog conversion with the D/A and A/D converter 18 and supplied to the audiovisual processor 19. Then, the recording signal is subjected to audiovisual processing with the audiovisual processor 19, and output to an external speaker and a monitor (not shown) through the audiovisual signal input/output unit 20.

The optical pickup 3 included in the optical disc apparatus 1 will be described below in detail.

[2. Overall Structure of Optical Pickup]

The optical pickup 3 according to an embodiment of the present invention, which is included in the optical disc apparatus 1, will be described. As described above, the optical pickup 3 selectively emits one of light beams having different wavelengths to an optical disc, which is selected from the first to third optical discs 11, 12, and 13 having different formats such as the thickness of the protective layer. The optical pickup 3 has three-wavelength compatibility in that the optical pickup can record information signals to and/or reproduce information signals from the three types of optical discs. Moreover, the optical pickup 3 realizes increase in light utilization efficiency, reduction of entry of unwanted light, an appropriate working distance and an appropriate focal length, and an advantage in productivity.

As illustrated in FIG. 2, the optical pickup 3 according to the embodiment of the present invention includes a first light source 31 having a first emitter for emitting a light beam having a first wavelength. The optical pickup 3 includes a second emitter having a second light source 32 for emitting a light beam having a second wavelength that is longer than the first wavelength. The optical pickup 3 includes a third emitter having a third light source 33 that emits a light beam having a third wavelength that is longer than the second wavelength. The optical pickup 3 includes an objective lens 34 that functions as a focusing optical device for focusing light beams emitted from the first to third emitters on the recording surface of the optical disc 2.

The optical pickup 3 includes a first beam splitter 36 disposed between the second and third emitters and the objective lens 34. The first beam splitter 36 functions as an optical path combining unit that combines the optical path of the light beam having the second wavelength emitted from the second emitter and the optical path of the light beam having the third wavelength emitted from the third emitter. The optical pickup 3 includes a second beam splitter 37 disposed between the first beam splitter 36 and the objective lens 34. The second beam splitter 37 functions as an optical path combining unit that combines the optical path of the light beams having the second and third wavelengths, which have been combined by the first beam splitter 36, and the optical path of the light beam having the first wavelength emitted from the first emitter. The optical pickup 3 includes a third beam splitter 38 disposed between the second beam splitter 37 and the objective lens 34. The third beam splitter 38 functions as an optical path splitting unit that splits the forward optical path of the light beams having the first to third wavelengths, which have been combined by the second beam splitter 37, from the optical path of the light beams having the first to third wavelengths reflected by the optical disc (hereinafter also referred to as a "return path").

The optical pickup 3 includes a first grating 39 disposed between the first emitter of the first light source 31 and the second beam splitter 37. The first grating 39 diffracts the light beam having the first wavelength emitted from the first emitter into three beams so that a tracking error signal and the like can be detected. The optical pickup 3 includes a second grating 40 disposed between the second emitter of the second light source 32 and the first beam splitter 36. The second grating 40 diffracts the light beam having the second wavelength emitted from the second emitter into three beams so that the tracking error signal and the like can be detected. The optical pickup 3 includes a third grating 41 disposed between the third emitter of the third light source 33 and the first beam splitter 36. The third grating 41 diffracts the light beam having the third wavelength emitted from the third emitter into three beams so that the tracking error signal and the like can be detected.

The optical pickup 3 includes a collimator lens 42 disposed between the third beam splitter 38 and the objective lens 34. The collimator lens 42 functions as a divergence angle conversion unit for changing the divergence angle of the light beams having the first to third wavelength, whose optical paths have been combined by the third beam splitter 38. The collimator lens 42 adjusts the divergence angle so that the light beams be in a substantially collimated state or in a state diffused or converged relative to a substantially collimated state, and outputs the light beams. The optical pickup 3 includes a quarter wavelength plate 43 disposed between the collimator lens 42 and the objective lens 34. The quarter wavelength plate 43 provides a phase difference of one-quarter of the wavelength to the light beams having the first to third wavelengths, whose divergence angles have been adjusted by the collimator lens 42. The optical pickup 3 includes a raising mirror 44 disposed between the objective lens 34 and the quarter wavelength plate 43. The raising mirror 44 reflects the light beam that has passed through the optical components described above in a plane substantially perpendicular to the optical axis of the objective lens 34 so as to redirect the light beam in the direction parallel to the optical axis of the objective lens 34.

The optical pickup 3 includes a photodetection unit 45 for receiving and detecting light beams having the first to third wavelengths that are on the return path, which have been split from the light beams having the first to third wavelengths on the forward path by the third beam splitter 38. The optical pickup 3 includes a multilens 46 disposed between the third beam splitter 38 and the photodetection unit 45. The multilens 46 focuses the light beams having the first to third wavelengths on the return path, which have been split by the third beam splitter 38, on the light-receiving surface of a photodetector or the like of the photodetection unit 45 and provides the light beams with astigmatism for detecting the focus error signal and the like.

The first light source 31 includes a first emitter for emitting a light beam having the first wavelength of about 405 nm toward the first optical disc 11. The second light source 32 includes a second emitter for emitting a light beam having the second wavelength of about 655 nm toward the second optical disc 12. The third light source 33 includes a third emitter for emitting a light beam having the third wavelength of about 785 nm toward the third optical disc 13. In this example, the first to third emitters are disposed in the light sources 31, 32, and 33, respectively. However, the structure is not limited thereto. For example, a light source including two of the first to third emitters and a light source including the remaining one of the first to third light emitters may be disposed at different positions. Alternatively, for example, the first to third emitters may be disposed at substantially the same position in a light source.

The objective lens 34 focuses the light beams having the first to third wavelengths on the signal recording surface of the optical disc 2. The objective lens 34 is movably held by an objective lens driving mechanism such as a two-axis actuator (not shown). The objective lens 34 is moved by the two-axis actuator or the like on the basis of a tracking error signal and a focus error signal generated from an RF signal of the returning light beam reflected from the optical disc 2 and detected by the photodetection unit 45. Thus, the objective lens 34 can be moved in two axial directions including a direction toward or away from the optical disc 2 and in the radial direction of the optical disc 2. Thus, the objective lens 34 focuses the light beams emitted from the first to third emitters so that the focal points of the light beams are on the signal recording surface of the optical disc 2, and makes the focused light beams follow the recording track formed on the signal recording surface of the optical disc 2. As described below, a diffraction section 50 may be formed in an optical element (a diffractive optical element 35B) that is different from the objective lens (see FIG. 6B). In this case, the lens holder of the objective lens driving mechanism, which holds an objective lens 34B, holds the diffractive optical element 35B described below together with the objective lens 34B. With this configuration, the operational effect of the diffraction section 50 disposed in the diffractive optical element 35B, which will be describe below, can appropriately produced even when the objective lens 34B is moved in the tracking direction.

On one of the surfaces (for example, on an entry-side surface) of the objective lens 34, the diffraction section 50 including a plurality of diffractive regions is formed. The diffraction section 50 of the objective lens 34 diffracts each of the light beams having the first to third wavelengths passing through the plurality of diffractive regions so that the light beam is diffracted with predetermined diffraction orders. The diffraction section 50 of the objective lens 34 can create a state the same as the state in which the light beams enter the objective lens 34 in a divergent state or in a convergent state having predetermined divergence angles. That is, the diffraction section 50 enables the single objective lens 34 to appropriately focus each of the light beams having the first to third wavelengths on the signal recording surface of corresponding one of the optical discs in three formats so that spherical aberration is not generated. The diffraction section 50 of the objective lens 34 has a diffractive structure for generating a diffractive power, and the diffractive structure is formed on a lens surface of the objective lens that generates a refractive power. With this configuration, the objective lens 34 including the diffraction section 50 functions as a focusing optical device that appropriately focuses each of the three light beams having different wavelengths on the signal recording surface of the corresponding optical disc so that spherical aberration is not generated. The objective lens 34 functions as a refractive element and as a diffractive element. That is, the objective lens has a refractive function derived from a curved lens surface and a diffractive function derived from the diffraction section 50 formed on one of the surfaces.

Figure 3A:
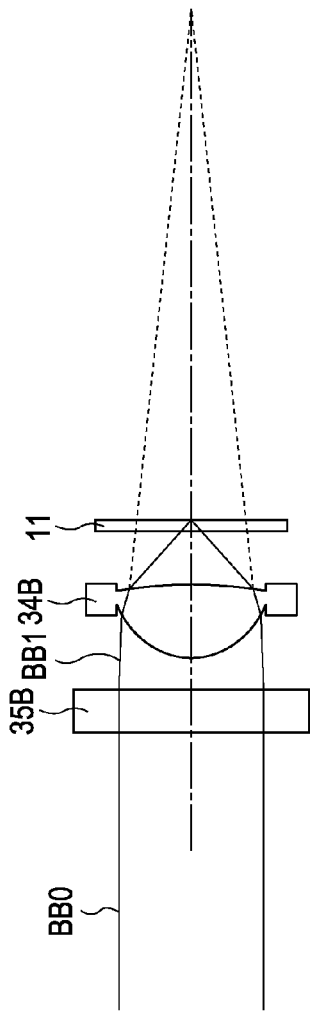
Figure 3B:
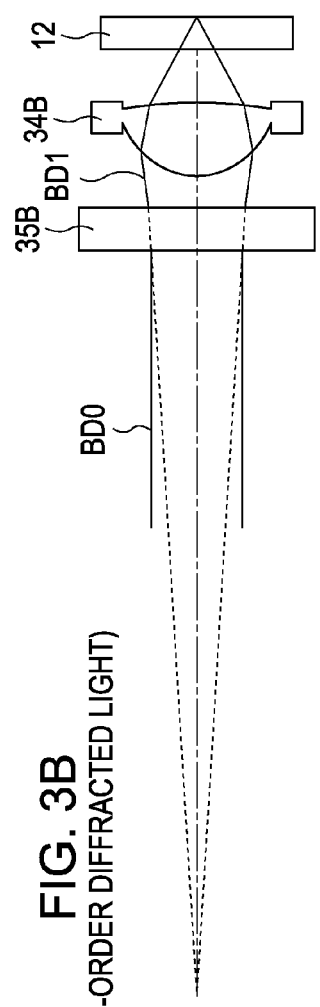
Figure 3C:
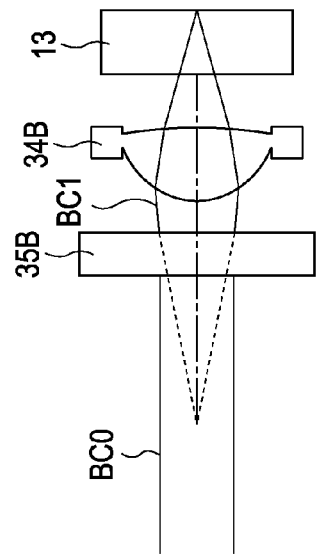

In order to conceptually describe the diffractive function of the diffraction section 50, a case in which the diffraction section 50 is disposed in the diffractive optical element 35B that is different from the objective lens 34B having the refractive power (see FIG. 6B) will be described as an example. For example, as illustrated in FIG. 3A, the diffractive optical element 35B, which is used together with the objective lens 34B having only the refractive function, diffracts a light beam BB0 having the first wavelength that has passed through the diffraction section 50 so that the light beam BB0 becomes a +1-order diffracted light beam BB1 and enters the objective lens 34B. That is, the diffractive optical element 35B including the diffraction section 50 makes the light beam having a predetermined divergence angle enter the objective lens 34B so that the light beam is appropriately focused on the signal recording surface of the first optical disc 11. As illustrated in FIG. 3B, the diffractive optical element 35B diffracts a light beam BD0 having the second wavelength that has passed through the diffraction section 50 so that the light beam BD0 becomes a −2-order diffracted light beam BD1 and enters the objective lens 34B. That is, the diffractive optical element 35B including the diffraction section 50 makes the light beam having a predetermined divergence angle enter the objective lens 34B so that the light beam is appropriately focused on the signal recording surface of the second optical disc 12. As illustrated in FIG. 3C, the diffractive optical element 35B diffracts a light beam BC0 having the second wavelength that has passed through the diffraction section 50 so that the light beam BC0 becomes a −3-order diffracted light BC1 and enters the objective lens 34B. That is, the diffractive optical element 35B including the diffraction section 50 makes the light beam BC0 enter the objective lens 34B as a light beam having a predetermined divergence angle so that the light beam is appropriately focused on the signal recording surface of the third optical disc 13. Thus, the diffraction section 50 of the diffractive optical element 35B enables the single objective lens 34B to appropriately focus a light beam on the signal recording surfaces of three types of optical discs so that spherical aberration is not generated. In the examples described here with reference to FIGS. 3A to 3B, a plurality of diffractive regions of the diffraction section 50 diffract the light beams having the same wavelength so that the light beams become the diffracted light having the same order of diffraction. However, the structure is not limited thereto. As described below, with the diffraction section 50 of the optical pickup 3 according to an embodiment of the present invention, the order of diffraction can be set for each wavelength for each of the regions, so that an aperture can be appropriately limited and spherical aberration can be reduced. In the examples described above, for convenience of description, the diffraction section 50 is formed in an optical element that is different from the objective lens. However, when the diffraction section 50 is integrally formed on one of the surface of the objective lens 34, the diffraction section 50 has the same function owing to a diffractive power of the diffractive structure. Owing to the diffractive power of the diffraction section 50 and the refractive power derived from the curved lens surface of the objective lens 34, each of the light beams having the first to third wavelengths can be appropriately focused on the signal recording surface of the corresponding optical disc so that spherical aberration is not generated.

Regarding orders of diffraction, a positive order means an order of diffraction with which an incident light beam is directed toward the optical axis, and a negative order means an order of diffraction with which an incident light beam is directed away from the optical axis. In other words, a positive order is an order of diffraction toward the optical axis with respect to the incident light.

Figure 4A:
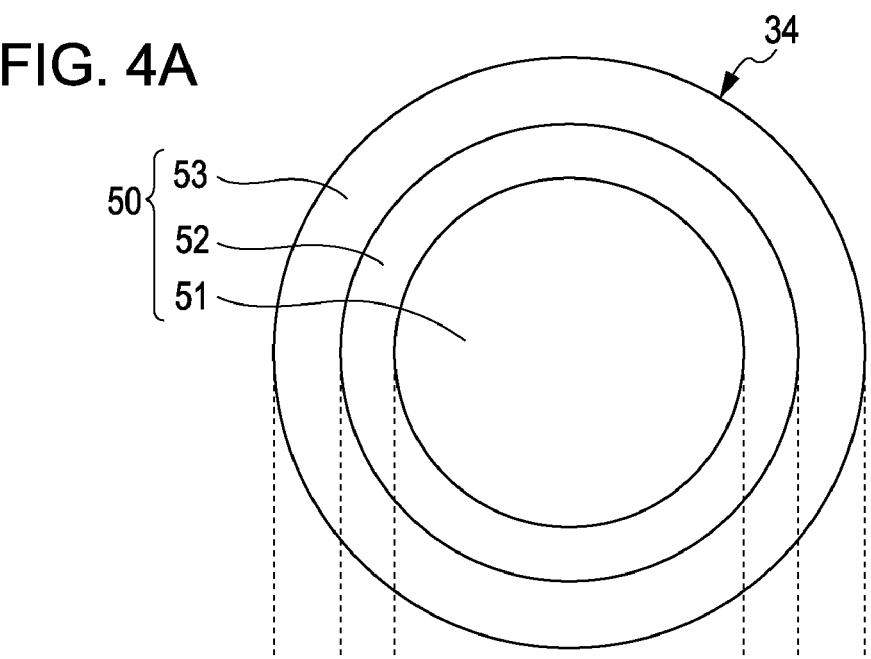
Figure 4B:
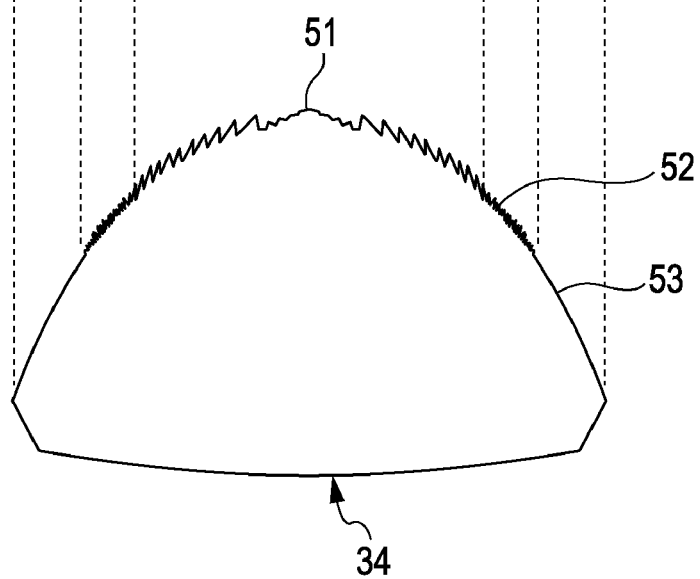

An objective lens and a diffraction section disposed in the optical pickup 3 according to an embodiment of the present invention is not limited to the objective lens 34 and the diffraction section 50 illustrated in FIGS. 4A and 4B. Other configurations are illustrated in FIGS. 5A to 7B. These configurations will be described below in detail in the sections [3] to [7].

The collimator lens 42, which is disposed between the objective lens 34 and the third beam splitter 38, changes the divergence angles of the light beams having the first to third wavelengths whose optical paths have been combined by the second beam splitter 37 and that have passed through the third beam splitter 38. The collimator lens 42 changes the divergence angle of each of the light beams having the first to third wavelengths, and outputs the light beam toward the quarter wavelength plate 43 and the objective lens 34, for example, in a substantially collimated state. For example, the collimator lens 42 changes the divergence angle of the light beam having the first wavelength and makes the light beam enter the objective lens 34 in a substantially collimated state. At the same time, the collimator lens 42 makes the light beams having the second and third wavelengths enter the objective lens 34 at a divergence angle that is slightly diverged relative to collimated light (hereinafter, such divergent state and convergent state may also be referred to as "states of a finite system"). With such a configuration, the collimator lens 42 reduces spherical aberration that is generated when the light beam having the second or third wavelength is focused on the signal recording surface of the second or third optical disc through the objective lens 34, so that three-wavelength compatibility with further reduced aberration is realized. This will be described below using FIGS. 9 and 10. Owing to the positional relationship between the second light source 32 and the collimator lens 42 and/or the positional relationship between the third light source 33 and the collimator lens 42, the light beams can be made to enter the objective lens 34 at a predetermined divergence angle. Alternatively, for example, if a plurality of emitters are disposed in a common light source, an element for changing the divergence angle of the light beams having the second and/or third wavelength may be provided so as to produce the same effect. A unit for driving the collimator lens 42 may be provided so as to make the light beam enter the objective lens 34 at a predetermined divergence angle. Depending on the situation, one of the light beams having the second and third wavelengths may be made to enter the objective lens 34 in the state of a finite system, so that aberration is further reduced. The light beams having the second and third wavelengths may be made to enter the objective lens 34 in the state of a finite system and in a divergent state, so that the return magnification can be adjusted. In such a case, an effect is also obtained in that the focus capture range and the like can be adjusted to a desired state suitable for the format by adjusting the return magnification, so that the optical system has a better compatibility.

The multilens 46 is, for example, a wavelength-selective multilens. On the return path, the returning light beams having the first to third wavelengths are reflected by the signal recording surfaces of the optical discs, pass through the objective lens 34 and the collimator lens 42, are split from the light beams on the forward path by being reflected by the third beam splitter 38, and enters the multilens 46. The multilens 46 appropriately focuses the light beams on the light-receiving surface of the photodetector and the like of the photodetection unit 45. At this time, the multilens 46 provides astigmatism for detecting the focus error signal and the like to the returning light beams.

The photodetection unit 45 receives the returning light beams that is focused by the multilens 46, and detects an information signal and detection signals such as the focus error signal and the tracking error signal.

In the optical pickup 3 having this structure, the objective lens 34 is moved on the basis of the focus error signal and the tracking error signal obtained by the photodetection unit 45. In the optical pickup 3, the objective lens 34 is moved to an in-focus position with respect to the signal recording surface of the optical disc 2, so that the light beam is focused on the signal recording surface of the optical disc 2, whereby information is recorded to or reproduced from the optical disc 2.

[3. Objective Lens According to Embodiment of the Invention]

Next, the objective lens 34 according to an embodiment of the present invention included in the optical pickup 3 and the diffraction section 50 of the objective lens 34 will be described in detail.

To be specific, as illustrated in FIGS. 4A and 4B, the diffraction section 50 is formed on the entry-side surface of the objective lens 34. The diffraction section 50 includes a first region 51 formed in the innermost radius portion thereof, which is a substantially circular diffractive region (hereinafter also referred to as an "inner annular zone" or a "first diffractive region"). The diffraction section 50 includes a second region 52 formed outside the first region 51, which is an annular diffractive region (hereinafter also referred to as a "middle annular zone" or a "second diffractive region"). The diffraction section 50 includes a third region 53 formed outside the second region 52, which has an annular shape (hereinafter also referred to as an "outer annular zone").

In the first region 51 (inner annular zone), a first diffractive structure having an annular shape and a predetermined depth is formed. The first region 51 diffracts the light beam having the first wavelength passing therethrough so that diffracted light of an order that is focused by the objective lens 34 to form an appropriate spot on the signal recording surface of the first optical disc becomes dominant. That is, the first region 51 generates the diffracted light of this order with a higher diffraction efficiency than those of diffracted light of the other orders.

The first diffractive structure of the first region 51 diffracts the light beam having the second wavelength passing therethrough so that diffracted light of an order that is focused by the objective lens 34 to form an appropriate spot on the signal recording surface of the second optical disc becomes dominant. That is, the first region 51 generates the diffracted light of this order with a higher diffraction efficiency than those of diffracted light of the other orders.

The first diffractive structure of the first region 51 diffracts the light beam having the third wavelength passing therethrough so that diffracted light of an order that is focused by the objective lens 34 to form an appropriate spot on the signal recording surface of the third optical disc becomes dominant. That is, the first region 51 generates the diffracted light of this order with a higher diffraction efficiency than those of diffracted light of the other orders.

Thus, the first region 51 has a diffractive structure that is appropriately configured to diffract each of the light beams having the aforementioned wavelengths so that the diffracted light of the predetermined order becomes dominant. With this structure, spherical aberration, which is generated when each of the light beams having the first to third wavelengths that has passed through the first region 51 and made into diffracted light of the predetermined order is focused on the signal recording surface of the corresponding optical disc by the objective lens 34, can be corrected and reduced. In the description above and below, it is assumed that diffracted light of the predetermined orders, which is selectively generated to become dominant for each of the light beams having the first to third wavelengths with the first region 51, second region 52, and third regions 52 and 73 (described below in detail), includes transmitted light, i.e., 0-order light.

Figure 8A:
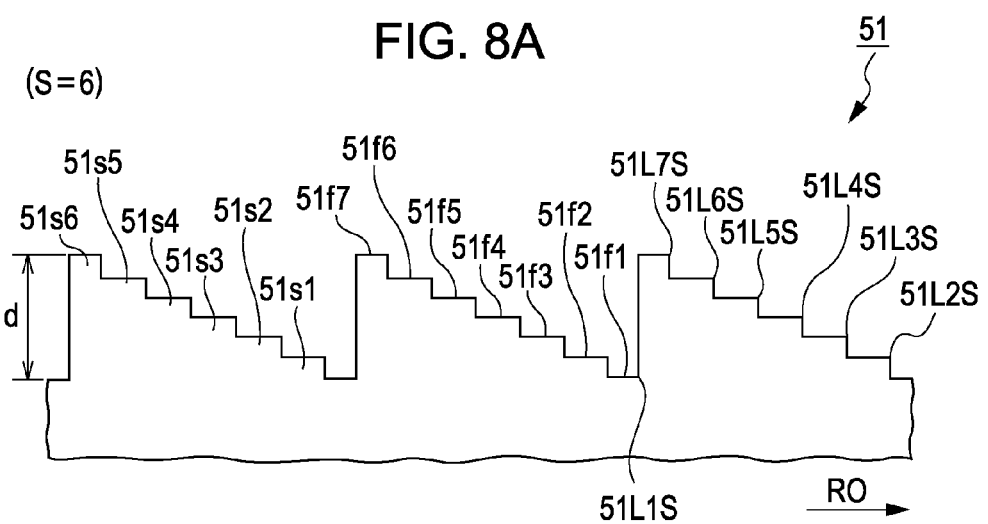

To be specific, as illustrated in FIGS. 4A, 4B, and 8A, the first region 51 includes an annular-zone-shaped diffractive structure that is formed on the reference surface and centered around the optical axis. That is, in a cross-sectional view, this annular-zone-shaped structure has staircase-like portions that are successively formed on the reference surface in the radial direction (hereinafter also referred to as a "multi-step shape"). Each of the staircase-like portions has S steps (where S is a positive integer) and a predetermined depth d (hereinafter also referred to as a "groove depth d"). As will be described below, the diffractive structure formed in the first region 51 has staircase-like portions that do not have an equal step width so as to obtain favorable characteristics that are not affected by variations in temperature and wavelength (hereinafter also referred to as an "variations in environmental conditions"). The cross-sectional view of the annular-zone-shaped diffractive structure is taken along a plane including a radius of the annular zone, i.e., along a plane perpendicular to the tangential direction of the annular zone.

Figure 8B:
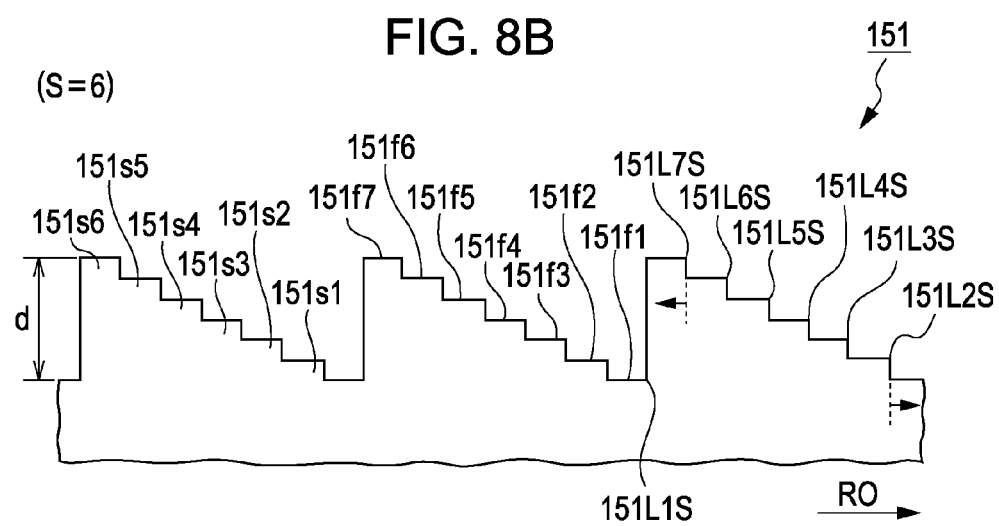
Figure 10A:
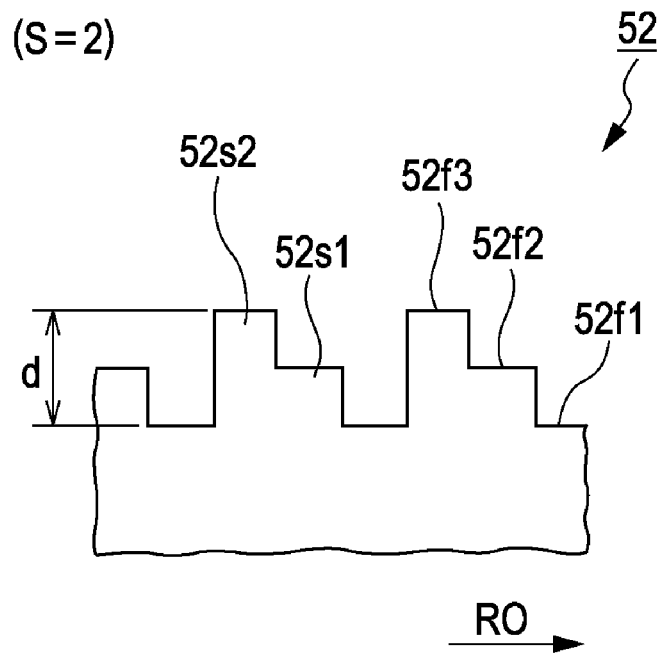
Figure 10B:
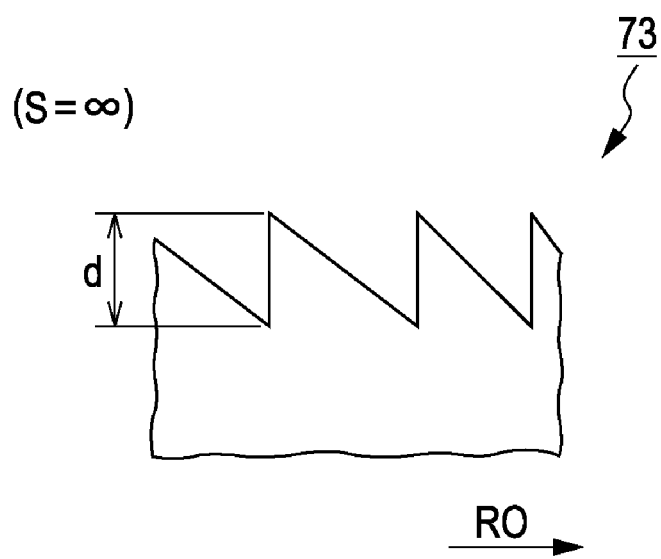

The reference surface refers to the surface on the entry side of the objective lens 34 that functions as a refractive element. In reality, as illustrated in FIG. 4A, the diffractive structure is formed in the first region 51 of the reference surface, which is the entry-side surface of the objective lens 34 that functions as a refractive element. That is, the diffractive structure having a diffractive function and having an annular-zone-like and staircase-like portions illustrated in FIG. 8A is formed in the first region 51 of the reference surface. However, FIGS. 8A, 10A, and 10B illustrate the shape of the diffractive structure relative to the reference surface, and only the shape relative to the reference surface will be explained in the following description. If the diffraction section 50 is formed in an optical element different from the objective lens (the diffractive optical element 35B described below), the diffractive optical element 35B has cross-sectional shapes illustrated in FIGS. 8A, 10A, and 10B. In reality, the diffractive structure illustrated in FIGS. 4A and 4B and other figures has very small dimensions as will be described below. FIGS. 8A and 8B and other figures are enlarged sectional views.

The diffractive structure having a staircase-like shape with a predetermined number of steps S is a structure in which staircase-like portions having substantially the same depth are successively formed in the radial direction, each of the staircase-like portions having first to S-th steps that have depths and widths modified from an equal depth and an equal width. In other words, the structure includes first to (S+1)-th diffractive surfaces arranged with substantially the same distances therebetween along the optical axis. The predetermined depth d of the diffractive structure is the distance between the (S+1)-th diffraction surface disposed on the front surface side (highest step, shallow position) of the staircase-like portion and the first diffraction surface disposed on the element side (lowest step, deep position) of the staircase-like portion along the optical axis. In FIG. 8A, the steps of each staircase-like portion are formed inward in the radial direction. That is, a step formed more inward in the radial direction protrudes toward the front side to a greater degree. This is because, in the inner annular zone, the order of diffraction described below is selected as the order of highest diffraction efficiency. In the middle and outer annular zones illustrated in FIGS. 10A and 10B, as with the inner annular zone, saw-tooth shaped inclined surfaces or steps are formed so that an inclined surface of the saw-tooth shape and the steps of the staircase-like portion formed more inward in the radial direction protrude toward the front side to a greater degree. However, the structure is not limited thereto. That is, a blazed shape or a staircase-like shape may be formed in an appropriate direction in accordance with the order of diffraction to be selected. In FIGS. 8A, 10A, and 10B, the direction RO denotes the direction outward in the radial direction, i.e., the direction away from the optical axis.

The first region 51 includes the diffractive structure having the staircase-like portions successively formed in the reference surface in the radial direction of the annular zones, each of the staircase-like portions having S steps. This diffractive structure includes the following modifications. That is, each of the staircase-like portions may include small steps, in addition to the basic structure of one cycle in which steps are formed with an equal step height and an equal step width, the small steps having about half the step height and half the step width. By adding the small steps having a step height and a step width that are about half the basic step height and the basic step width, the diffraction efficiency of the diffracted light of predetermined orders can be changed by a small amount without affecting the overall characteristics. In other words, the functions of a diffractive section and an objective lens can be performed only with the number of steps S and the groove depth d determined as described below, and similar functions can also be performed even if such small steps are added. The number of steps S is that for one cycle in the staircase-like portions, and does not include the number of steps having heights that are equal to or smaller than half the average height of steps. When the number of steps S=0, the structure is flat. The groove depth d is the distance between the deepest surface and the shallowest surface in one cycle, i.e., the largest distance between the surfaces in the staircase-like portions in one cycle along the optical axis. The facts described here apply also to the second region 52 described below.

For the first diffractive structure formed in the first region 51 and for the second and third diffractive structures described below, the groove depth d and the number of steps S are determined with consideration of the dominant order of diffraction and the diffraction efficiency. As illustrated in FIG. 8A, the widths of the steps (the dimensions of the steps in the radial direction) are changed from an equal width so that the diffractive structure becomes resistant to variations in environmental conditions as described below. When the staircase-like portions that are successively formed in the radial direction are compared with each other, the widths of the steps decrease with increasing distance from the optical axis. Instead of the structure described above, the steps may be formed so that, between the staircase-like portions that are successively formed in the radial direction, the widths of the steps may increase with increasing distance from the optical axis. The same applies to FIGS. 10A and 10B. The widths of the steps are determined on the basis of the phase difference to be imparted to a light beam in the diffractive region so that an optimal spot can be formed on the signal recording surface of the optical disc.

For example, the diffractive structure in the first region 51 has six steps (S=6) as illustrated in FIG. 8A. That is, the staircase-like portions are successively formed in the radial directions, and each of the staircase-like portions includes first to sixth steps 51s1, 51s2, 51s 3, 51s4, 51s5, and 51s6, each having substantially the same depth (d/6). Each of the staircase-like portions have first to seventh diffractive surfaces 51f1, 51f2, 51f3, 51f4, 51f5, 51f6, and 51f7 that are separated by substantially the same distance (d/6) along the optical axis and that have predetermined widths, which are changed from an equal width. Hereinafter, the first to seventh diffraction surfaces 51f1 to 51f7 may also be referred to as first to seventh levels, respectively. Level starting points 51L1S, 51L2S, 51L3S, 51L4S, 51L5S, 51L6S, and 51L7S are illustrated in the figures. A diffractive structure where S=6 may also be referred to as a diffraction structure with six steps and seven levels. In the example described here, the widths are changed from an equal width so as to provide the diffractive structure with resistance to variations in environmental conditions. However, the depths may be changed from an equal depth.

How the widths of steps illustrated in FIG. 8A is changed from an equal width will be described using a diffractive structure 151 of a comparative example illustrated in FIG. 8B, which is a general equal-step-width diffractive structure with six steps and seven levels. As illustrated in FIG. 8B, the diffractive structure 151 includes staircase-like portions that are successively formed in the radial direction, each of the staircase-like portions having first to sixth steps 151s1 to 151s6 having substantially the same depth (d/6). Each of the staircase-like portions includes first to seventh diffractive surfaces 151f1 to 151f7 arranged at substantially the same distance (d/6) along the optical axis and having substantially the same width. In the diffractive structure in the first region 51 illustrated in FIG. 8A, the starting point of the second level and the starting point of the seventh level are displaced outward from the corresponding starting points 151L2S 1 and 151L7S of the basic shape (equal-step-width shape) illustrated in FIG. 8B in view of the fact described below in the section [5]. That is, the starting points are changed to the starting points 51L2S and 51L7S illustrated in FIG. 8A. Instead of the starting points of the second and seventh levels, the starting points of the third and sixth levels may be displaced, or, the positions of the starting points of the second, third, sixth, and seventh levels may be changed. In this example, the positions of the starting points are changed in the case of six steps (S=6) so as to provide resistance to variations in environmental conditions. However, the number of steps is not limited thereto. If the number of steps S=$N_1$−1, the diffractive structure in the inner annular zone may be configured such that the position of the starting point of the second level and the position of the starting point of the $N_1$-th level are changed from an equal-width state and the widths of the first level and the $N_1$-th level are changed (the details will be described below). With this configuration, the diffractive structure can be provided with resistance to variations in environmental conditions.

Assume that the first region 51 diffracts the light beam having the first wavelength so that diffracted light of an order k1i becomes dominant, i.e., the diffraction efficiency of the diffracted light of an order k1i becomes the highest. Assume that the first region 51 diffracts the light beam having the second wavelength so that diffracted light of an order k2i becomes dominant, i.e., the diffraction efficiency of the diffracted light of an order k2i becomes the highest. Assume that the first region 51 diffracts the light beam having the third wavelength so that diffracted light of an order k3i becomes dominant. In this case, the first region 51 is configured so that a relationship (k1i, k2i, k3i)=(1, −2, −3), (1, −1, −2), (0, −1, −2), (0, −2, −3), (2, −1, −2) holds. Regarding the signs of the order of diffraction, a positive order of diffraction means an order of diffraction with which light is diffracted toward the optical axis with respect to the traveling direction of a light. For the first region 51, the combinations of the orders of diffraction are selected in view of reduction in size, diffraction efficiency, reduction of aberration, and manufacturing efficiency. The combinations of diffraction orders for the first region 51 (and for second and third regions 52 and 53 described below) are selected in view of the factors described in Japanese Unexamined Patent Application Publication No. 2009-018706.

Figure 9A:
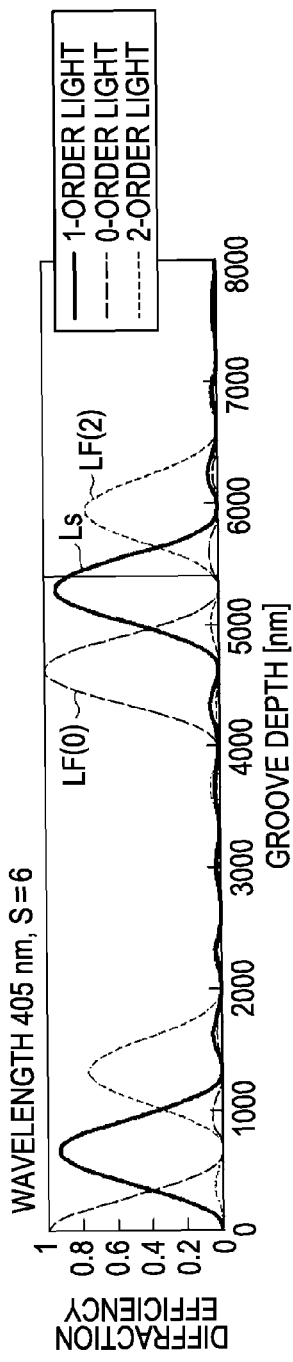
FIGS. 9A to 9C are graphs used for calculating the diffraction efficiencies for an example diffractive structure of the inner annular zone, illustrating the change in the diffraction efficiency for each of the light beams having the first to third wavelengths with respect to the groove depth d of the diffractive structure when S=6 and (k1$i$, k2$i$, k3$i$)=(+1, −2, −3)
Figure 9B:
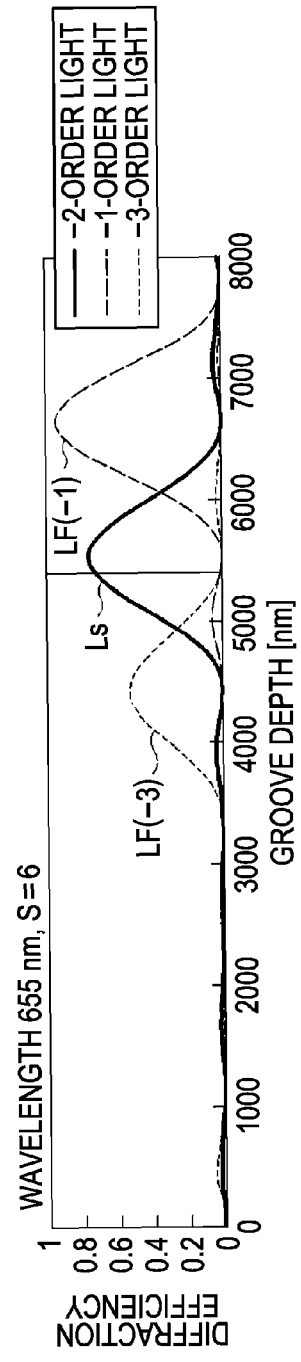
Figure 9C:
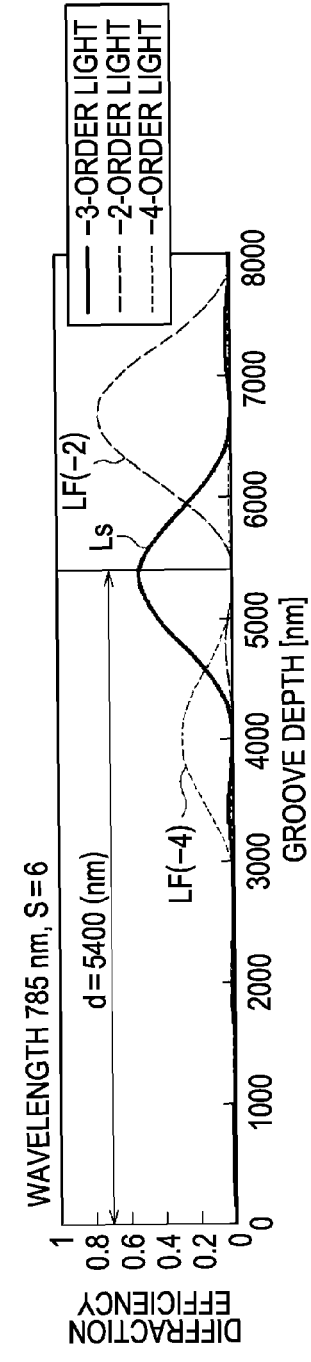

FIGS. 9A to 9C illustrate the change in the diffraction efficiency with respect to the groove depth d of a diffractive structure having six steps (S=6) and (k1i, k2i, k3i)=(+1, −2, −3), which is a specific example of the structure of the inner annular zone. In FIG. 9A, the curve LS represents the change in the diffraction efficiency of the +1-order diffracted light of the light beam having the first wavelength, and the curves LF(0) and LF(2) represent the change in the diffraction efficiencies of 0-order light and +2-order diffracted light, which are of adjacent orders. In FIG. 9B, the curve LS represents the change in the diffraction efficiency of the −2-order diffracted light of the light beam having the second wavelength, and the curves LF(−1) and LF(−3) represent the change in the diffraction efficiencies of −1-order diffracted light and −3-order diffracted light, which are of adjacent orders. In FIG. 9C, the curve LS represents the change in the diffraction efficiency of the −3-order diffracted light of the light beam having the third wavelength with, and the curves LF(−2) and LF(−4) represent the change in the diffraction efficiencies of −2-order diffracted light and −4-order diffracted light, which are of adjacent orders. In FIGS. 9A to 9C, the horizontal axis represents the groove depth (nm) and the vertical axis represents the diffraction efficiency (intensity of light). The diffraction efficiencies for k1i, k2i, and k3i, which will be respectively denoted by eff1, eff2, and eff3, are sufficiently high when the groove depth d=5400 (nm) on the horizontal axis. To be specific, when the groove depth d=5400 (nm), eff1=0.86 as illustrated in FIG. 9A, eff2=0.70 as illustrated in FIG. 9B, and eff3=0.52 as illustrated in FIG. 9C, which are sufficiently high diffraction efficiencies. Because the relationship between the diffraction efficiency and the groove depth varies in accordance with the number of steps, an appropriate number of steps is to be selected. In the examples illustrated in FIGS. 9A to 9C, the number of steps S=6 as described above. By additionally forming small steps, the characteristics can be changed by a small amount without negatively affecting the overall characteristics. That is, small steps may be additionally formed in the diffractive structure including a predetermined number of steps S and having predetermined depths in order to improve the diffraction efficiency of the selected order of diffraction of each of the light beams having the first to third wavelengths. As a guideline, if the depth of the added step is larger than half the average step height, the overall characteristics may be affected. Spherical aberration can be sufficiently reduced, because the selected combinations of the orders satisfy an expression $(\lambda 1 \times k1i - \lambda 2 \times k2i)/(t1-t2) \approx (\lambda 1 \times k1i - \lambda 3 \times k3i)/(t1-t3)$, where $\lambda 1$ is the first wavelength (nm), $\lambda 2$ is the second wavelength (nm), $\lambda 3$ is the third wavelength (nm), t1 is the thickness of the first protective layer of the first optical disc (mm), t2 is the thickness of the second protective layer of the second optical disc (mm), and t3 is the thickness of the third protective layer of the third optical disc (mm).

In the second region 52 (middle annular zone), a second diffractive structure having an annular shape and a predetermined depth is formed. The second diffractive structure has a structure different from that of the first diffractive structure. The second region 52 diffracts the light beam having the first wavelength passing therethrough so that diffracted light of an order that is focused by the objective lens 34 to form an appropriate spot on the signal recording surface of the first optical disc becomes dominant. That is, the second region 52 generates the diffracted light of this order with a higher diffraction efficiency than those of diffracted light of the other orders.

The second diffractive structure of the second region 52 diffracts the light beam having the second wavelength passing therethrough so that diffracted light of an order that is focused by the objective lens 34 to form an appropriate spot on the signal recording surface of the second optical disc becomes dominant. That is, the second region 52 generates the diffracted light of this order with a higher diffraction efficiency than those of diffracted light of the other orders.

The second diffractive structure of the second region 52 diffracts the light beam having the third wavelength passing therethrough so that diffracted light of an order other than the order with which diffracted light is focused by the objective lens 34 to form an appropriate spot on the signal recording surface of the third optical disc becomes dominant. That is, the second region 52 generates the diffracted light of this order with a higher diffraction efficiency than those of diffracted light of the other orders. In other words, the second diffractive structure of the second region 52 diffracts the light beam having the third wavelength so that diffracted light of an order with which the objective lens 34 does not focus the light beam having the third wavelength to form an appropriate spot on the signal recording surface of the third optical disc becomes dominant. The second diffractive structure is formed with consideration of an effect of flaring. The second diffractive structure in the second region 52 diffracts the light beam having the third wavelength so that the diffraction efficiency of diffracted light of an order with which the objective lens 34 focuses the light beam having the third wavelength to form an appropriate spot on the signal recording surface of the third optical disc is sufficiently reduced. The term "flaring" refers to a technique of reducing the intensity of a light beam having a specific wavelength that is actually focused on the signal recording surface of a corresponding optical disc by displacing the position at which the light beam forms an image through the objective lens 34 from the signal recording surface.

Thus, the second region 52 has a diffractive structure that is configured so that each of the light beams having the first to third wavelengths is diffracted so that the diffracted light of the predetermined order becomes dominant. With this structure, spherical aberration, which is generated when the first and second light beams that have passed through the second region 52 and made into diffracted light of the predetermined orders are focused on the signal recording surfaces of the optical discs by the objective lens 34, can be corrected and reduced.

The second region 52 acts on the light beams having the first and second wavelengths as described above. Moreover, with consideration of the effect of flaring, the second region 52 is configured to diffract the light beam having the third wavelength so that diffracted light of an order that is not focused by the objective lens 34 on the signal recording surface of the third optical disc becomes dominant. With such a configuration, when the light beam having the third wavelength passes through the second region 52 and enters the objective lens 34, the signal recording surface of the third optical disc is only negligibly affected. In other words, the second region 52 can act on the light beam having the third wavelength so as to reduce the intensity of the light beam, which passes through the second region 52 and is focused on the signal recording surface by the objective lens 34, to substantially zero and limit the aperture of the light beam.

The first region 51 has a size that allows the light beam having the third wavelength that has passed therethrough to enter the objective lens 34 in the same state as a light beam whose aperture is limited to about NA=0.45. The second region 52 formed outside the first region 51 does not allow the light beam having the third wavelength that has passed therethrough to be focused on the third optical disc through the objective lens 34. The diffraction section 50 including the first and second regions 51 and 52 acts on the light beam having the third wavelength so as to limit the aperture of the light beam to about NA=0.45. In this example, the diffraction section 50 limits the aperture of the light beam having the third wavelength to an numerical aperture NA of about 0.45. However, the numerical aperture to be limited with this structure is not limited thereto.

To be specific, as illustrated in FIGS. 4A, 4B, and 10A, the second region 52 includes an annular-zone-shaped structure centered around the optical axis. In a cross-sectional view, the annular-zone-shaped structure has staircase-like portions that are successively formed on the reference surface in the radial direction. Each of the staircase-like portions has S steps and a predetermined depth d (hereinafter also referred to as a "groove depth d"). The second region 52 differs from the first region 51 in the values of d and/or S. That is, the second diffractive structure formed in the second region 52 is different from the first diffractive structure formed in the first region 51. For example, the diffractive structure in the second region 52 illustrated in FIG. 10A has two steps (S=2), and the diffractive structure includes staircase-like portions that are successively formed in the radial direction, each of the staircase-like portions having first and second steps 52s1 to 52s2, each of the steps having substantially the same depth (d/2). Each of the staircase-like portions includes first to third diffractive surfaces 52f1 to 52f3 arranged at substantially the same distance (d/3) along the optical axis and having substantially the same width. In the second region (middle annular zone), a non-periodic diffractive structure, which includes non-periodic portions for generating a desired phase difference arranged in the radial direction, may be formed.

Assume that the second region 52 diffracts the light beam having the first wavelength so that diffracted light of an order k1$m$ becomes dominant, i.e., the diffraction efficiency of the diffracted light of an order k1$m$ becomes the highest. Assume that the second region 52 diffracts the light beam having the second wavelength so that diffracted light of an order k2$m$ becomes dominant, i.e., the diffraction efficiency of the diffracted light of an order k2$m$ becomes the highest. Assume that the second region 52 diffracts the light beam having the third wavelength so that diffracted light of an order k3$m$ becomes dominant, i.e., the diffraction efficiency of the diffracted light of an order k3$m$ becomes the highest. In this case, the second region 52 is configured so that, for example, a relationship (k1$m$, k2$m$)=(0, −1) holds. For the second region 52, the combination of the orders of diffraction are selected in view of limiting of aperture with respect to the third wavelength, flaring, compatibility with the order of diffraction for the inner annular zone, and manufacturing efficiency. The combination of the orders is not limited thereto, and may be, for example, (k1$m$, k2$m$)=(0, −2), (1, 0), (1, −1).

FIGS. 11A to 11C illustrate the change in the diffraction efficiency with respect to the groove depth d for a diffractive structure having two steps (S=2) and (k1$m$, k2$m$, k3$m$, k3$m$') =(0, −1, +1, −1), which is a specific example of the structure of the middle annular zone. The order of diffraction k3$m$ is the order at which the diffractive structure diffracts the light beam having a third wavelength with the highest diffraction efficiency, and the order of diffraction k3$m$' is the order at which the diffractive structure diffracts the light beam having the third wavelength with the second highest diffraction efficiency as so-called unwanted light. FIG. 11A illustrates the change in the diffraction efficiency of the 0-order diffracted light of the light beam having the first wavelength. FIG. 11B illustrates the change in the diffraction efficiency of the −1-order diffracted light of the light beam having the second wavelength. In FIG. 11C, the curve LF1 represents the diffraction efficiency of the +1-order diffracted light of the light beam having the third wavelength, which is unwanted light, and the curve LF2 represents the change in the diffraction efficiency of the −2-order diffracted light, which is other unwanted light. In FIGS. 11A to 11C, the horizontal axis represents the groove depth (nm) and the vertical axis represents the diffraction efficiency (intensity of light). When the groove depth d is 1600 nm on the horizontal axis, eff1 is 0.99 as illustrated in FIG. 11A and eff2 is 0.63 as illustrated in FIG. 11B. At this position, eff3 is about 0.28 and eff3' is about 0.28 as illustrated in FIG. 11C. However, the spot is flared.

Figure 12:
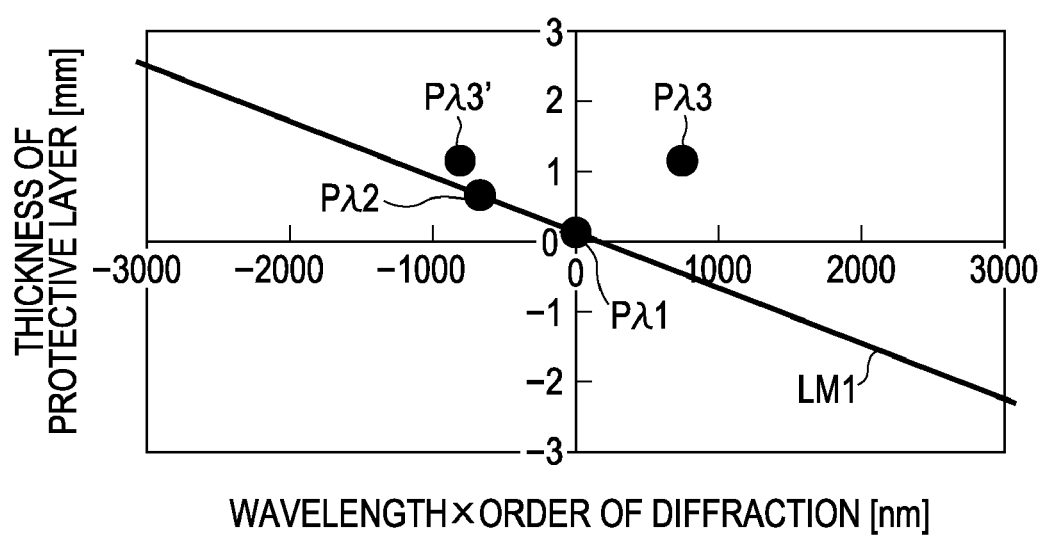
FIG. 12 is a graph illustrating the possibility of correction of spherical aberration and flaring in an example diffractive structure of the middle annular zone when (k1$m$, k2$m$, k3$m$, k3$m$')=(0, −1, +1, −1), in which the plotted points represent the relationship between (wavelength×order of diffraction) and the thickness of the protective layer and the solid line represents the design line of the objective lens.

Referring to FIG. 12, flaring is specifically described. FIG. 12 is a graph in which points Pλ1, Pλ2, Pλ3, and Pλ3' respectively corresponding the orders of diffraction (k1$m$, k2$m$, k3$m$, k3$m$')=(0, −1, +1, −1) are plotted. The horizontal axis represents (wavelength×order of diffraction) (nm) and the vertical axis represents the thickness of the protective layer (mm). LM1 represents the design line. In FIG. 12, because the design point Pλ1 for the first wavelength and the design point Pλ2 for the second wavelength are in the design line LM1, the aberrations of the diffracted light beams of the orders of diffraction k1$m$ and k2$m$ are substantially zero. The slope of the design line LM1 is substantially approximated by the slope of a straight line connecting Pλ1 and Pλ2, which is calculated, for example, using an expression (t1−t2)/(λ1×k1$m$−λ2×k2$m$). In contrast, the plotted points Pλ3 and Pλ3' corresponding to the third wavelength deviate considerably from the design points where the aberration is zero, which indicates that the light beam having the third wavelength is flared. To be specific, the deviation Δ of the plotted point Pλ3 from the spherical aberration correction line is about −1.62 (mm) and the deviation Δ' of the plotted point Pλ3' from the spherical aberration correction line is about −0.40 (mm). As a result, aberration is not corrected in the light beam having the third wavelength, so that the light beam having the third wavelength that has passed through the middle annular zone does not form an image on the signal recording surface and the intensity of the light beam having the third wavelength that is incident on the third optical disc is suppressed. As a result, although the light beam having the third wavelength is diffracted with a diffraction efficiency illustrated in FIG. 11C, the light beams do not contribute to forming an image, whereby the aperture is appropriately limited (NA=0.45). That is, with this configuration, the diffracted light of the light beam having the third wavelength of the order of diffraction can be displaced from the state in which the light beam is focused on the signal recording surface of the third optical disc, so that the intensity of the light beam having the third wavelength that is focused on the signal recording surface of the third optical disc can be reduced. Thus, the aperture of the light beam having the third wavelength can be reliably and favorably limited as described above.

The third region 53 (outer annular zone) is formed as a continuous aspheric surface having an annular-zone shape and a predetermined refractive power. The third region 53 refracts the light beam having the first wavelength so that the light beam is focused so as to form an appropriate spot on the signal recording surface of the first optical disc.

The continuous aspheric surface in the third region 53 refracts the light beam having the second wavelength so that the light beam does not form an appropriate spot on the signal recording surface of the second optical disc. That is, the third region 53 prevents the light beam having the second wavelength from being focused on the signal recording surface of the second optical disc. In other words, the third region 53 refracts the light beam having the second wavelength so that the light beam is defocused from the signal recording surface of the second optical disc, i.e., is focused at a position separated from the signal recording surface or so that the light beam is diverged and unfocused.

The continuous aspheric surface of the third region 53 diffracts the light beam having the third wavelength so that the light beam does not form an appropriate spot on the signal recording surface of the third optical disc. That is, the third region 53 prevents the light beam having the third wavelength from being focused on the signal recording surface of the third optical disc. In other words, the third region 53 diffracts the light beam having the third wavelength so that the light beam is focused on a position separated from the signal recording surface of the third optical disc (defocused state) or so that the light beam is diverged and unfocused.

The third region 53, which includes the continuous aspheric surface having the function described above, can correct and reduce spherical aberration that is generated when the light beam having the first wavelength that passes through the third region 53 is focused on the signal recording surface of the first optical disc. The third region 53 prevents the light beam having the second wavelength from being focused on the signal recording surface of the second optical disc, thereby limiting the aperture of the light beam having the second wavelength. The third region 53 prevents the light beam having the third wavelength from being focused on the signal recording surface of the third optical disc, thereby limiting the aperture of the light beam having the third wavelength as with the second region 52.

The second region 52 has a size that allows the light beam having the second wavelength that has passed therethrough to enter the objective lens 34 in the same state as the light beam whose aperture is limited to about NA=0.6. The third region 53, which is formed outside the second region 52, does not allow the light beam having a second wavelength that has passed therethrough to be focused on the second optical disc by the objective lens 34. Therefore, the diffraction section 50 included in the second and third regions 52 and 53 limits the aperture of the light beam having the second wavelength to about NA=0.6. In this example, the diffraction section 50 limits the aperture of the light beam having the second wavelength to a numerical aperture NA of about 0.6. However, the numerical aperture to be limited with the structure described above is not limited thereto.

The third region 53 has a size that allows the light beam having the first wavelength that has passed therethrough to enter the objective lens 34 in the same state as the light beam having an aperture limited to about NA=0.85. The aperture of a region outside the third region 53 is limited by forming a light blocking section for blocking a light beam. Alternatively, the aperture may be limited by providing a diffractive region that diffracts the light beam so that diffracted light of an order other than the order with which diffracted light is focused on the first optical disc through the objective lens 34 becomes dominant. As a further alternative, the aperture may be limited by providing a refracting surface that refracts the light beam having the first wavelength so that the light beam is not focused on the signal recording surface of the first optical disc. The numerical aperture to be limited with the structure described above is not limited thereto.

To be specific, the third region 53 has an aspheric shape represented by the following expression (1). The reference surfaces of the first and second regions 51 and 52, on which diffractive structures are formed, have the aspheric shapes represented by the following expression (1). The diffractive structures described above are formed on the aspheric reference surfaces. The third region 73, which is a diffractive region in a diffraction section 70 described below, has a reference surface, in which a diffractive structure is formed, having an aspheric shape represented by the following expression (1). The diffractive structure described above is formed on the aspheric reference surface. In the expression (1), h is the height from the optical axis, i.e., the position in the radial position, z is the amount of sag in a direction parallel to the optical axis at the height h, i.e., distance between the surface vertex and the tangent plane at the height h. In the third region 53 that does not have a diffractive structure, the amount of sag z represents the shape of the lens surface. In the expression (1), c is the curvature, i.e., the reciprocal of the radius of curvature, K is the conic coefficient (aspheric coefficient), and A4, A6, A8, A10 . . . are the aspheric coefficients.

$$z = \Delta z + \frac{ch^2}{1 + \sqrt{1 - (1+\kappa)c^2 h^2}} + A_4 h^4 + A_6 h^6 + A_8 h^8 + A_{10} h^{10} \quad (1)$$

Figure 13:
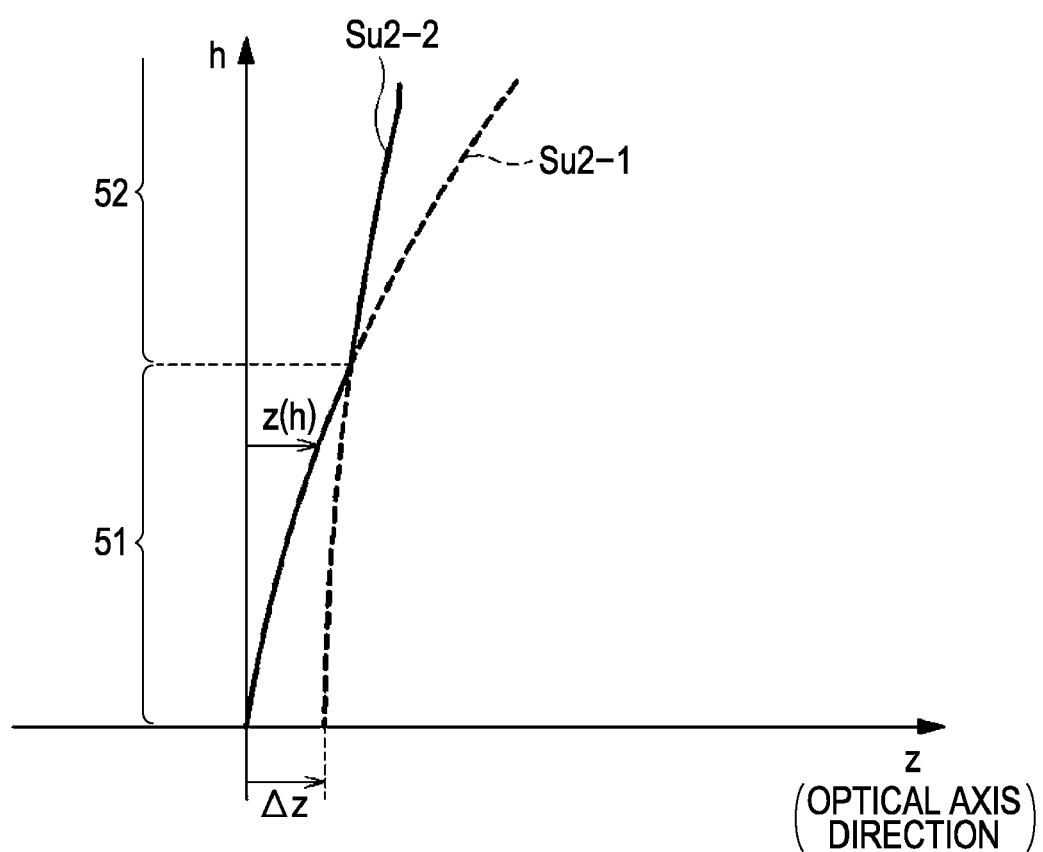
FIG. 13 is a graph illustrating the distance between surfaces along the optical axis for an aspheric shape that serves as the reference surface of the inner annular zone, the middle annular zone, and the outer annular zone of the diffraction section of the objective lens.

In the expression (1), $\Delta z$ is the distance between surfaces along the optical axis with respect to the 2-1 surface, which is the reference surface of the inner annular zone. That is, on the assumption that the reference surface of the inner annular zone is the 2-1 surface, the reference surface of the middle annular zone is the 2-2 surface, the reference surface of the outer annular zone is the 2-3 surface, and the vertex position of the reference surface of the inner annular zone (2-1 surface) is the origin, $\Delta z$ has the following meaning: the reference surface of the middle annular zone (2-2 surface) and the reference surface of the outer annular zone (2-3 surface) are formed so as to be offset from the origin by the distance $\Delta z$. Regarding the "reference surface of the outer annular zone", the reference surface of the outer annular zone 53 itself is the surface of the outer annular zone 53. However, in the case of the outer annular zone 73 described below, a diffractive structure is formed on the reference surface of the outer annular zone 73. For example, with respect to the 2-2 surface, the distance between the surfaces along the optical axis $\Delta z$ is represented as illustrated in FIG. 13. In FIG. 13, Su2-1 is the 2-1 surface, which is the reference surface of the inner annular zone 51, and Su2-2 is the 2-2 surface, which is the reference surface of the middle annular zone 52. The horizontal axis represents the amount of sag z along the optical axis, h is the position in the radial position, and z(h) represents the amount of sag for the radial position that corresponds to z of the expression (1). In FIG. 13, the solid line represents the reference surface formed of Su2-1 and Su2-2, and the broken line represents extensions of Su2-1 and Su2-2. In FIG. 13, $\Delta z$ represents the distance between the vertex of the 2-1 surface and the vertex of the 2-2 surface along the optical axis. In this example, the intersection between the 2-1 surface and the 2-2 surface is the boundary between the inner annular zone and the middle annular zone. However, the boundary is not limited thereto, and may be formed so that light beams can be appropriately focused on the signal recording surfaces of the optical discs with consideration of aberration and diffraction efficiency. In other words, the threshold of the boundary between the inner annular zone and the middle annular zone is determined by the position in the radial direction h. If the 2-1 surface and the 2-2 surface do not intersect at the boundary determined by the position h, the reference surfaces of the inner annular zone and the middle annular zone are formed with a small step therebetween. The relationship between the outer annular zone and the inner annular zone and the relationship between the outer annular zone and the middle annular zone are similar to the relationship between the inner annular zone and the middle annular zone described above. $\Delta z$ for the outer annular zone is determined with respect to the surface vertex of the inner annular zone in the same manner as described above.

The diffraction section 50, which includes the first and second regions 51 and 52 having the structures described above and the third region 53 having an aspheric shape, acts on each of the light beams having first to third wavelengths that pass therethrough in a predetermined manner. The diffraction section 50 diffracts each of the light beams having the first to third wavelengths that passes through the first region 51 to be in a state having an appropriate divergence angle so that aberration is not generated on the recording surface of the corresponding optical disc with the refractive power of the objective lens 34 that is common to the three wavelengths. Using the refractive power of the objective lens 34, the diffraction section 50 can focus an appropriate spot on the signal recording surface of the corresponding optical disc. The diffraction section 50 diffracts each of the light beams having the first and second wavelengths that passes through the second region 52 to be in a state having an appropriate divergence angle so that aberration is not generated on the recording surface of the corresponding optical disc with the refractive power of the objective lens 34 that is common to the three wavelengths. Using the refractive power of the objective lens 34, the diffraction section 50 can focus an appropriate spot on the signal recording surface of the corresponding optical disc. The diffraction section 50 diffracts the light beam having the first wavelength that passes through the third region 53 to be in a state having an appropriate divergence angle so that aberration is not generated on the recording surface of the corresponding disc with the refractive power thereof. Here, "a state having an appropriate divergence angle so that spherical aberration is not generated" refers to a state in which spherical aberration is corrected with the refractive power of a curved lens surface, including a divergent state, a convergent state, and a collimated state.

That is, the diffraction section 50, which is formed on a surface of the objective lens 34 disposed on the optical path in the optical system of the optical pickup 3 between the first to third emitters and the signal recording surface, produces the following effect. The diffraction section 50 can provide a diffractive power and a refractive power to each of the light beams having the first to third wavelengths that passes through the corresponding regions (the first to third regions 51, 52, and 53) so that spherical aberration generated on the signal recording surfaces is reduced. Therefore, the diffraction section 50 can maximally reduce the spherical aberration generated on the signal recording surface when each of the light beams having the first to third wavelengths is focused on the signal recording surface of the corresponding optical disc by the common objective lens 34 of the optical pickup 3. That is, the diffraction section 50 realizes three-wavelength compatibility of the optical pickup including the objective lens 34 common to the three wavelengths and the three types of optical discs, so that information signals can be appropriately recorded on and/or reproduced from the optical discs.

In the objective lens 34 including the diffraction section 50 having the first to third regions 51, 52, and 53, the orders of diffraction (k1$i$, k2$i$, k3$i$) of the first region 51, which is the inner annular zone, are (1, −2, −3). Therefore, the objective lens 34 can reduce spherical aberration, optimize the working distance and the focal length, so that productivity is increased. That is, the objective lens 34 can diffract each of the light beams having the first to third wavelengths so that the light beam is focused so as to form an appropriate spot on the signal recording surface of the corresponding optical disc by making diffracted light of the order with which spherical aberration can be appropriately reduced dominant. With the objective lens 34, increase in size can be prevented, the production process can be simplified, and the diffraction efficiency of selected orders can be sufficiently increased. Thus, the objective lens 34 realizes three-wavelength compatibility of the optical pickup including the objective lens 34 common to the three wavelengths and the three types of optical discs, so that information signals can be appropriately recorded on and/or reproduced from the optical discs. When the objective lens 34 is configured so that (k1$i$, k2$i$, k3$i$) is (1, −1, −2), (0, −1, −2), (0, −2, −3), (2, −1, −2), an effect similar to that when (k1$i$, k2$i$, k3$i$) is (1, −2, −3) can be produced.

Because the first region 51 (inner annular zone) of the objective lens 34 has a diffractive structure modified from that of equal-step-width type as illustrated in FIG. 8A, excellent recording and reproduction characteristics can be realized irrespective of variations in the temperature and the wavelength as will be described in the section [5]. This is because the diffractive structure formed in the first region 51 suppresses generation of unwanted diffracted light due to variations in environmental conditions and thereby the servo is prevented from becoming unstable. This will be described below in the section [5].

In the objective lens 34 having the diffraction section 50, the second region 52 (middle annular zone) satisfies a relationship (k1$m$, k2$m$)=(0, −1). With this configuration, spherical aberration can be reduced for the first and second wavelengths, and the aperture can be appropriately limited for the third wavelength. With the objective lens 34, productivity is increased, a high diffraction efficiency can be obtained, and favorable characteristics in combination with the inner annular zone can be obtained.

The objective lens 34 having the diffraction section 50 includes, as an outer annular zone, the third region 53 having an annular shape and formed outside the second region 52. The third region 53 has a continuous aspheric surface having a predetermined refraction function. With this configuration, as described above, light can be utilized efficiency, appropriate spots can be focused, and the aperture can be limited in a predetermined manner. With the objective lens 34, the production process of the outer annular zone is simplified, and the utilization efficiency of light can be increased because the outer annular zone does not have a diffractive structure.

The diffraction section 50, which includes the first to third regions 51, 52, and 53, can limit the aperture of the light beam having the third wavelength passing through the second and third regions 52 and 53. The second region 52 can flare diffracted light having the highest diffraction efficiency and diffracted light having a predetermined diffraction efficiency so as to displace the image-forming positions thereof from the signal recording surface, thereby reducing the diffraction efficiencies of the diffracted light of such orders. The third region 53 refracts the light beam having the third wavelength so that the light beam does not form an appropriate spot on the signal recording surface of the third optical disc. With this configuration, only a portion of the light beam having the third wavelength that has passed through the first region 51 is focused on the signal recording surface of the optical disc by the objective lens 34. Because the first region 51 has a size for limiting the aperture of the light beam having the third wavelength that has passed therethrough to a predetermined NA, the aperture of the light beam having the third wavelength can be limited to an NA of, for example, about 0.45.

The diffraction section 50 can limit the aperture of the light beam having the second wavelength passing through the third region 53. The third region 53 refracts the light beam having the second wavelength so that the light beam does not form an appropriate spot on the signal recording surface of the second optical disc. With this configuration, only a portion of the light beam having the second wavelength that has passed through the first and second regions 51 and 52 is focused on the signal recording surface of the optical disc by the objective lens 34. Because the first and second regions 51 and 52 have sizes for limiting the aperture of the light beam having the second wavelength that has passed therethrough to predetermined NA, the aperture of the light beam can be limited to an NA of, for example, about 0.60.

The diffraction section 50 can limit the aperture of the light beam having the first wavelength passing through the region outside the third region 53 by preventing the light beam from being appropriately focused on the signal recording surface of the corresponding optical disc by the objective lens 34 or by blocking the light beam. With the diffraction section 50, only a portion of the light beam having the first wavelength that has passed through the first to third regions 51, 52, and 53 is focused on the signal recording surface of the optical disc by the objective lens 34. Because the first to third regions 51, 52, and 53 have sizes for limiting the aperture of the light beam having the first wavelength passing therethrough to a predetermined NA, the aperture of the light beam can be limited to an NA of, for example, about 0.85.

The diffraction section 50, which is formed on a surface of the objective lens 34 disposed on the optical path described above, realizes three-wavelength compatibility and performs an aperture limiting function. That is, the diffraction section 50 allows each of the light beams having the first to third wavelengths corresponding to one of the three types of optical discs to enter the common objective lens 34 with an appropriate numerical aperture. That is, the diffraction section 50 has an aberration correction function and an aperture limiting function compatible with the three wavelengths.

The diffractive regions may be formed by appropriately combining the examples of the diffraction sections described above. That is, the order of diffraction of each of the light beams having the first to third wavelengths passing through the diffraction regions may be appropriately selected in view of the factors described above. When changing the order of diffraction of each of the light beams passing through the diffractive regions, the objective lens 34 may have curved lens surfaces corresponding to the order of diffraction of each of the light beams having the first to third wavelengths that have passed through the region.

As a modification of the first to third regions 51, 52, and 53, the third region 53 may also have a predetermined diffractive structure. That is, instead of the third region 53 having the continuous aspheric surface, the third regions 53 may include a predetermined diffractive structure for diffracting the light beam having the first wavelength so as to generate diffracted light that is focused on the optical disc and so as to appropriately limit the apertures of the light beams having the second and third wavelengths. In other words, the diffraction section may include the first and second regions 51 and 52, which includes the predetermined diffractive structures, and the third region, which includes the diffractive structure having a numerical aperture corresponding to the first optical disc.

[4. Objective Lens According to Another Embodiment of the Invention]

Figure 5A:
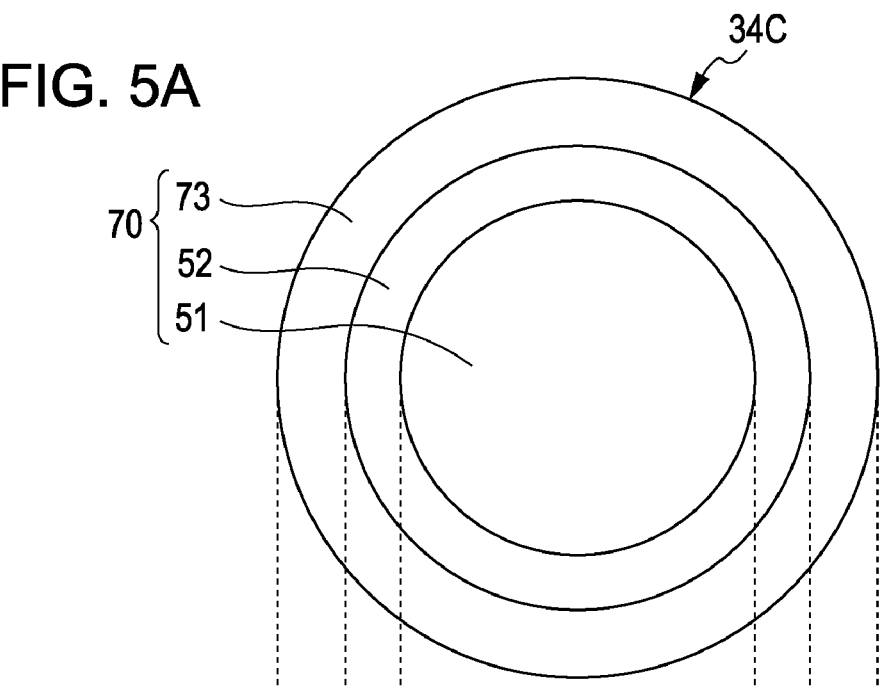
Figure 5B:
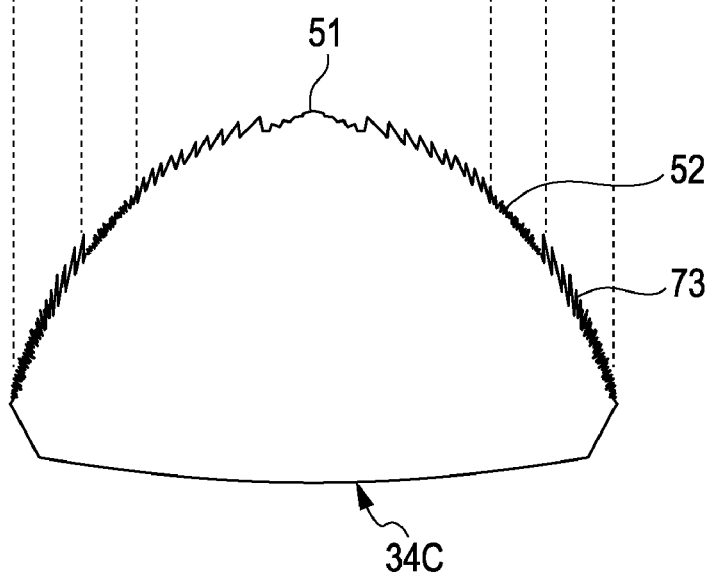

Referring to FIGS. 5A and 5B, an objective lens according to another embodiment of the present invention included in the optical pickup 3 will be described. Instead of the third region 53 of the diffraction section 50, the objective lens includes a diffractive region in the outer annular zone thereof. That is, referring to FIGS. 5A and 5B, the diffraction section 70 including the third region 73 formed outside the second region 52 in addition to the first and second regions 51 and 52, will be described. An objective lens 34C including the diffraction section 70 will also be described. The diffraction section 70 is the same as the diffraction section 50 except that the diffraction section 70 includes the third region 73 at a position corresponding to the third region 53 of the diffraction section 50. The same components will be denoted with the same numerals and detailed description thereof is omitted.

The diffraction section 70 of the objective lens 34C, as with the diffraction section 50 of the objective lens 34, diffracts the light beams having the first to third wavelengths that pass through the first and second regions 51 and 52 so that the light beams are diffracted with predetermined diffraction orders. The diffraction section 70 of the objective lens 34C creates a state the same as the state in which the light beams enter the objective lens 34C in a divergent state or in a convergent state having predetermined divergence angles and acts on the light beams in a certain manner with the third region 73 described below. With this configuration, the diffraction section 70 enables the single objective lens 34C to appropriately focus each of the light beams having the first to third wavelengths on the signal recording surface of corresponding one of the optical discs in three formats so that spherical aberration is not generated. The diffraction section 70 of the objective lens 34C has a diffractive structure for generating a diffractive power, and the diffractive structure is formed on a lens surface of the objective lens that generates a refractive power. With this configuration, the objective lens 34C functions as a focusing optical device that appropriately focuses each of the three light beams having different wavelengths on the signal recording surface of the corresponding optical disc so that spherical aberration is not generated. The objective lens 34C including the diffractive section 70 functions as a refractive element and as a diffractive element. That is, the objective lens has a refractive function derived from a curved lens surface and a diffractive function derived from the diffraction section 70 formed on one of the surfaces.

To be specific, as illustrated in FIGS. 5A and 5B, the diffraction section 70 is formed on the entry-side surface of the objective lens 34C. The diffraction section 70 includes the first region (inner annular zone) 51 formed in the innermost radius portion thereof, which is a substantially circular diffractive region. The diffraction section 70 includes the second region (middle annular zone") 52 formed outside the first region 51, which is an annular diffractive region. The diffraction section 70 includes the third region (outer annular zone) 73 formed outside the second region 52, which has an annular shape.

In the third region 73 (outer annular zone), a third diffractive structure having an annular shape and a predetermined depth is formed. The third diffractive structure has a structure different from those of the first and second diffractive structures. The third region 73 diffracts the light beam having the first wavelength passing therethrough so that diffracted light of an order that is focused by the objective lens 34C to form an appropriate spot on the signal recording surface of the first optical disc becomes dominant. That is, the third region 73 generates the diffracted light of this order with a higher diffraction efficiency than those of diffracted light of the other orders. In other words, the third region 73 (outer annular zone) diffracts the light beam having the first wavelength that passes therethrough so that the light beam is focused on the signal recording surface of the first optical disc by the objective lens 34C.

The third diffractive structure of the third region 73 diffracts the light beam having the second wavelength passing therethrough so that diffracted light of an order other than the order with which diffracted light is focused by the objective lens 34C to form an appropriate spot on the signal recording surface of the second optical disc becomes dominant. That is, the third region 73 generates the diffracted light of this order with a higher diffraction efficiency than those of diffracted light of the other orders. In other words, the third diffractive structure of the third region 73 diffracts the light beam having the second wavelength so that diffracted light of an order with which the objective lens 34C does not focus the light beam having the second wavelength to form an appropriate spot on the signal recording surface of the second optical disc becomes dominant. The third diffractive structure is formed with consideration of an effect of flaring. The third diffractive structure of the third region 73 diffracts the light beam having the second wavelength so that the diffraction efficiency of diffracted light of an order with which the objective lens 34C focuses the light beam having the second wavelength to form an appropriate spot on the signal recording surface of the second optical disc is sufficiently reduced. In other words, the third region 73 (outer annular zone) prevents the light beam having the second wavelength passing therethrough from being focused on the signal recording surface of the second optical disc by the objective lens 34C.

The third diffractive structure of the third region 73 diffracts the light beam having the third wavelength passing therethrough so that diffracted light beam of an order other than the light beams having an order that is focused by the objective lens 34C to form an appropriate spot on the signal recording surface of the third optical disc becomes dominant. That is, the third region 73 generates the diffracted light of this order with a higher diffraction efficiency than those of diffracted light of the other orders. In other words, the third diffractive structure of the third region 73 diffracts the light beam having the third wavelength so that diffracted light of an order with which the objective lens 34C does not focus the light beam having the third wavelength to form an appropriate spot on the signal recording surface of the third optical disc becomes dominant. The third diffractive structure is formed with consideration of an effect of flaring. The third diffractive structure of the third region 73 diffracts the light beam having the third wavelength so that the diffraction efficiency of diffracted light of an order with which the objective lens 34C focuses the light beam having the third wavelength to form an appropriate spot on the signal recording surface of the third optical disc is sufficiently reduced. In other words, the third region 73 (outer annular zone) prevents the light beam having the third wavelength passing therethrough from being focused on the signal recording surface of the third optical disc by the objective lens 34C.

Thus, the third region 73 has a diffractive structure that is configured so that each of the light beams having the first to third wavelengths is diffracted so that the diffracted light beam of the predetermined order becomes dominant. With this structure, spherical aberration, which is generated when the light beams having the first wavelength that has passed through the third region 73 and made into diffracted light beams of the predetermined orders are focused on the signal recording surface of the optical disc by the objective lens 34C, can be corrected and reduced.

The third region 73 acts on the light beam having the first wavelength as described above. Moreover, with consideration of the effect of flaring, the third region 73 is configured to diffract the light beams having the second and third wavelengths so that diffracted light beams of orders that are not focused by the objective lens 34C on the signal recording surfaces of the second and third optical discs become dominant. The third region 73 is configured with consideration of the effect of flaring. With such a configuration, when the light beams having the second and third wavelengths pass through the third region 73 and enter the objective lens 34C, the signal recording surfaces of the second and third optical discs are only negligibly affected. In other words, the third region 73 can act on the light beams having the second and third wavelengths so as to reduce the intensities of the light beams, which pass through the third region 73 and are focused on the signal recording surfaces by the objective lens 34C, to substantially zero and limit the apertures of the light beams. As with the second region 52, the third region 73 can limit the aperture of the light beam having the third wavelength.

The third region 73 is formed outside the second region 52, which is configured to limit the aperture of the light beam having the second wavelength to a numerical aperture NA of about 0.6. The third region 73 has a size for limiting the aperture of the light beam having the first wavelength that has passed therethrough to a numerical aperture NA of about 0.85. Because a diffractive structure is not formed in a region outside the third region 73, the light beam having the first wavelength that has passed this region is not focused on the first optical disc by the objective lens 34C. Therefore, the diffraction section 70 including the third region 73 functions so as to limit the aperture of the light beam having the first wavelength to a numerical aperture NA of about 0.85. Because the light beam having the first wavelength passing through the third region 73 is diffracted so that diffracted light beams of the first and fourth order become dominant, most of the 0-order light that has passed through the region outside the third region 73 is not focused on the first optical disc by the objective lens 34C. When focusing the 0-order light on the first optical disc by the objective lens 34C, a blocking portion for blocking a light beam may be formed in the region outside the third region 73 so as to limit the aperture of the light beam. The aperture of the light beam may be limited by providing a diffractive region having a diffractive structure that diffracts the light beam passing therethrough so that the diffracted light beams of the orders that are not focused on the first optical disc by the objective lens 34C become dominant. In this example, the diffraction section 70 limits the aperture of the light beam having the first wavelength to a numerical aperture NA of about 0.85. However, the numerical aperture to be limited with the structure described above is not limited thereto.

To be specific, as illustrated in FIGS. 5 and 10B, the third region 73 includes annular-zone-shaped structures centered around the optical axis having a cross-section having a blazed shape and a predetermined depth d.

The third region 73 (outer annular zone) has the blazed structure as described above. This is because forming a structure other than the blazed structure is very difficult in terms of productivity because the curved lens surface of the outer annular zone, which is at the outermost position, has the steepest slope. Because it is not necessary to consider the problems related to unwanted light and efficiency described above, sufficient performance can be obtained with the blazed structure. Although the third region 73 may have a staircase-like shape, the blazed shape is advantageous in view of the benefit described above.

Assume that the third region 73 diffracts the light beam having the first wavelength so that diffracted light of an order k1$o$ becomes dominant, i.e., the diffraction efficiency of the diffracted light of an order k1$o$ becomes the highest. Assume that the third region 73 diffracts the light beam having the second wavelength so that diffracted light of an order k2$o$ becomes dominant, i.e., the diffraction efficiency of the diffracted light of an order k2$o$ becomes the highest. Assume that the third region 73 diffracts the light beam having the third wavelength so that diffracted light of an order k3$o$ becomes dominant, i.e., the diffraction efficiency of the diffracted light of an order k3$o$ becomes the highest. In this case, when selecting the orders of diffraction k1$o$, k2$o$, and k3$o$, only the order and the diffraction efficiency for the first wavelength are to be considered. This is because the focal points of the light beams having the second and third wavelengths, which have predetermined levels of diffraction efficiencies, can be displaced from those when an image is formed in a flared state. To be specific, when (k1$o$, k2$o$, k3$o$)=(+4, +2, +2), predetermined efficiencies and the benefit of flaring can be obtained.

Figures 14A, 14B, 14C:
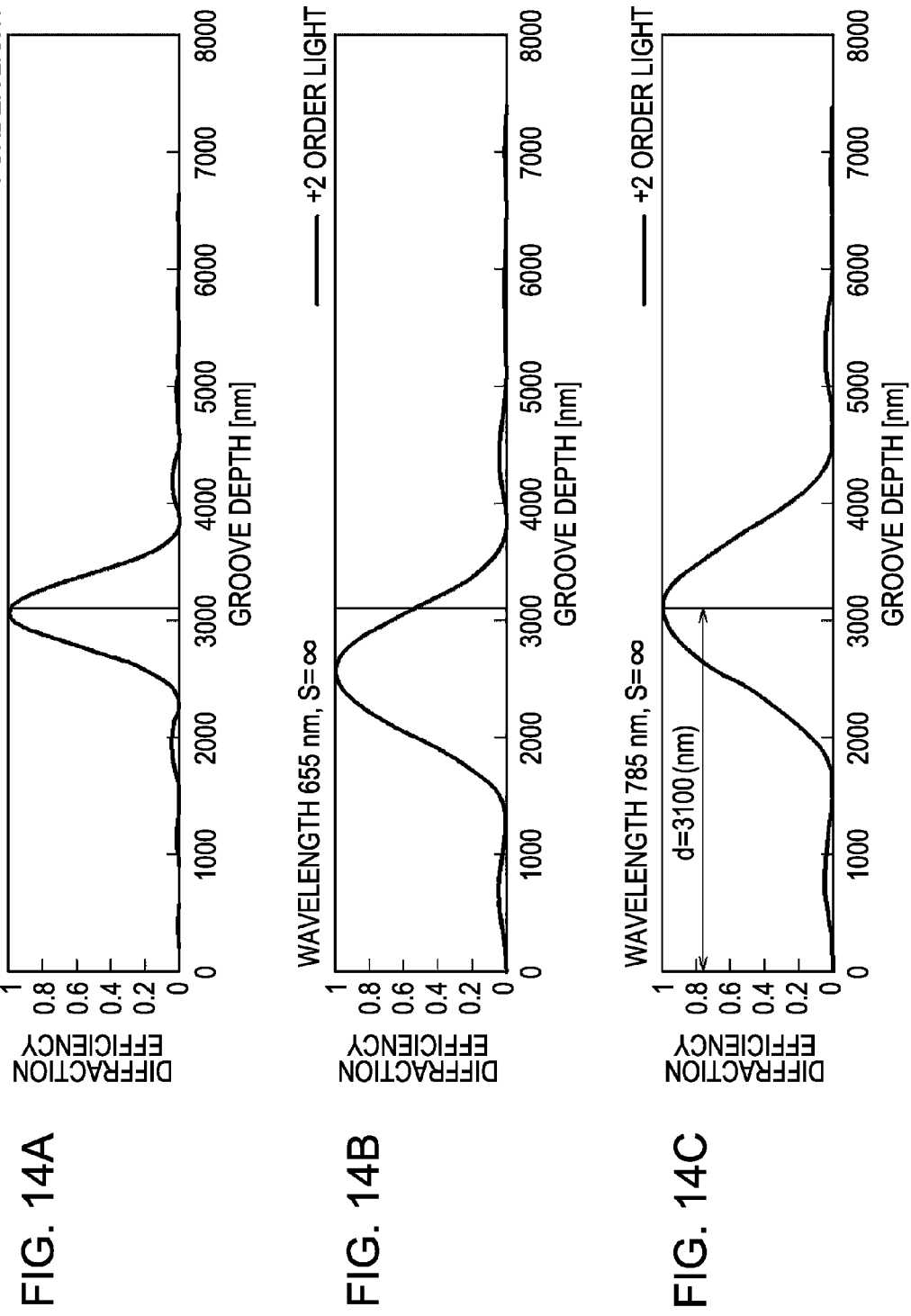
FIGS. 14A to 14C are graphs used for calculating the diffraction efficiencies for an example diffractive structure of the outer annular zone, illustrating the change in the diffraction efficiency for the light beams having the first to third wavelengths with respect to the groove depth d when S=∞ and (k1$o$, k2$o$, k3$o$)=(+4, +2, +2)

FIGS. 14A to 14C illustrate the change in the diffraction efficiency with respect to the groove depth d of a diffractive structure having the blazed shape (S=∞) and (k1$o$, k2$o$, k3$o$)=(+4, +2, +2), which is a specific example of the structure of the outer annular zone. FIG. 14A illustrates the change in the diffraction efficiency of the +4-order diffracted light of the light beam having the first wavelength when the groove depth d of the blazed shape having the number of steps S=∞ is changed. FIG. 14B illustrates the change in the diffraction efficiency of the +2-order diffracted light of the light beam having the second wavelength when the groove depth d of the blazed shape having the number of steps S=∞ is changed. FIG. 14C illustrates the change in the diffraction efficiency of the +2-order diffracted light of the light beam having the third wavelength when the groove depth d of the blazed shape having the number of steps S=∞ is changed. In FIGS. 14A to 14C, the horizontal axis represents the groove depth (nm), and the vertical axis represents the diffraction efficiency (intensity of light). As illustrated in FIG. 14A, eff1 is 1.0 when the groove depth d is 3100 nm. For the same groove depth d, eff2 is about 0.6 as illustrated in FIG. 14B and the spot is flared, and eff3 is about 1.0 as illustrated in FIG. 14C and the spot is flared. The points to be flared are the same as those for the middle annular zone described above. Because it is sufficient that the design line passes through only the point Pλ1, the degree of freedom is relatively high. By using flaring, even if diffraction efficiency of the light beam having the second wavelength exists as illustrated in FIG. 14B, this light beam does not contribute to forming of an image. Thus, the aperture of the light beam having the second wavelength can be limited to an appropriate level (NA=0.6). Even if diffraction efficiency of a light beam having the third wavelength exists as illustrated in FIG. 14C, this light beam does not contribute to the forming of an image, so that an appropriate aperture limiting (NA=0.45) can be performed.

The diffraction section 70, which includes the first to third regions 51, 52, and 73 having the structures described above, acts on each of the light beams having first to third wavelengths that passes therethrough in a predetermined manner. The diffraction section 70 diffracts each of the light beams having the first to third wavelengths that passes through the first region 51 to be in a state having an appropriate divergence angle so that aberration is not generated on the recording surface of the corresponding optical disc with the refractive power of the objective lens 34C that is common to the three wavelengths. Using the refractive power of the objective lens 34C, the diffraction section 70 can focus an appropriate spot on the signal recording surface of the corresponding optical disc. The diffraction section 70 diffracts each of the light beams having the first and second wavelengths that passes through the second region 52 to be in a state having an appropriate divergence angle so that aberration is not generated on the recording surface of the corresponding optical disc with the refractive power of the objective lens 34C that is common to the three wavelengths. Using the refractive power of the objective lens 34C, the diffraction section 70 can focus an appropriate spot on the signal recording surface of the corresponding optical disc. The diffraction section 70 diffracts the light beam having the first wavelength that passes through the third region 73 to be in a state having an appropriate divergence angle so that aberration is not generated on the recording surface of the corresponding disc with the refractive power of the objective lens 34C. Moreover, the diffraction section 70 can focus an appropriate spot on the signal recording surface of a corresponding optical disc with the refractive power of the objective lens 34C.

That is, the diffraction section 70, which is formed on a surface of the objective lens 34C disposed on the optical path in the optical system of the optical pickup 3 between the first to third emitters and the signal recording surface, produces the following effect. The diffraction section 70 can provide a diffractive power and a refractive power to each of the light beams having the first to third wavelengths that passes through the corresponding regions (the first to third regions 51, 52, and 73) so that spherical aberration generated on the signal recording surfaces is reduced. Therefore, the diffraction section 70 can maximally reduce the spherical aberration generated on the signal recording surface when each of the light beams having the first to third wavelengths is focused on the signal recording surface of the corresponding optical disc by the common objective lens 34C of the optical pickup 3. That is, the diffraction section 70 realizes three-wavelength compatibility of the optical pickup including the objective lens 34C common to the three wavelengths and the three types of optical discs, so that information signals can be appropriately recorded on and/or reproduced from the optical discs.

Owing to the functions of the first and second regions 51 and 52 and the function of the third region 73, the diffraction section 70 formed on a surface of the objective lens 34C and the objective lens including the diffraction section 70 have functions and advantages the same as those of the diffraction section 50 described above and the objective lens 34 including the diffraction section 50. That is, because the first region 51 (inner annular zone) includes a diffractive structure modified from an equal-step-width structure as illustrated in FIG. 8A, excellent recording and reproduction characteristics can be realized irrespective of variations in temperature and wavelength, as will be described in the section [5]. This is because the diffractive structure formed in the first region 51 suppresses generation of unwanted diffracted light due to variations in environmental conditions and prevents servo from becoming unstable.

[5. Technique for Preventing Increase in Unwanted Diffracted Light Due to Variations in Temperature and Wavelength]

Problems

Three wavelength compatibility of each of the objective lenses 34 and 34C are achieved by dividing the diffractive region on the entry side surface into two or more zones and appropriately setting the orders of diffraction of the inner annular zone and the middle annular zone. The inner annular zone, which has a diffractive structure for which, for example, (k1$i$, k2$i$, k3$i$)=(+1, −2, −3) is selected, has favorable characteristics when the diffractive structure has a staircase-like shape with an equal step width as illustrated in FIG. 8B. At room temperature, the inner annular zone can fully exhibit such characteristics. However, the inventor has found that there is a problem in that the diffraction efficiencies of unwanted orders of light increase when the temperature varies and when the emission wavelength of laser varies. The increase in the unwanted diffracted light causes instability in servo because the unwanted light influences the focus signal in particular for a double-layer optical disc. When servo becomes unstable, jitter generated in the output signals may increase.

<Unwanted Order of Diffraction>

The unwanted order of diffraction will be described in detail using an example when (k1$i$, k2$i$, k3$i$)=(+1, −2, −3). As described above, when a diffractive structure where (k1$i$, k2$i$, k3$i$)=(+1, −2, −3) is formed in the inner annular zone and a certain refractive index is assumed, a staircase-like diffractive structure having six steps and seven levels and an equal step width of about 5.4 μm can be used. The relationship between the depth and the efficiency for this case is illustrated in FIGS. 9A to 9C. FIGS. 9A to 9C illustrate not only the diffraction efficiency of the diffracted light beam of an order selected as the normal light but also the diffraction efficiencies of adjacent unwanted light of adjacent orders.

As an example of variations in environmental conditions, a case in which refractive index decreases due to increase in temperature will be considered. When the refractive index decreases, the optical path difference between air and the objective lens decreases, which is equivalent to decrease in the groove depth in FIGS. 9A to 9C. As a result, as illustrated in FIG. 9B, for the second wavelength λ2 corresponding to the second optical disc (DVD), the efficiency of the −2-order light (normal light) decreases and the efficiency of the −3-order light (unwanted light) increases. To be specific, in FIG. 9B, the groove depth decreases slightly from 5400 nm.

On the contrary, when the temperature decreases, the refractive index increases, which is equivalent to increase in the groove depth. As a result, for the first optical disc (BD), the efficiency of +1-order light (normal light) decreases and the efficiency of −2-order light (unwanted light) increases.

A similar phenomenon occurs when the wavelength varies. That is, when the wavelength increases, the groove depth for the wavelength decreases, the amount of normal light for the second optical disc (DVD) decreases and the amount of unwanted light increases. On the contrary, when the wavelength decreases, the efficiency of the normal light for the first optical disc (BD) decreases and the efficiency of unwanted light increases. This phenomenon occurs in accordance with the peak positions of the groove depth-diffraction efficiency curves when the orders and the groove depth are selected as illustrated in FIGS. 9A to 9C.

As illustrated in FIG. 9C, for the third optical disc (CD), the depth d=5400 nm corresponds to the vertex of the groove depth-diffraction efficiency curve. Therefore, the third optical disc is basically resistant to variations in wavelength and temperature, and the variation ratio thereof is negligible as compared with those of the first and second optical discs (BD, DVD).

Figure 15:
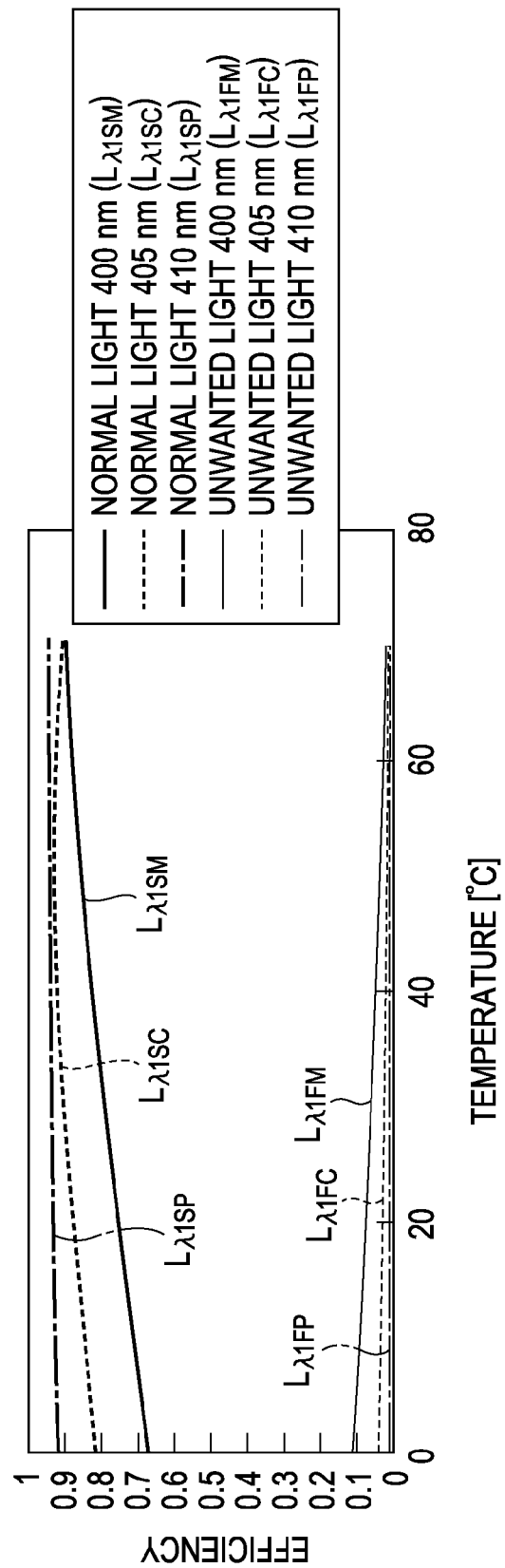
FIG. 15 is a graph illustrating the efficiency of light beams for a first optical disc (BD) with respect to variations in environmental conditions, in which variations in the efficiency of normal light and unwanted light with respect to variation in temperature are illustrated for each of predetermined wavelengths.
Figure 16:
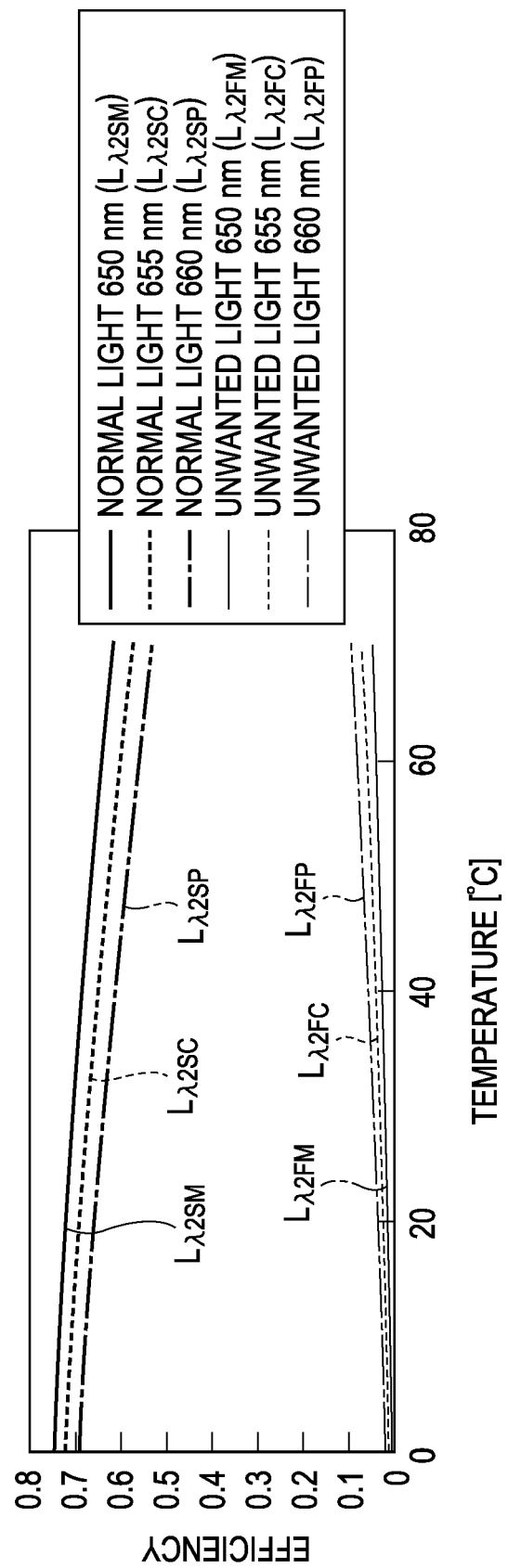
FIG. 16 is a graph illustrating the efficiency of light beams for a second optical disc (DVD) with respect to variations in environmental conditions, in which variations in the efficiency of normal light and unwanted light with respect to variation in temperature are illustrated for each of predetermined wavelengths.
Figure 17:
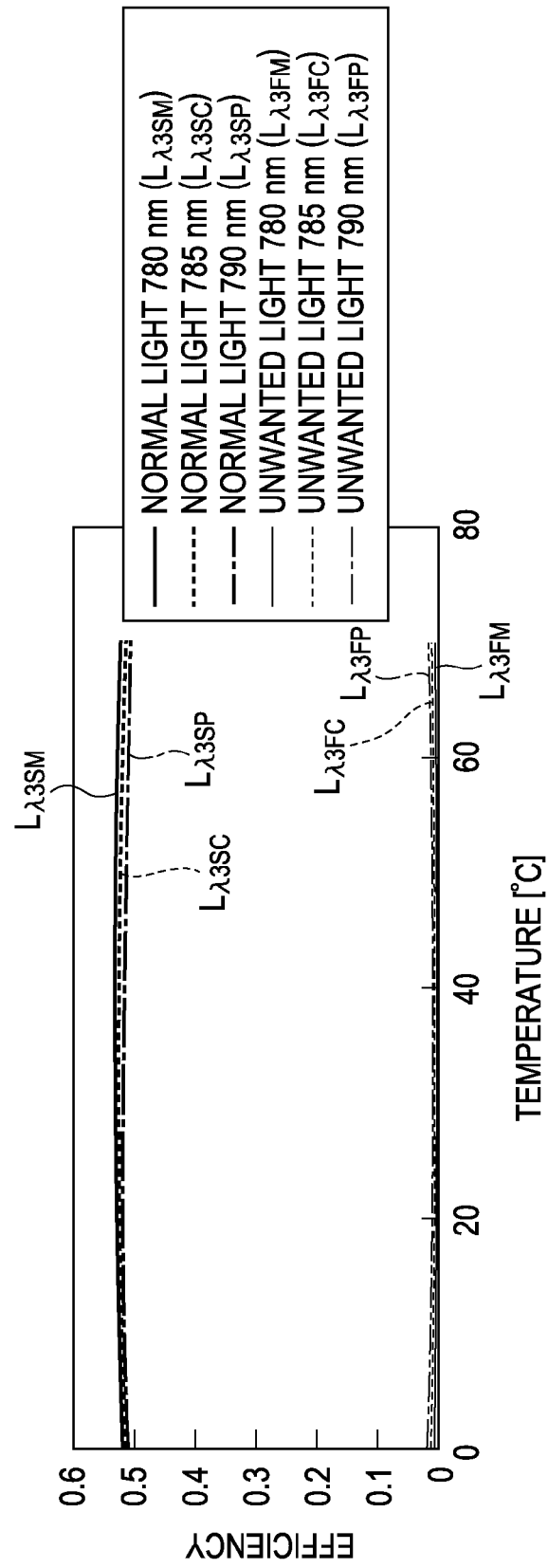
FIG. 17 is a graph illustrating the efficiency of light beams for a third optical disc (CD) with respect to variations in environmental conditions, in which variations in the efficiency of normal light and unwanted light with respect to variation in temperature are illustrated for each of predetermined wavelengths.

FIGS. 15 to 17 illustrate examples of calculations of variation in the efficiency when the wavelength and the temperature vary. FIG. 15 illustrates the variation in the efficiency due to variations in environmental conditions (also referred to as "environmental efficiency variation") for the first optical disc (BD). FIG. 16 illustrates the environmental efficiency variation for the second optical disc (DVD). FIG. 17 illustrates the environmental efficiency variation for the third optical disc (CD).

In FIG. 15, the line $L\lambda_{1SC}$ represents the change in the efficiency of a light beam having a wavelength of 405 nm, which is the center wavelength of normal light of the first wavelength λ1 corresponding to the first optical disc caused by the change in the temperature. The term "normal light" refers to diffracted light of an order (for example, k1$i$) selected when forming a diffractive structure. The line $L\lambda_{1SM}$ represents the change in the efficiency of a light beam having a wavelength of 400 nm, which is shorter than the center wavelength of normal light of the first wavelength λ1 caused by the change in the temperature. The line $L\lambda_{1SP}$ represents the change in the efficiency of a light beam having a wavelength of 410 nm, which is longer than the center wavelength of normal light of the first wavelength λ1 caused by the change in the temperature. The line $L\lambda_{1FC}$ represents the change in the efficiency of a light beam having a wavelength of 405 nm, which is unwanted light of the first wavelength λ1 caused by the change in the temperature. The lines $L\lambda_{1FM}$ and $L\lambda_{1FP}$ represent the changes in the efficiency of the light beams having wavelengths of 400 nm and 410 nm, which are unwanted light of the first wavelength λ1 caused by the change in the temperature. It is assumed that the temperature axis also represents the change in the laser wavelength due to the change in the temperature.

In FIG. 16, the line $L\lambda_{2SC}$ represents the change in the efficiency of a light beam having a wavelength of 655 nm, which is the center wavelength of normal light of the second wavelength λ2 corresponding to the second optical disc caused by the change in the temperature. The lines $L\lambda_{2SM}$ and $L\lambda_{2SP}$ represent the change in the efficiency of a light beam having a wavelength of 650 nm and 660 nm, which are respectively shorter and longer than the center wavelength of normal light of the second wavelength λ2 caused by the change in the temperature. The lines $L\lambda_{2FC}$, $L\lambda_{2FM}$, and $L\lambda_{2FP}$ respectively represent the change in the efficiency of light beams having wavelengths of 655 nm, 650 nm, and 660 nm, which are unwanted light of the second wavelength λ2 caused by the change in the temperature.

In FIG. 17, the line $L\lambda_{3SC}$ represents the change in the efficiency of a light beam having a wavelength of 785 nm, which is the center wavelength of normal light of the third wavelength λ3 corresponding to the third optical disc caused by the change in the temperature. The lines $L\lambda_{3SM}$ and $L\lambda_{3SP}$ represent the change in the efficiency of a light beam having a wavelength of 780 nm and 790 nm, which are respectively shorter and longer than the center wavelength of normal light of the third wavelength λ3, caused by the change in the temperature. The lines $L\lambda_{3FC}$, $L\lambda_{3FM}$, and $L\lambda_{3FP}$ respectively represent the change in the efficiency of light beams having wavelengths of 785 nm, 780 nm, and 790 nm, which are unwanted light of the third wavelength λ3, caused by the change in the temperature.

According to FIGS. 15 to 17, depending on the temperature and the initial wavelength of the laser, the efficiency of light of an order of diffraction adjacent to the order of normal light (hereinafter also referred to as "unwanted light") increases sharply. In particular, the term "unwanted light" refers to the diffracted light of an adjacent order that more likely causes a negative effect, i.e., has a higher diffraction efficiency than the other adjacent order.

<Focus Error Signal>

Next, the influence of the variation in the efficiency of unwanted diffracted light, due to variations in environmental conditions, on the focus error signal will be described. The focus error signal, which is generated when performing focus servo control for an optical disc using an optical pickup including the objective lens, is schematically represented with a curve illustrated in FIG. 18. FIG. 18 illustrates focus search waveforms of a normal signal and an unwanted signal. In FIG. 18, the curve $L_{FOS}$ represents the normal signal of the focus error signal obtained from the normal light, and the curve $L_{FOF}$ represents the unwanted signal of the focus error signal generated from the unwanted diffracted light. The distance $\Delta_{FOSF}$ is the distance between the center of the normal signal and the center of the unwanted signal.

The normal signal, which is represented by the curve $L_{FOS}$ in FIG. 18, is obtained from the sum of forward and returning light beams of the normal orders of diffraction for the inner, middle, and outer annular zones. The unwanted signal is generated from the combination of forward and returning light beams of the unwanted orders of diffraction and the normal order of diffraction for the inner annular zone. Table 1 illustrates the relationship between the normal light and the unwanted light and the normal signal and the unwanted signal when the middle annular zone and the outer annular zone are appropriately selected. The focus error signal illustrated in Table 1 may cause a problem for a double-layer optical disc.

TABLE 1

|  |  | Forward Path | | Return Path | |
| --- | --- | --- | --- | --- | --- |
|  |  | Annular Zone | Order of Diffraction | Annular Zone | Order of Diffraction |
| First Optical Disc (BD) | Normal Signal (Sum) | Inner Annular Zone | 1 | Inner Annular Zone | 1 |
|  |  | Middle Annular Zone | 0 | Middle Annular Zone | 0 |
|  |  | Outer Annular Zone | 2 | Outer Annular Zone | 2 |
|  | Unwanted Signal (Sum) | Inner Annular Zone | 1 | Inner Annular Zone | 2 |
|  |  | Inner Annular Zone | 2 | Inner Annular Zone | 1 |
| Second Optical Disc (DVD) | Normal Signal (Sum) | Inner Annular Zone | −2 | Inner Annular Zone | −2 |
|  |  | Middle Annular Zone | −1 | Middle Annular Zone | −1 |
|  | Unwanted Signal (Sum) | Inner Annular Zone | −2 | Inner Annular Zone | −3 |
|  |  | Inner Annular Zone | −3 | Inner Annular Zone | −2 |
| Third Optical Disc (CD) | Normal Signal | Inner Annular Zone | −3 | Inner Annular Zone | −3 |
|  | Unwanted Signal (Sum) | Inner Annular Zone | −2 | Inner Annular Zone | −3 |
|  |  | Inner Annular Zone | −3 | Inner Annular Zone | −2 |

Table 1 will be explained additionally. The term "normal signal (sum)" used in Table 1 refers to the normal signal obtained from the sum of the normal light beams for the inner annular zone, the middle annular zone, and the outer annular zone. The normal light beam for the inner annular zone is the combination of the +1-order light passing through the inner annular zone, which is the normal light beam on the forward path, and the +1-order light passing through the inner annular zone, which is the normal light beam on the return path. The same applies to the middle annular zone and the outer annular zone.

The term "unwanted signal" used in Table 1 refers to a signal obtained from the combination of +1-order light, which is the normal light beam on the forward path, and +2-order light, which is unwanted light on the return path, and a signal obtained from a combination of +2-order light, which is an unwanted light on the forward path, and +1-order light, which is the light beam on the return path.

If the unwanted signal is larger than the normal signal and the separation distance Δ between the normal signal and the unwanted signal is the same as the optical distance between the two layers of a double-layer optical disc, the unwanted signal of the first layer overlaps the normal signal of the second layer as illustrated in FIG. 19. In FIG. 19, the lines $L_{FOS1}$ and $L_{FOS2}$ respectively represent normal signals of the focus error signals obtained from the normal light from the first layer and the second layer of a double-layer optical disc. The lines $L_{FOF1}$ and $L_{FOF2}$ respectively represent unwanted signals of the focus error signals obtained from the unwanted light from the first layer and the second layer of a double-layer optical disc. When reading the signal represented by $L_{FOS2}$ in FIG. 19 from the second layer, the unwanted signal for the first layer leaks into the normal signal for the second layer as described above. If the interlayer thickness of the optical disc is constant, the influence on focusing can be suppressed to some extent. In reality, however, the interlayer thickness varies in accordance with the position in the optical disc, for example, by a distance represented by v. As a result, the interference position of the unwanted signal and the normal signal varies as the disc rotates, so that the focus servo becomes extremely unstable. In this example, the astigmatic method is used for focus servo. However, this problem is not solved by using other technique, and the focus servo is not stabilized unless the unwanted signal is reduced. If the unwanted signal is generated in the opposite direction, reading of the first layer becomes unstable. It is assumed in the subsection "Unwanted Order of Diffraction" above that the combination of adjacent orders and the normal light is the position of the unwanted signal that is closest to the normal signal and substantially equal to the interlayer distance of a double-layer optical disc. Unwanted signal for the other combination of orders is substantially thicker than the interlayer distance of the double-layer optical disc and does not influence the normal signal.

Solutions

There are two techniques for solving the problem. A first technique is to change the focal length so as to separate the position of the unwanted signal from that of the normal signal and make the separation distance Δ to a position outside the double-layer optical disc format. A second technique is to reduce the efficiency of unwanted light to a level that does not cause a problem for any variations in environmental conditions.

<Separation of Unwanted Signal>

The first technique for separating the position of the unwanted signal from that of the normal signal will be described. In general, the surface power $P_{dif}$ of a diffractive structure is represented by the following expression (2), where k is the order of diffraction, $C_1$ is the second-order coefficient of the phase difference function of the diffractive structure, λ is the wavelength, and $λ_0$ is the production wavelength.

$$P_{dif} = 2kC_1 \frac{\lambda}{\lambda_0} \quad (2)$$

The total power $P_1$ of an entry-side surface is represented by the following expression (4) using the surface power of a sphere $P_r$ represented by the following expressions (3), where $n_i$ is the refractive index for the corresponding wavelength, and $r_1$ is the radius of curvature of the entry-side surface.

$$P_r = \frac{n_i - 1}{r_1} \quad (3)$$

$$P_1 = P_{dif} + P_r \quad (4)$$

According to geometrical optics, the total lens power $P_{all}$ is represented by the following expression (7) using the power of the emission surface $P_2$ represented by the following expression (5) and the value e represented by the following expression (6), where $r_2$ is the radius of curvature of the emission surface (if the lens is biconvex, $r_1 > 0$ and $r_2 < 0$), and d is the thickness of the lens along the optical axis.

$$P_2 = \frac{1 - n_i}{r_2} \quad (5)$$

$$e = \frac{d}{n_i} \quad (6)$$

$$P_{all} = P_1 + P_2 - P_1 \cdot P_2 \cdot e \quad (7)$$

As can be seen from these expressions, because the order of diffraction k in the expression (2) is different for the normal diffracted light and the unwanted diffracted light, the value of $P_{all}$, which is calculated using the expression (7), is different in accordance with the order of diffraction.

Let $P_{allreal}$ denote the total lens power for the normal light, $P_{allfake}$ denote the total lens power for the unwanted diffracted light, and Δcalc denote the difference in the focal position of at which the light beam is focused by the lens. Then, a relationship represented by the following expression (8) holds. In the expression (8), $n_d$ is the refractive index of the optical disc, which is used for conversion to a distance in the optical disc. The focal position difference Δcalc corresponds to the separation distance between the substantially normal signal and the unwanted signal.

$$\Delta_{calc} = -n_d \left( \frac{1}{P_{allreal}} - \frac{1}{P_{allfake}} \right) \quad (8)$$

Figure 20A:
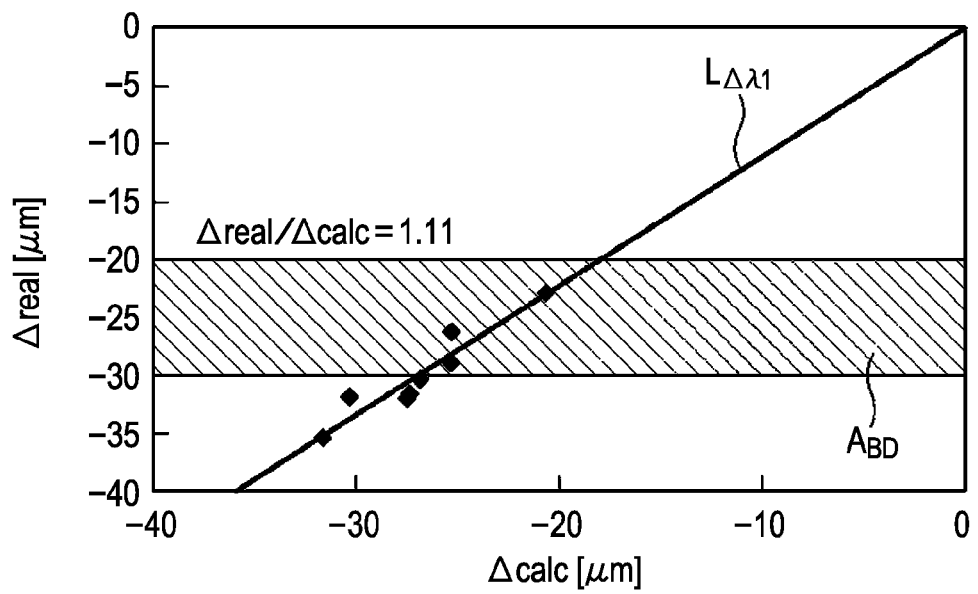
Figure 20B:
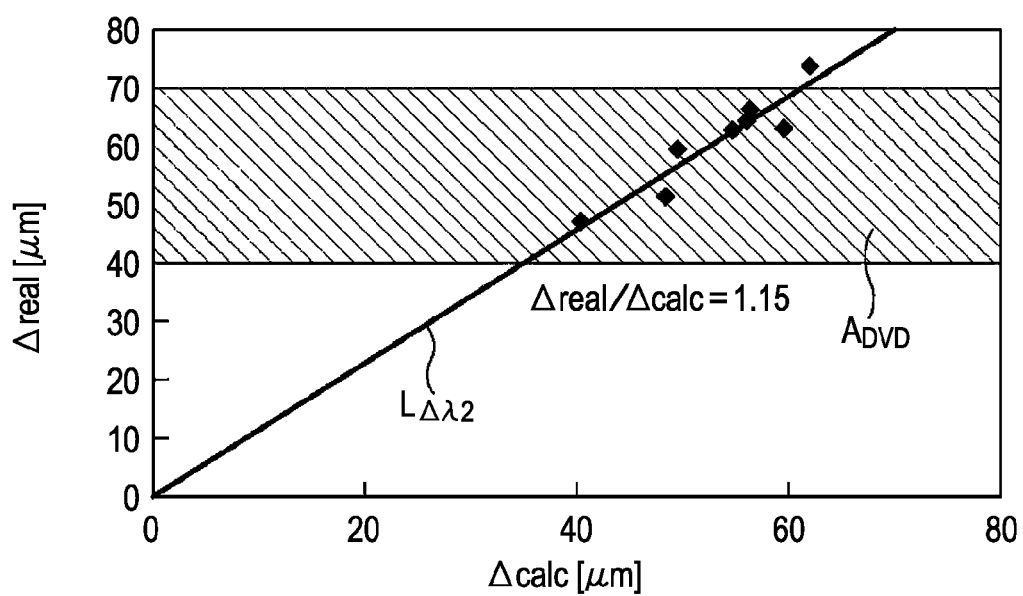

FIGS. 20A and 20B illustrate simulation results for the relationship between Δcalc and Δreal, where Δreal is the real distance between the normal signal and the unwanted signal in the optical disc (also referred to as "normal signal-unwanted signal distance"). In FIG. 20A, $LΔλ_1$ is the line connecting the simulation results for the first wavelength λ1. In FIG. 20B, $LΔλ_2$ is the line connecting the simulation results for the second wavelength λ2. In these simulations, the lenses are optically designed in details and the longitudinal aberration of light beams of orders that constitute the signal are averaged, so that positions of the unwanted signals are approximately calculated. In these simulations, parameters shown in Table 2 are used. The values of Δcalc shown in Table 2 are calculated using the expressions (2) to (8). Negative values of Δreal and Δcalc indicate that the unwanted light forms an image in front of the signal surface of the disc.

TABLE 2

| | Material | | Lens Shape | | | | Normal Diffraction Order | | | Unwanted Light Diffraction Order | | Δreal [μm] | | Δcalc [μm] | |
|---|---|---|---|---|---|---|---|---|---|---|---|---|---|---|---|
| | | | r1 | r2 | d | | k1im | k2im | k3im | k1is | k2is | First Wavelength | Second Wavelength | First Wavelength | Second Wavelength |
| f1 | n1 | n2 | [mm] | [mm] | [mm] | c1 | (BD) | (DVD) | (CD) | (BD) | (DVD) | λ1 | λ2 | λ1 | λ2 |
| 2.2 | 1.56 | 1.54 | 1.48 | −2.73 | 2.67 | 5.85E−03 | 1 | −2 | −3 | 2 | −3 | −22.9 | 47.0 | −20.8 | 40.3 |
| 2 | 1.56 | 1.54 | 1.35 | −2.51 | 2.43 | 9.15E−03 | 1 | −2 | −3 | 2 | −3 | −30.2 | 62.8 | −26.9 | 54.7 |
| 1.98 | 1.56 | 1.54 | 1.34 | −2.46 | 2.41 | 9.54E−03 | 1 | −2 | −3 | 2 | −3 | −31.5 | 64.2 | −27.3 | 56.0 |
| 1.96 | 1.56 | 1.54 | 1.33 | −2.41 | 2.39 | 9.87E−03 | 1 | −2 | −3 | 2 | −3 | −31.9 | 66.4 | −27.5 | 56.4 |
| 2.2 | 1.56 | 1.54 | 1.49 | −2.74 | 2.68 | 8.95E−03 | 1 | −1 | −2 | 2 | −2 | −35.2 | 73.9 | −31.7 | 62.0 |
| 2 | 1.52 | 1.51 | 1.31 | −2.44 | 2.25 | 8.01E−03 | 1 | −1 | −2 | 2 | −2 | −26.3 | 51.5 | −25.3 | 48.3 |
| 1.92 | 1.52 | 1.51 | 1.24 | −2.45 | 2.19 | 1.03E−02 | 1 | −1 | −2 | 2 | −2 | −31.7 | 63.3 | −30.3 | 59.4 |
| 1.92 | 1.52 | 1.51 | 1.23 | −2.13 | 2.30 | 9.44E−03 | 0 | −2 | −3 | 1 | −3 | −29.0 | 59.4 | −25.4 | 49.5 |

Figure 21A:
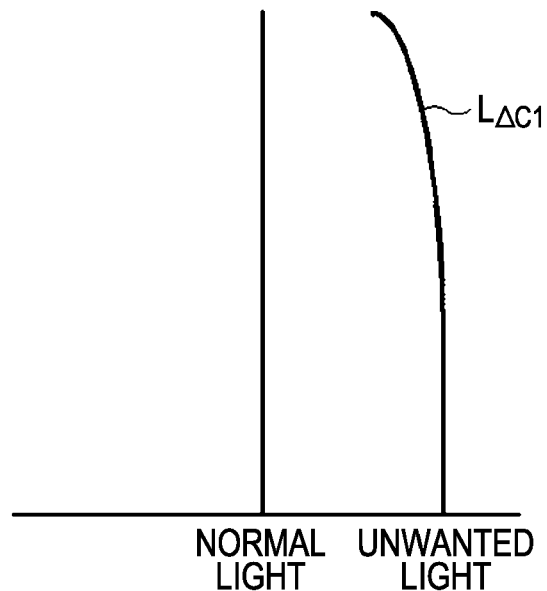
Figure 21B:
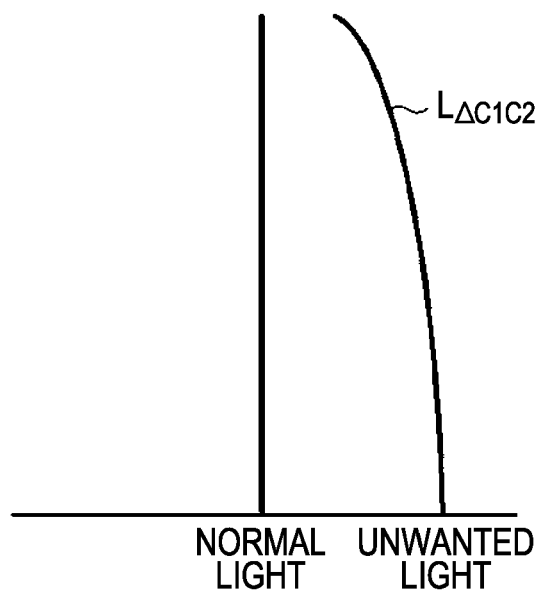

The values of Δcalc and Δreal would be equal if the lens can be designed with only consideration of the lens power. However, these value are not equal in an actual lens. FIGS. 21A and 21B schematically illustrate this. That is, an actual lens is designed with consideration of the coefficient C2 in addition to the coefficient C1 in order to correct spherical aberration. The curvature of longitudinal aberration with consideration of both the coefficient C1 and the coefficient C2 is larger than the curvature of longitudinal aberration with consideration of only the coefficient C1. Therefore, on average, the focal point approaches that of the normal light. As a result, Δreal, which is represented by $LΔ_{C1C2}$ in FIG. 21B, is larger than Δcalc, which is represented by $LΔ_{C1}$ in FIG. 21A. Because the contribution of the coefficient C2 is proportional to the wavelength, Δreal/Δcalc for the second wavelength λ2 corresponding to DVD and the like is larger than Δreal/Δcalc for the first wavelength λ1 corresponding to BD and the like.

In general, the interlayer thickness of a double-layer disc in the DVD format is in the range of 40 μm to 70 μm (a test disc made by ALMEDIO INC.). In general, the interlayer thickness of a double-layer optical disc in the BD format is in the range of 20 μm to 30 μm ("Zukai Blu-ray Disc Dokuhon" edited by Horoshi Ogawa and Shin-ichi Tanaka). The range for BD is represented by $A_{BD}$ in FIG. 20A, and the range for DVD is represented by $A_{DVD}$ in FIG. 20B. In FIGS. 20A and 20B, a positive value on the vertical axis indicates that an unwanted signal is generated in front of the optical disc, and a negative value on the vertical axis indicates that an unwanted signal is generated behind the optical disc. As can be seen from FIG. 20A, in order to avoid the interlayer thickness of a double-layer optical disc in the BD format, the following expression (9) or (10) is to be satisfied.

$$ΔcalcBD ≤ −27 \, μm \tag{9}$$

$$ΔcalcBD ≥ −18 \, μm \tag{10}$$

It is not necessary to avoid the unwanted signal for DVD because the unwanted signal for DVD can be reduced at the expense of the unwanted signal for BD using the techniques of "changing the depth of a diffractive structure" or the technique of "nonperiodic structure" described below. However, by avoiding the unwanted signal for DVD, the problem is more satisfactorily resolved. In order to avoid the unwanted signal for DVD, the following expression (11) or (12) is to be satisfied.

$$ΔcalcDVD ≤ 35 \, μm \tag{11}$$

$$ΔcalcDVD ≥ 61 \, μm \tag{12}$$

That is, when one of the expression (9) to (12) is satisfied, a minimum requirement for avoiding unwanted light is satisfied. Among the expressions (9) to (12), the expressions (10) and (11) represents avoiding the unwanted light toward a shorter side. Thus, if the expression (10) or (11) is satisfied, although light of adjacent unwanted order can be avoided, the influence of the unwanted light of the next order, i.e., the influence of the second and third unwanted diffracted light is not avoided. Therefore, it is desirable that the expression (9) or the expression (12) be satisfied. If both the expressions (9) and (12) are satisfied, the influence of the unwanted light can be sufficiently reduced without using the techniques of "changing depth of diffractive structure" and "nonperiodic structure" described below.

In summary, when a three-wavelength compatible objective lens is formed so as to satisfy one of the following expressions (13) to (16), unwanted light can be separated and the influence of the unwanted light can be avoided. In the expressions (13) to (16), $n_{d1}$ represents the refractive index of an optical disc (the refractive index of the material forming a optical path in the optical disc) for the first wavelength λ1, and $n_{d2}$ represents the refractive index of the optical disc for the second wavelength λ2. k1im, k2im, and k3im are the same as k1i, k2i, and k3i described above, and respectively represent the orders having the highest diffraction efficiency for the first to third wavelength λ1, λ2, and λ3 in the diffractive structure formed in the first region 51. k1is represents one of the orders adjacent to k1im having a higher diffraction efficiency, k2is represents one of the orders adjacent to k2im having a higher diffraction efficiency, and k3is represents one of the orders adjacent to k3im having a higher diffraction efficiency. $P_{1m}$ represents the total lens power applied to the light beam of the order k1im, which is generated by the diffractive power of the diffraction section and refractive powers of the curved surfaces on the entry side and the exit side of the objective lens. $P_{2m}$ represents the total lens power applied to the light beam of the order k2im, which is generated by the diffractive power of the diffraction section and the refractive powers of the curved surfaces on the entry side and the exit side of the objective lens. $P_{1s}$ represents the total lens power applied to the light beam of the order k1is, which is generated by the diffractive power of the diffraction section and the refractive powers of the curved surfaces on the entry side and the exit side of the objective lens. $P_{2s}$ represents the total lens power applied to the light beam of the order k2is, which is generated by the diffractive power of the diffraction section and the refractive powers of the curved surfaces on the entry side and the exit side of the objective lens. Because the light beams described here are the light beams of the orders of diffraction diffracted by the inner annular zone, the diffractive power of the diffraction section is the diffractive power generated by the diffractive structure formed in the first region 51. To be specific, $P_{1m}$, $P_{2m}$, $P_{1s}$, and $P_{2s}$ are calculated by the expressions (2) to (7).

$$n_{d1}\left|\frac{1}{P_{1m}} - \frac{1}{P_{1s}}\right| \geq 27 \; \mu m, \tag{13}$$

$$n_{d1}\left|\frac{1}{P_{1m}} - \frac{1}{P_{1s}}\right| \leq 18 \; \mu m, \tag{14}$$

$$n_{d2}\left|\frac{1}{P_{2m}} - \frac{1}{P_{2s}}\right| \geq 61 \; \mu m, \tag{15}$$

$$n_{d2}\left|\frac{1}{P_{2m}} - \frac{1}{P_{2s}}\right| \leq 35 \; \mu m \tag{16}$$

To be precise, the separation amount of the unwanted signal described above varies slightly owing to variations in wavelength and temperature. Because the influence of an adjacent unwanted signal is within the range of several percent, when the objective lens is formed in accordance with FIGS. 20A to 21B and the expressions described above, a predetermined effect can be obtained.

<Reduction of Unwanted Signal—Changing Depth of Diffractive Structure and Changing Focal Length>

Next, techniques for reducing the amount of unwanted signal will be described. There are two types of techniques for reducing the amount of unwanted signal.

Figure 22:
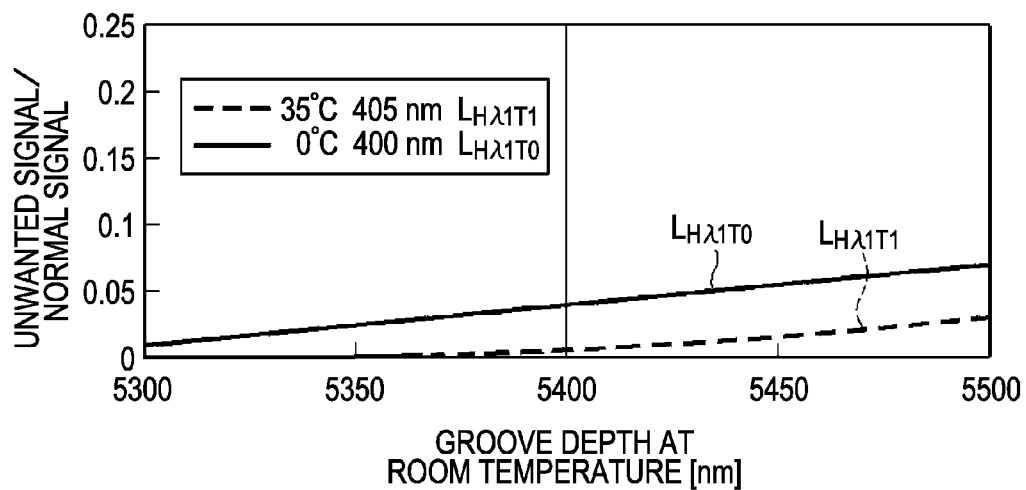
FIG. 22 is a graph illustrating the change in the unwanted signal/normal signal ratio for the first optical disc (BD) with respect to the change in the groove depth of a diffractive structure having an equal-step-width staircase-like shape.
Figure 23:
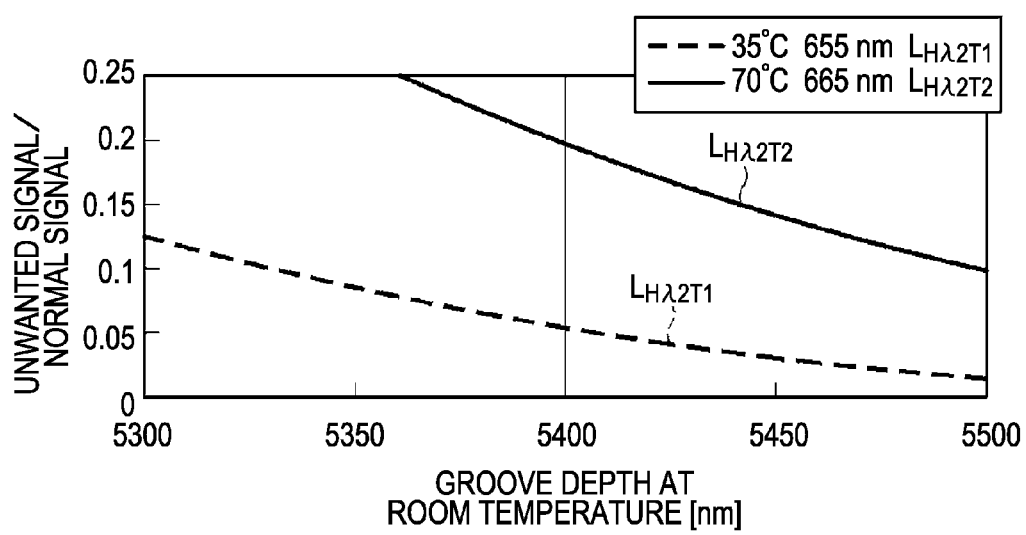

One is a technique of changing the ratio of the efficiencies of the first, second, and third optical discs (BD, DVD, and CD) to the variations in temperature and wavelength by changing the depth of the diffractive structure in the inner annular zone from the equal-step-width staircase-like shape, which is the reference design. This technique is based on the fact that, as can be seen from FIGS. 9A to 9C, there is a certain relationship between the depth of the diffractive structure and the efficiency of the unwanted light. FIGS. 22 and 23 illustrate the ratio of the normal focus error signal to the unwanted focus error signal for the lens having a focal length f=2.2 mm designed for BD. In FIGS. 22 and 23, the horizontal axis represents the groove depth at room temperature (nm) and the vertical axis represents the ratio of the unwanted signal to the normal signal (hereinafter also referred to as "unwanted signal/normal signal ratio" or "unwanted signal/normal signal"). In FIG. 22, the line $L_{H\lambda 1T1}$ represents the variation in the unwanted signal/normal signal ratio with respect to the groove depth when the first wavelength λ1 of 405 nm and the temperature is 35° C. The line $L_{H\lambda 1T0}$ represents the variation in the unwanted signal/normal signal ratio with respect to the groove depth when the wavelength is 400 nm, which is longer, and the temperature is 0° C., which is lower. In FIG. 23, the line $L_{H\lambda 2T1}$ represents the variation in the unwanted signal/normal signal ratio with respect to the groove depth when the second wavelength λ2 is 655 nm and the temperature is 35° C. The line $L_{H\lambda 2T2}$ represents the variation in the unwanted signal/normal signal ratio with respect to the groove depth when the wavelength is 665 nm, which is longer, and the temperature is 70° C., which is higher. FIGS. 22 and 23 are comparable with FIGS. 25 to 27 described below, and illustrate the unwanted signal/normal signal ratio for a diffractive structure having an equal-step-width staircase-like shape (normal configuration) illustrated in FIG. 24A.

FIGS. 22 and 23 illustrate the values estimated from the sum of the efficiencies of diffracted light beams of the orders constituting the signals. To be specific, let Eff1*im*, Eff1*mm*, and Eff1*om* respectively denote the efficiencies of the light beams of the normal orders for the inner annular zone, middle annular zone, and outer annular zone for the first wavelength λ1 corresponding to BD. Let Eff2*im* and Eff2*mm* respectively denote the efficiencies of the light beams of the normal orders for the inner annular zone and the middle annular zone for the second wavelength λ2 corresponding to DVD. Let Eff1*is* denote the efficiency of the light beam of the unwanted order for the inner annular zone for the first wavelength λ1 corresponding to BD and Eff1*is* denote that for the second wavelength λ2 for DVD. The ratios of the unwanted signal to the normal signal EFFr1 and EFFr2 are calculated using the following expressions (17) and (18). Here, $R_1$, $R_2$, and $R_3$ respectively are the radii of the inner annular zone, the middle annular zone, and the outer annular zone on the entry-side surface of the lens. Although there is a slight deviation from the level of the actual signal, the values calculated using the expressions (17) and (18) are generally proportional to the actual signal level, so that the present technique is described based on these expressions.

$$EFFr_1 = \frac{2 \cdot Eff_{1im} \cdot Eff_{1is} \cdot R_1^4}{(Eff_{1im} \cdot R_1^2 + Eff_{1mm} \cdot (R_2 - R_1)^2 + Eff_{1om} \cdot (R_3 - R_2)^2)^2} \tag{17}$$

$$EFFr_2 = \frac{2 \cdot Eff_{2im} \cdot Eff_{2is} \cdot R_1^4}{(Eff_{2im} \cdot R_1^2 + Eff_{2mm} \cdot (R_2 - R_1)^2)^2} \tag{18}$$

The temperature condition and the wavelength condition illustrated in FIGS. 22 and 23 are the worst conditions under which an optical pickup is used. As described above, for BD, the unwanted signal is larger when the wavelength is shorter and the temperature is lower. For DVD, the unwanted signal is larger when the wavelength is longer and the temperature is higher.

According to FIGS. 22 and 23, when the groove depth is about 5400 nm, which is the reference design position, the unwanted signal for BD is suppressed. In contrast, the level of unwanted signal for DVD becomes substantially higher when the temperature is higher and the wavelength is longer. According to "Zukai Blu-ray Disc Dokuhon" (edited by Horoshi Ogawa and Shin-ichi Tanaka, P. 237), the residue of focus servo for BD is in the range of ±0.045 μm. When the depth of the focal point for BD λ1=405 nm, $λ1/NA_1^2$=0.56 μm. Therefore, assuming that the unwanted signal and the normal signal have substantially the same shape, the ratio of the unwanted signal to the normal signal is smaller than 0.045/0.56≈8.0%.

Next, according to "Zukai DVD Dokuhon" (edited by Haruki Tokumaru, Fumihiko Yokokawa, and Mitsuru Irie, P. 58), the residue of focus servo for DVD is in the range of ±0.23 μm. When λ2=655 nm, $λ2/NA_2^2$=1.82 μm, and the ratio of the unwanted signal to the normal signal is smaller than 0.23/1.82≈12.6%.

Therefore, when the depth of the diffractive structure is 5470 nm, the unwanted signal can be avoided. By combining this structure with the structure that satisfies the expression (13) described above, the unwanted signal for BD can be moved to a region outside the interlayer thickness of a double-layer optical disc, so as to perform more robust avoidance and increase resistance to disturbance. That is, when the expression (13) is satisfied, a problem does not occur even if the unwanted signal for BD is large. Therefore, there is a solution for further reducing unwanted signal for DVD.

At this time, the unwanted signal is out of the range of the double-layer thickness or the efficiency of the unwanted signal is equal to or smaller than the threshold. In summary, when the temperature is in the range of 0 to 70° C., one of the pairs of the following expressions (19) and (21), (20) and (21), (19) and (22), and (20) and (22) is to be satisfied. In these expressions, Eff1$m$ represents the level of the normal signal and Eff1$s$ represents the level of the unwanted signal when the focus error search for BD is performed. Eff2$m$ represents the level of the normal signal and Eff2$s$ represents the level of the unwanted signal when the focus error search for DVD is performed.

$$EFF_{1s}/EFF_{1m} < 0.080 \quad (19)$$

$$n_{d1}\left|\frac{1}{P_{1m}} - \frac{1}{P_{1s}}\right| \geq 27 \ \mu m \quad (20)$$

$$EFF_{2s}/EFF_{2m} < 0.126 \quad (21)$$

$$n_{d2}\left|\frac{1}{P_{2m}} - \frac{1}{P_{2s}}\right| \geq 61 \ \mu m \quad (22)$$

As described above, when the expression (19) or (20) is satisfied and the expression (21) or (22) is satisfied in the temperature range of 0 to 70° C., the unwanted signal can be separated or the efficiency of the unwanted light can be reduced to a level equal to or lower than the threshold. In other words, with an optical pickup including the diffraction section 50, when the expression (19) or (20) is satisfied and the expression (21) or (22) is satisfied, the unwanted signal is reduced.

<Reduction of Unwanted Signal—Changing Shape of Diffractive Structure>

Although reduction in the unwanted light using the aforementioned technique has a certain effect, as illustrated in FIGS. 9A to 9C, the efficiency of the diffracted light of the normal order may decrease when the groove depth is changed. Moreover, it is difficult to form deep grooves in the diffractive structure of the lens. Because the reduction effect using the present technique can only be designed within a limit, the reduction effect easily exceeds the limit when, for example, the efficiency of a photodetection element varies due to temperature variation. That is, because the technique uses an allowance of the system of the optical pickup, high precision is desired for other components, so that redundancy is insufficient. Therefore, another technique for solving the problem of unwanted signal will be considered. This technique improves the staircase-like shape of the inner annular zone from the substantially-equal-step-width shape using a technique described Japanese Unexamined Patent Application Publication No. 2009-76163 so as to improve the phase characteristics and increase the efficiency for BD and DVD. Details of the technique will be described below in the subsection "Technique for Improving Phase Characteristics" with reference to Japanese Unexamined Patent Application Publication No. 2009-76163.

With this technique, an original diffractive structure is first assumed, and then the design of the phase amount for each wavelength is changed so that the efficiency, the wavelength characteristics, and the temperature characteristics are improved. Referring to FIGS. 24A to 24H, a typical example when (k1$i$, k2$i$, k3$i$)=(1, −2, −3) will be described. FIG. 24A illustrates one period of a diffractive structure that can be first assumed as an equal-step-width staircase-like shape on the basis of the relationship between the diffraction efficiency, the groove depth, and the number of steps as described above. That is, FIG. 24A corresponds to FIG. 8B. FIGS. 24B to 24D illustrate the phase amount (phase amount −kx, where k is an order) for the diffracted light of the normal order. Hereinafter, this equal-step-width staircase-like shape will be referred to as a "normal configuration". As can be seen from FIGS. 24B to 24D, there is a phase shift in the phase average for the first wavelength λ1 corresponding to BD and the phase average for the second wavelength λ2 corresponding to DVD. In particular, as illustrated in FIG. 24C, for the second wavelength λ2 corresponding to DVD, the phase is on a decreasing trend from x=0 to x=1. As illustrated in FIG. 24B, for the first wavelength λ1 corresponding to BD, the phase is on an increasing trend from x=0 to x=1. Basically, in the phase diagram, the narrower the distribution range of the phase around a certain phase, the higher is the efficiency. The flatter the general movement of the phase, the higher is the resistance to variation in the wavelength. This fact that a flatter phase implies a higher resistance to variation in the wavelength is described in Japanese Unexamined Patent Application Publication No. 2009-76163 and will be described below in the subsection "Technique for Improving Phase Characteristics". Therefore, in order to reduce unwanted light due to variations in environmental conditions, the increasing trend of the phase for BD and the decreasing trend for DVD are to be corrected.

Figure 24H:
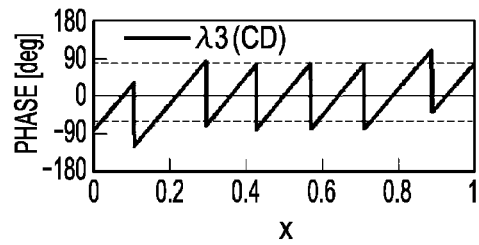

FIG. 24E illustrates the configuration of an improved diffractive structure (hereinafter also referred to as an "improved configuration"). The phase distribution for the diffractive structure having the normal configuration (equal-step-width staircase-like shape) is generally flat for the range x=0.4 to 0.6. Therefore, the widths of the steps in the diffractive structure in this range is not to be changed from an equal width. This is illustrated in FIGS. 24B to 24D. With the diffractive structure illustrated in FIG. 24E, the phase distribution is made flatter by narrowing the pitches for the first and seventh levels so as to change the phase distributions for BD and DVD around x=0 and x=1. To be specific, the pitches for the first and seventh levels are 0.75 times the pitch of the normal configuration, and other boundary points are the same as those in the initial state. Moreover, the pitches of the second and sixth levels are 1.25 times the pitch of the normal configuration. FIGS. 24F to 24H illustrate the phase amount of the diffracted light of the normal order generated by the diffractive structure having the improved configuration illustrated in FIG. 24E.

As a result of the improvement illustrated in FIG. 24E, the flatness of the phase is considerably improved as illustrated in FIGS. 24F to 24H. FIGS. 25 to 27 illustrate the relationship between the unwanted signal and the normal signal when this diffractive structure having the improved configuration is formed in the inner annular zone. FIGS. 25 to 27 illustrate the estimated ratio of the unwanted focus error signal to the normal focus error signal, which is comparable with FIGS. 22 and 23. In FIGS. 25 to 27, the horizontal axis represents the groove depth at room temperature (nm), and the vertical axis represents the ratio of the unwanted signal to the normal signal (hereinafter also referred to as an "unwanted signal/normal signal ratio"). In FIG. 25, the line $L_{jλ1T1}$ represents variation in the unwanted signal/normal signal ratio with respect to the groove depth when the first wavelength λ1 is 405 nm and the temperature is 35° C. The line $L_{jλ1T0}$ represents the unwanted signal/normal signal ratio when the wavelength is 400 nm, which is shorter, the temperature is 0° C., which is lower. In FIG. 26, the line $L_{jλ2T1}$ represents variation in the unwanted signal/normal signal ratio with respect to the groove depth when the second wavelength λ2 is 655 nm and the temperature is 35° C. The line $L_{fλ2T2}$ represents the unwanted signal/normal signal ratio when the wavelength is 665 nm, which is longer, the temperature is 70° C., which is higher. In FIG. 27, the line $L_{fλ3T1}$ represents variation in the unwanted signal/normal signal ratio with respect to the groove depth when the third wavelength λ3 is 785 nm and the temperature is 35° C. The line $L_{fλ3T0}$ represents the unwanted signal/normal signal ratio when the wavelength is 770 nm, which is shorter, the temperature is 0° C., which is lower.

As illustrated in FIGS. 25 to 27, with the diffractive structure having the improved configuration illustrated in FIG. 24E, variations in the unwanted signals for the first wavelength λ1 corresponding to BD and the second wavelength λ2 corresponding to DVD due to variations in environmental conditions are considerably suppressed. That is, according to FIGS. 25 to 27, the unwanted signal is prevented from leaking into the focus error signal, because the phase amounts are reduced to levels having no influence, i.e., to levels of flatness having no influence. In other words, the improved configuration illustrated in FIG. 24A is excellent in resistance to variations in environmental conditions. As illustrated in FIG. 27, the unwanted signal is large for the third wavelength λ3 corresponding to CD. However, because the CD format does not have a double-layer medium, the unwanted signal does not cause a problem. Even if any other influence is to be considered, an intermediate design between the normal design and the improved design can be created by decreasing the reduction ratio of the pitch, so that an optimal state can be obtained.

As an application of the present technique, a better structure can be created by changing the widths of all steps. As illustrated in FIG. 24H, the phase state for CD is dispersed when the staircase-like shape is changed, so that the efficiency is expected to decrease. In this case, the efficiently for CD is about 45% at the design center, which is lower than 51% in the case before changing the structure. When the widths of all steps are changed, the dispersion for CD can be suppressed while substantially maintaining the flatness of the phases for BD and DVD. For example, when the widths of the steps are respectively (0.875:1.05:1.05:1.05:1.05:1.05:0.875) times the equal step width, the ratios of the unwanted signals for BD and DVD can be made to be about the same levels as those illustrated in FIGS. 25 and 26, while maintaining the efficiency for CD at about 48%. Practically, this structure is more desirable.

When the widths of all steps are changed, the influence of the second unwanted signal is to be considered. This is because the change in the waveform illustrated in FIG. 9A increases because the change in the widths of all steps has a greater impact than the change in the width of steps at both ends, and the relationship between the contributions of LF(0) and LF(2) reverses. Therefore, it is desirable to plot the ratio of the second unwanted signal in FIGS. 25 and 26, and select the depth where both are optimal. With this depth, the first and second unwanted signals balance with each other. Therefore, the depth is at the efficiency vertex for BD when a plot the same as FIG. 9A is drawn.

The widths of the steps are determined as follows. First, the best value of the first unwanted signal to second unwanted signal ratio for BD does not vary when the operation described above is performed. Therefore, the best widths of the steps are determined from the unwanted signal ratio for DVD and the efficiency for CD. The larger the widths of the steps in the central portion, the unwanted signal ratio for DVD decreases, and the efficiency for CD decreases in accordance therewith. It is important to reduce the unwanted efficiency for DVD while maintaining the efficiency for CD. In this example, the widths of the steps of about (0.825:1.07:1.07:1.07:1.07:1.07:0.825) and the groove depth of about 5470 nm provide a solution for reducing the unwanted signal ratios and for securing the signal efficiencies. It is assumed that ZEONEX340R is used as the material of the objective lens. The groove depth depends on the refractive index, variation in the refractive index due to temperature, and deviation. If APEL5014DP is used, the groove depth of about 5020 nm is optimal. Even if different materials are used, when the refractive index, variation in the refractive index due to temperature, and deviation are respectively substantially the same, the optimal depth is about the same. Regarding the widths of the steps, an equal steps width is optimal irrespective of the material.

In the example described above, the orders (k1$i$, k2$i$, k3$i$) =(1, −2, −3). However, for different orders, optimization is to be performed in accordance of the orders. As described above, other examples of the combination of the orders include the cases when (k1$i$, k2$i$, k3$i$) is (1, −1, −2), (0, −1, −2), (0, −2, −3), (2, −1, −2). For the respective combinations of orders, FIGS. 28A to 28H, 29A to 29H, 30A to 30H, and 31A to 31H illustrate improved techniques and improved configurations in which improvement similar to the case illustrated in FIGS. 24A to 24H is made.

To be specific, FIGS. 28A, 29A, 30A, and 31A each illustrate one period of a diffractive structure first assumed as an equal-step-width shape from the relationship between the diffraction efficiency, the groove depth, and the number of steps. FIGS. 28B to 28D, 29B to 29D, 30B to 30D, and 31B to 31D each illustrate the phase amount of diffracted light of the normal order for the corresponding case. Hereinafter, this equal-step-width staircase-like shape will be referred to as a "normal configuration". As can be seen from these figures, there is a phase shift between the phase average for the first wavelength λ1 corresponding to BD and the phase average for the second wavelength λ2 corresponding to DVD.

FIGS. 28E, 29E, 30E, and 31E each illustrate the configuration of an improved diffractive structure (hereinafter also referred to as an "improved configuration"). The phase distribution for the diffractive structure having the normal configuration (equal-step-width staircase-like shape) is generally flat for the range x=0.4 to 0.6. Therefore, the widths of the steps in the diffractive structure in this range is not to be changed from an equal width. This is illustrated in FIGS. 28B to 28D, 29B to 29D, 30B to 30D, and 31B to 31D. With each of the diffractive structures illustrated in FIGS. 28E, 29E, 30E, and 31E, the phase distribution is made flatter by narrowing the pitches for the first and seventh levels so as to change the phase distributions for BD and DVD around x=0 and x=1. The term "last level" refers to the $N_1$-th level, when the diffractive structure has ($N_1$−1) steps and $N_1$ levels. To be specific, in the case illustrated in FIG. 28E, the pitches of the first level and the fifth level are 0.625 times that of the normal configuration, and other boundary points are the same as those in the initial state. Moreover, the pitches of the second and fourth levels are 1.375 times the pitch of the normal configuration. In the case illustrated in FIG. 29E, the pitches of the first level and the fourth level are 1.2 times that of the normal configuration, and other boundary points are the same as those in the initial state. Moreover, the pitches of the second and third levels are 0.8 times the pitch of the normal configuration. In the case illustrated in FIG. 30E, the pitches of the first level and the fourth level are 0.75 times that of the normal configuration, and other boundary points are the same as those in the initial state. Moreover, the pitches of the second and fifth levels are 1.25 times the pitch of the normal configuration. In the case illustrated in FIG. 31E, the pitches of the first level and the sixth level are 0.75 times that of the normal configuration, and other boundary points are the same as those in the initial state. Moreover, the pitches of the second and fifth levels are 1.25 times the pitch of the normal configuration. FIGS. 28F to 28H, 29F to 29H, 30F to 30H, 31F to 31H each illustrate phase amount of the diffracted light of the normal order for the diffractive structure having the improved configuration illustrated in FIGS. 28E, 29E, 30E, and 31E.

Table 3 illustrates the unwanted signal/normal signal ratios before and after optimization. In Table 3, the combinations of the orders k1im, k2im, k3im having the highest diffraction efficiency are represented as "Orders", and orders k1is and k2is adjacent to these orders and having the second highest diffraction efficiencies are listed as "Adjacent Unwanted Orders". The ratio of the unwanted signal to the normal signal for the combinations of the orders are represented as "Unwanted Signal/Normal Signal" for different wavelengths and temperature conditions. Whether the pitches of the first and last levels are increased or decreased for the combinations of the orders is listed as "Improvement Polarity". In other words, the "Improvement Polarity" is the polarity of increase in the pitch when improving the diffractive structure. The polarity "−" represents that the diffractive structure is improved by making the pitches of the first and last levels smaller than that of the normal configuration. The polarity "+" represents that the diffractive structure is improved by making the pitches of the first and last levels larger than that of the normal configuration. The "Improvement Duty" represents the ratio of the pitches of the first and last levels to that of the normal configuration. In the middle annular zone, the diffraction order having the largest diffraction efficiency for the first wavelength λ1 corresponding to BD and the like is the 0-order and the diffraction order having the largest diffraction efficiency for the second wavelength λ2 corresponding to DVD and the like is the −1-order. In the outer annular zone, the diffraction order having the largest diffraction efficiency for the first wavelength λ1 corresponding to BD and the like is the +2-order. Even if other orders are used in the middle annular zone and the outer annular zone, the improvement of the inner annular zone contributes to improvement of the entire structure in a similar manner. As described above, for the combination of the orders in the cases illustrated in FIGS. 28A to 31H, the diffractive structure is improved by changing the pitches of the first and last levels. This is because, in a diffractive structure designed to achieve a higher efficiency, the phase average is generally uniform and thereby the phase at the central portion is generally uniform. That is, deviation in the phase usually occurs a peripheral portion.

TABLE 3

| | Order | | | Adjacent Unwanted Light Order | | Unwanted Signal/Normal Signal | | | | | | Improvement Polarity | Improvement Duty |
|---|---|---|---|---|---|---|---|---|---|---|---|---|---|
| | | | | | | First Wavelength λ1 (BD) | | | Second Wavelength λ2 (DVD) | | | | |
| Structure | k1im (BD) | k2im (DVD) | k3im (CD) | k1is (BD) | k2is (DVD) | 400 nm 0° C. | 405 nm 35° C. | 410 nm 70° C. | 645 nm 0° C. | 655 nm 35° C. | 665 nm 70° C. | | |
| Before Improvement | 1 | −2 | −3 | 2 | −3 | 3.4% | 0.4% | 0.1% | 0.5% | 5.5% | 18.4% | − | 0.75 |
| After Improvement | | | | | | 2.1% | 0.1% | 0.2% | 0.0% | 1.3% | 7.1% | | |
| Before Improvement | 1 | −1 | −2 | 2 | −2 | 3.3% | 1.1% | 0.1% | 5.7% | 15.7% | 32.3% | − | 0.625 |
| After Improvement | | | | | | 0.5% | 0.0% | 0.3% | 0.0% | 1.7% | 6.4% | | |
| Before Improvement | 0 | −1 | −2 | −1 | 0 | 1.1% | 0.1% | 4.5% | 19.2% | 0.8% | 2.7% | + | 1.2 |
| After Improvement | | | | | | 1.5% | 0.2% | 5.4% | 10.0% | 0.4% | 12.7% | | |
| Before Improvement | 0 | −2 | −3 | 1 | −3 | 7.8% | 3.5% | 0.8% | 2.4% | 8.1% | 18.2% | − | 0.75 |
| After Improvement | | | | | | 7.1% | 3.1% | 0.7% | 0.0% | 1.0% | 4.6% | | |
| Before Improvement | 2 | −1 | −2 | 3 | −2 | 1.5% | 0.2% | 0.1% | 0.4% | 5.8% | 20.9% | − | 0.75 |
| After Improvement | | | | | | 0.2% | 0.0% | 0.4% | 0.0% | 1.7% | 9.8% | | |

<Diffractive Structure on Actual Lens>

A technique for actually transferring the diffractive structure, such as the diffractive structure illustrated in FIG. 24E, which is designed by using the technique of changing the shape of the basic diffractive structure, will be described. The phase difference function φ of a lens having a diffraction section (hereinafter also referred to as a "diffractive lens") is determined by the diffraction section. The phase φ is represented by the following expression (23) using the coefficients of the phase difference function Cn.

$$\phi = k \sum_{i=1}^{j} \frac{C_i r^{2i}}{\lambda_0} \tag{23}$$

In this expression, $\lambda_0$ represents the production wavelength, k represents the order of diffraction, and r represents the radial position in the lens. Because φ is the phase with respect to the design wavelength $\lambda_0$, the phase φ is the same as φ', which is represented by the following expression (24), where l is an integer.

$$\phi' = \phi - l \tag{24}$$

When the normal configuration, which is illustrated in the figures such as FIGS. 24A and 8B, has ($N_1$−1) steps and $N_1$ levels, a step boundary is a portion formed in accordance with φ" that satisfies the following expression (25), where l' is an integer.

$$\phi'' = \phi' l'/N_1 \quad (25)$$

When forming steps in accordance with this expression, the initial height is 0 and the height increases by d/N at each step boundary. FIGS. 32A to 32C illustrate the normal design when N=3. To be specific, FIG. 32A illustrates the phase φ (along the vertical axis) calculated using the expression (23) for the radial position x (along the horizontal axis). FIG. 32B illustrates φ' (along the vertical axis), which is obtained as a remainder by performing a so-called modulo operation represented by the expression (24), which is the remainder of division of φ by λ0. This phase amount φ' is used for determining the pitch and the like of a diffractive structure. The values "1/4", "2/4", "3/4", "1" along the vertical axis of FIG. 32B are obtained from φ" represented by the expression (25). The values of x that corresponds to the positions on the vertical axis of FIG. 32B are the boundary values for the steps of the staircase-like shape. The diffractive structure illustrated in FIG. 32C is obtained by changing the shape illustrated in FIG. 32B into a staircase-like shape.

Next, referring to FIGS. 33A to 33C, a technique for forming an improved configuration will be described. The process illustrated in FIG. 32A is the same as that used for the improved configuration, so that the illustration of this process is omitted. That is, FIG. 33A is the same as FIG. 32B. The improved technique illustrated in FIGS. 33A to 33C is different from the technique for the normal configuration illustrated FIGS. 32A to 32C in that, when obtaining the step boundaries of x using φ' in accordance with the expression (25) as illustrated in FIG. 33B, φ" in the expression (25) is proportionally transformed. For example, when changing the step boundary between the first level and the second level in accordance with a duty ratio η, the following expression (26) is used for transformation. η is represented by the following expression (27), where α and β are the widths of the first level and the second level, respectively. Because α=0.75 and β=1.25, η=0.75. The same applies to the case when moving another step boundary. The phase width ratio after having been set becomes the step ratio of the nonperiodic steps. At this time, only the step boundaries are changed in accordance with the phase. The height of each step is unchanged at d/N.

$$\phi_1''' = \phi_1'' \eta \quad (26)$$

$$\eta = \frac{2\alpha}{\alpha + \beta} \quad (27)$$

In general, when forming a diffractive structure in an actual lens, the depth of the diffractive structure is also corrected. This is a technique for adjusting the depth of the diffractive structure in accordance with the angle of emitted light beam. For an objective lens having three-wavelength compatibility, the depth is corrected in accordance with the angle of the emitted light beam having the first wavelength λ1 corresponding to BD. That is, if the depth of the diffractive structure of a usual diffractive lens is d, the depth d' after the correction is represented by the following expression (28), where θ is the emission angle of the light beam for BD in the plane of incidence and n1 is the refractive index.

$$d' = d \cdot \frac{n_1 - 1}{n_1 \cos\theta - 1} \quad (28)$$

<Relationship Between Actual Lens and Phase>

The relationship between an actual lens and the phase is described using an example when (k1i, k2i, k3i)=(1, −2, −3). Excluding the correction for the depth represented by the expression (28), the phase amount for the diffractive structure described above can be estimated by connecting starting point positions of the first level, the fourth level, and the fifth level with consideration of the integral multiple of the phase for each period. This is because, displacing the ends of the fourth level and the stating point of the first level is not desirable as can be seen from the phases illustrated in FIGS. 24A to 24H. Even if both ends of the fourth level are displaced, the estimation is not influenced because the amount of displacement is small. Moreover, in general, the expression (23) described above can be sufficiently approximated at about j=5. Therefore, as illustrated in FIGS. 34A to 34E, if the diffractive structure has at least about three periods, the phase amount can be estimated by using approximation at about j=5, so that whether the present technique is used can be checked.

Referring to FIGS. 34A to 34E, the method of checking this will be described as follows. First, because the diffractive structure has been corrected using the expression (28), the emission angle of the light beam is estimated and the inverse calculation of the expression (28) is performed. At this time, as illustrated in FIG. 34B, the depth becomes an equal depth. Next, as illustrated in FIG. 34B, the positions in the x direction are determined from the starting point positions $R_{L1S}$, $R_{L4S}$, and $R_{L5S}$ of the first, fourth, and fifth levels. For example, as illustrated in FIG. 34B, $x_1$, $x_4$, $x_5$, $x_{1'}$, $x_{4'}$, and $x_{5'}$ are calculated.

Next, as illustrated in FIG. 34C, the phase amounts are determined so that the maximum phase amount is 1 and the phase amount at the starting point of the N-th level is (N−1)/7. That is, the phase amount at the starting point of the first level is 0, the phase amount at the starting point of the fourth level is 3/7, and the phase amount at the starting point of the fifth level is 4/7. In FIG. 34C, these points are indicated by blank circles.

Next, as illustrated in FIG. 34D, because the phase amount for m−1 is added to the phase difference function in the m-th period, the phase amount is added back. In other words, the inverse operation of the modulo operation illustrated in FIGS. 32A and 32B is performed, and the integer multiple of the phase for each period is added as illustrated in FIGS. 34C and 34D. In FIG. 34D, the phase difference function φ(X) can be estimated by connecting the phase points $\phi_{L1S}$, $\phi_{L4S}$, $\phi_{L5S}$, $\phi_{L1S'}$, $\phi_{L4S'}$, and $L_{L5S'}$ that have been determined. As described above, $\phi_{L1S}$ is 0, $\phi_{L4S}$ is 3/7, and $\phi_{L5S}$ is 4/7. $\phi_{L1S'}$ is 7/7, $\phi_{L4S'}$ is 10/7, $\phi_{L5S'}$ is 11/7, which are obtained by performing the add-back operation. The phase amounts $\phi_{L1S}$, $\phi_{L4S}$, $\phi_{L5S}$, $\phi_{L1S'}$, $\phi_{L4S'}$, and $\phi_{L5S'}$ after performing the add-back operation may also be referred to as "estimated phase amounts". As with the expression (10), the phase difference function $\phi(X) = C_1 X^2 + C_2 X^4 + C_3 X^6 + C_4 X^8 + C_5 X^{10}$ .... The coefficients $C_1$ to $C_5$ are specifically determined from the positions in the horizontal axis direction (X direction) $x_1$, $x_4$, $x_5$, $x_{1'}$, $x_{4'}$, and $x_{5'}$ and the positions in the vertical axis direction (estimated phase amount) $\phi_{L1S}$, $\phi_{L4S}$, $\phi_{L5S}$, $\phi_{L1S'}$, $\phi_{L4S'}$, and $\phi_{L5S'}$, and an approximated relational expression φ(X) is calculated. As described above, this estimation can be performed at about j=5, when there are six or more blank dots. This estimation can be performed if there are at least two periods, because there are three points (the starting points of the first, fourth, and fifth levels) in one period. In the example described above, the estimation is performed using adjacent two periods. The larger the number of periods, the more precise becomes the estimation.

Lastly, as illustrated in FIG. 34E, whether the present technique is used can be checked by observing the deviation from 0 at the starting points of the second, third, and sixth levels. In other words, the positions in the x direction $x_2$, $x_3$, $x_6$, $x_7$ . . . are obtained using the starting points of the second, third, sixth, and seventh levels in the same way as obtaining $x_1$, $x_4$, $x_5$, . . . using the starting points of the first, fourth, and fifth levels indicated by blank dots in FIG. 34B. In FIG. 34E, the phase amounts in the direction of the vertical axis at the intersections of the curve representing $\phi(X)$ and vertical lines passing through the positions $x_2$, $x_3$, $x_6$, and $x_7$ in the horizontal axis direction (x direction) will be denoted by $\phi(x_2)$, $\phi(x_3)$, $\phi(x_6)$, and $\phi(x_7)$. The optical-path-difference phase amounts represented by the positions in the vertical axis direction at the starting points of the second, third, sixth, and seventh levels denoted by the solid dots in FIG. 34B will be referred to as $\phi 2$, $\phi 3$, $\phi 6$, and $\phi 7$. These phase amounts are $\phi_2 = 1/7$ at the starting point of the second level, $\phi_3 = 2/7$ at the starting point of the third level, $\phi_6 = 5/7$ at the starting point of the sixth level, and $\phi_7 = 6/7$ at the starting point of the seventh level. This is the case when the heights of the levels illustrated in FIG. 34B are equal. When the heights are not equal, the phase amounts are proportional to the heights. Whether the present technique is used or not can be checked using the relationship between the optical-path-difference phase amounts $\phi_2$, $\phi_3$, $\phi_6$, and $\phi_7$, and the values $\phi(x_2)$, $\phi(x_3)$, $\phi(x_6)$, and $\phi(x_7)$ obtained using the relational expression $\phi(X)$. That is, as described above in the subsection "Reduction of Unwanted Signal—Changing Shape of Diffractive Structure" using FIG. 24E, in the case in which the pitches for the first and seventh levels are narrowed, the following relationship exists. That is, in such a case, relational expressions $|\phi_2| > |\phi(x_2)|$ and $|\phi_7| < |\phi(x_7)|$ hold. When the phase is flattened by displacing the starting point of the third level toward the starting point of the second level, a relational expression $|\phi_3| > |\phi(x_3)|$ holds. When the phase is flattened by displacing the starting point of the sixth level toward the starting point of the seventh level, a relational expression $|\phi_6| < |\phi(x_6)|$ holds. In other words, the phase can be made flatter when at least one of the relational expressions $|\phi_2| > |\phi(x_2)|$, $|\phi_3| > |\phi(x_3)|$, $|\phi_6| < |\phi(x_6)|$, and $|\phi_7| < |\phi(x_7)|$ are satisfied. Therefore, when at least one of these relational expressions are satisfied, an excellent signal can be obtained irrespective of variations in environmental conditions such as variations in temperature and wavelength, whereby excellent recording and reproduction characteristics can be realized.

FIG. 35 illustrates the phases for each of the starting points in the improved configuration and the estimated phase $\phi$ obtained for the normal configuration. As illustrated in FIG. 35, the phase for the starting point of the second level $P_{XL2S}$ is larger than the estimated phase $\phi$. The phase for the starting point of the seventh level $P_{XL7S}$ is smaller than the estimated phase $\phi$. FIG. 35 corresponds to FIG. 24E. As described above, the improvement technique can be carried out by displacing the starting point of the third level toward the −x side and by displacing the starting point of the sixth level toward the +x side as illustrated in FIG. 24E. Therefore, the improvement technique can be carried out by making the phase $P_{XL3S}$ at the starting point of the third level larger than the estimated phase $\phi$, or by making the phase $P_{XL6S}$ at the starting point of the sixth level smaller than the estimated phase $\phi$. For the relational expression $\phi(X)$, which represents the relationship between the position in the radial direction and the amount of the phase difference, the starting points of the levels other than the second, third, sixth, and seventh levels are used.

However, the starting points to be used are not limited thereto. That is, if it is clear beforehand that the third and sixth levels are not used in the improved configuration, the relational expression $\phi(X)$ may be calculated using the starting points other than those of the second and seventh levels.

In the example described above, a case when (k1$i$, k2$i$, k3$i$)=(1, −2, −3) is described. Regarding the other orders, the pitch is changed in accordance with the direction corresponding to the aforementioned improvement polarity + or −. Examples of other orders include the combinations (k1$i$, k2$i$, k3$i$)=(1, −1, −2), (0, −1, −2), (0, −2, −3), (2, −1, −2). When the improvement polarity is "−", the polarity is the same as that of the (1, −2, −3). Therefore, if the diffractive structure has a staircase-like shape including n−1 levels and n steps, the diffractive structure can be improved by increasing the phase amount of the starting point of the second level or the third level and decreasing the phase amount of the starting point of the n-th or the (n−1)-th level. In contrast, when the improvement polarity is "+", the diffractive structure can be improved by decreasing the phase amount of the starting point of the second level or the third level and decreasing the phase amount of the starting point of the n-th or the (n−1)-th level.

The polarity is determined depending on whether the adjacent unwanted order of diffraction is positive or negative with respect to the normal diffracted light order. That is, for the first wavelength λ1 corresponding to BD, if (normal order of diffraction)−(unwanted adjacent order of diffraction) is negative, the polarity is negative. On the contrary, if (normal order of diffraction)−(unwanted adjacent order of diffraction) is positive, the polarity is positive. For example, in the first example in Table 3, the improved polarity is negative because 1−2=−1. In the third example in Table 3, the improved polarity is positive because 0−(−1)=1. This trend can be derived by referring to the phase state of the normal configuration having equal-width staircase-like shape. That is, in FIGS. 24A to 24H and 28A to 31H, when the phase diagram is on a decreasing trend for the second wavelength λ2 corresponding to DVD, the entire phase can be made substantially flat by decreasing the pitches at both ends. This is illustrated in FIGS. 24A to 24H, 28A to 28H, 30A to 30H, and 31A to 31H. On the other hand, when the phase diagram is on an increasing trend, the entire phase can be made substantially flat by decreasing the pitches at both ends. This is illustrated in FIGS. 29A to 29H. The term "increasing trend" means that the phase increases as x changes from x=0 to x=1, and the term "decreasing trend" means that the phase decreases as x changes from x=0 to x=1. The direction of the slope in the phase diagram represents the slope of the efficiency with respect to the depth of the normal light (dEff/dD). As illustrated in FIGS. 9A to 9C, when the groove depth is at a value such that dEff/dD=0 for the normal light, the efficiencies of the adjacent unwanted light is zero. When the groove depth is at different values, the order of adjacent diffracted light having a larger efficiency changes in accordance with the sign of dEff/dD for the normal light. Therefore, whether to increase or decrease the pitches for improvement is determined in accordance with whether the order of the adjacent unwanted light is larger than the order of the normal diffracted light.

In summary, when a three-wavelength compatible objective lens satisfies the following expression (29) and (30) or (31), or satisfies the following expression (32) and (33) or (34), the influence of unwanted light can be avoided. The diffractive structure formed in the first region 51 (inner annular zone) of the three-wavelength compatible objective lens includes staircase-like portions each having ($N_1$−1) steps and $N_1$ levels. In these expressions, k1$im$, k2$im$, and k3$im$ are the same as k1$i$, k2$i$, and k3$i$ described above, which are respectively the orders having the highest diffraction efficiency for the first to third wavelengths λ1, λ2, and λ3 in the diffractive structure formed in the first region 51. k1*is* represents one of the orders adjacent to k1*im* having a higher diffraction efficiency, k2*is* represents one of the orders adjacent to k2*im* having a higher diffraction efficiency, and k3*is* represents one of the orders adjacent to k3*im* having a higher diffraction efficiency. $\phi_i(x_2)$ and $\phi_i(x_{N1})$ in these expressions are calculated as follows. The estimated phase amounts can be obtained by adding back integer multiple of the phases for each period of the staircase-like structure to the optical-path-difference phase amount ϕi for the first wavelength λ1 due to the diffractive structure in the first region 51. By connecting the estimated phase amounts at the starting points of the levels other than the second level and the $N_1$-th level for each period, a relational expression $\phi_i(X)=C_1X^2+C_2X^4+C_3X^6+C_4X^8+C_5X^{10}$ for approximating the optical-path-difference phase amount $\phi_i(X)$ at the radial position X is calculated. $\phi_i(x_2)$ and $\phi_i(x_{N1})$ for the radial positions $x_2$ and $x_{N1}$ are obtained using this relational expression. To be specific, $\phi_i(x_2)$ is calculated by assigning the radial position $x_2$, which is the starting point of the second level, to X on the right-hand side of the relational expression $\phi_i(X)$. $\phi_i(x_{N1})$ is calculated by assigning the radial position $x_{N1}$, which is the starting point of the $N_1$-th level, to X on the right-hand side of the relational expression $\phi_i(X)$. $\phi_i(x_2)$ is compared with $\phi_{i2}$, which is the optical-path-difference phase amount at the starting position of the second level. $\phi_i(x_{N1})$ is compared with $\phi_{iN1}$, which is the optical-path-difference phase amount at the starting position of the $N_1$-th level.

$$k1im - k1is > 0 \quad (29)$$

$$|\phi_{i2}| < |\phi_i(x_2)| \quad (30)$$

$$|\phi_{iN1}| > |\phi_i(x_{N1})| \quad (31)$$

$$k1im - k1is < 0 \quad (32)$$

$$|\phi_{i2}| > |\phi_i(x_2)| \quad (33)$$

$$|\phi_{iN1}| < |\phi_i(x_{N1})| \quad (34)$$

<Structure of Middle Annular Zone>

The technique for changing the shape of the diffractive structure is described above using the inner annular zone (the first region 51) as an example. However, the technique can be similarly used for the middle annular zone (the second region 52). By using the improvement technique for the middle annular zone, the diffractive structure can be made more resistant to variations in environmental conditions. FIGS. 36A to 36F illustrate an example of the improvement technique used for the middle annular zone when (k1*m*, k2*m*)=(0, −1). As with the case of the improvement technique for the inner annular zone described using FIGS. 24A to 24H, the pitches of the first and third levels are narrowed to 0.75 times the equal pitch. By narrowing the first and third levels, the phase dispersion for the second wavelength λ2 corresponding to DVD can be shifted toward the center, so that the dispersion of the efficiency due to variations in environmental conditions can be suppressed. As a result, variation of the main efficiency due to variations in environmental conditions is reduced, whereby the ratio of the unwanted signal to the normal signal can be reduced. FIG. 36A, as with FIG. 24A, illustrates one period of the diffractive structure in the middle annular zone having a staircase-like shape with an equal step width, the period having two steps and three levels. FIGS. 36B and 36C, which correspond to FIGS. 24B and 24C, respectively illustrate the phase amounts for the normal order of diffraction for the wavelengths λ1 and λ2. FIG. 36D illustrates an improved configuration of the middle annular zone in which the first and third levels are narrowed as described above. FIGS. 36E and 36F respectively illustrate the phase amounts for the normal orders of diffraction for the wavelengths λ1 and λ2 in an improved configuration illustrated in FIG. 36D. As illustrated in FIGS. 36E and 36F, the phase distribution, which is particularly on a decreasing trend for the second wavelength λ2 in FIGS. 36B and 36C, is flattened and improved.

Referring to FIGS. 37A to 37F, another example of the combination of the orders for the middle annular zone when (k1*m*, k2*m*)=(1, 0) will be described. As with the case of the improvement technique for the inner annular zone described using FIGS. 24A to 24H, the pitches of the first and fourth levels are narrowed to 0.4 times the equal pitch. By narrowing the first and fourth levels, the phase dispersion for the first wavelength λ1 corresponding to BD can be shifted toward the center, so that the dispersion of the efficiency due variations in environmental conditions can be suppressed. As a result, variation in the main efficiency due to variations in environmental conditions is reduced, whereby the ratio of the unwanted signal to the normal signal can be reduced. FIG. 37A illustrates one period of the diffractive structure in the middle annular zone having a staircase-like shape with an equal step width, the period having three steps and four levels. FIGS. 37B and 37C correspond to FIGS. 36B and 36C. FIG. 37D illustrates an improved configuration of the middle annular zone in which the first and fourth levels are narrowed as described above. FIGS. 37E and 37F respectively illustrate the phase amounts for the normal orders of diffraction for the wavelengths λ1 and λ2 in an improved configuration illustrated in FIG. 37D. As illustrated in FIGS. 37E and 37F, the phase distribution, which is particularly on an increasing trend for the first wavelength λ1 in FIGS. 37B and 37C, is flattened and improved. Thus, the improvement technique for the middle annular zone is essentially the same as that for the inner annular zone. That is, when (normal order of diffraction)−(unwanted adjacent order of diffraction) is negative for the first wavelength λ1 corresponding to BD, the diffractive structure can be improved by reducing the pitches at both ends. On the other hand, when (normal order of diffraction)−(unwanted adjacent order of diffraction) is positive, the diffractive structure can be improved by increasing the pitches at both ends. In other words, as with the inner annular zone, when the diffractive structure in the middle annular zone satisfies a certain relationship, the influence of unwanted light can be avoided.

In summary, when a three-wavelength compatible objective lens satisfies the following expression (35) and (36) or (37), or satisfies the following expression (38) and (39) or (40), the influence of unwanted light can be avoided. When the expressions (29) to (34) are satisfied, the influence of unwanted light of the light beam passing through the inner annular zone can be avoided. When the expressions (35) to (40) are satisfied, the influence of unwanted light of the light beam passing through the middle annular zone can be avoided. The second region 52 (middle annular zone) of the three-wavelength compatible objective lens has a staircase-like diffractive structure having ($N_2$−1) steps and $N_2$ levels. In these expressions, k1*mm*, k2*mm*, and k3*mm* are the same as k1*m*, k2*m*, and k3*m* described above, which are respectively the orders having the hightest diffraction efficiency for the first to third wavelengths λ1, λ2, and λ3 in the diffractive structure formed in the second region 52. k1*ms* represents one of the orders adjacent to k1*mm* having a higher diffraction efficiency, k2*ms* represents one of the orders adjacent to k2*mm* having a higher diffraction efficiency, and k3*ms* represents one of the orders adjacent to k3mm having a higher diffraction efficiency. $\phi_m(x_2)$ and $\phi_m(x_{N2})$ in these expressions are calculated as follows. The estimated phase amounts can be obtained by adding back integer multiple of the phases for each period of the staircase-like structure to the optical-path-difference phase amount $\phi_m$ for the first wavelength $\lambda 1$ due to the diffractive structure in the second region 52. By connecting the estimated phase amounts at the starting points of the levels other than the second level and the $N_2$-th level for each period, a relational expression $\phi_m(X)=C_1X^2+C_2X^4+C_3X^6+C_4X^8+C_5X^{10}$ for approximating the optical-path-difference phase amount $\phi_m(X)$ at the radial position X is calculated. $\phi_m(x_2)$ and $\phi_m(x_{N2})$ for the radial positions $x_2$ and $x_{N2}$ are obtained from this relational expression. To be specific, $\phi_m(x_{N1})$ is calculated by assigning the radial position $x_{N2}$, which is the starting point of the $N_2$-th level, to X on the right-hand side of the relational expression $\phi_m(X)$. $\phi_m(x_2)$ is compared with $\phi_{m2}$, which is the optical-path-difference phase amount at the starting position of the second level. $\phi_m(x_{N2})$ is compared with $\phi_{mN2}$, which is the optical-path-difference phase amount at the starting position of the $N_2$-th level.

$$k1mm - k1ms > 0 \quad (35)$$

$$|\phi_{m2}| < |\phi_m(x_2)| \quad (36)$$

$$|\phi_{mN2}| > |\phi_m(x_{N2})| \quad (37)$$

$$k1mm - k1ms < 0 \quad (38)$$

$$|\phi_{m2}| > |\phi_m(x_2)| \quad (39)$$

$$|\phi_{mN2}| < |\phi_m(x_{N2})| \quad (40)$$

<Technique for Improving Phase Characteristics>

Next, the technique for improving the phase characteristics used in the subsection "Reduction of Unwanted Signal—Changing Shape of Diffractive Structure" above will be described. As an example, a nonperiodic projection/depression shape will be used so as to increase resistance to variations in environmental conditions.

The diffraction efficiency $\eta$ of such a diffractive structure will be considered. Suppose that the diffractive structure is made of a material having a predetermined refractive index and includes grooves having a depth d and having a shape represented by g(x). The m-th order diffracted light, which is generated when a light beam having a wavelength $\lambda$ is diffracted, will be considered. The phase $\phi(x, d, \Delta n, \lambda, m)$ of a component of the m-th order diffracted light having the wave source at a position x is represented by the following expression (41). In the expression (41), $\Delta n$ is the difference between the refractive index of a medium in front of an interface and the refractive index of a medium behind the interface of the diffractive structure.

$$\phi(x,d,\Delta n,\lambda,m)=\{d\times\Delta n/\lambda\times g(x)-m\times x\}\times 2\pi \quad (41)$$

By using the scalar diffraction theory, the diffraction efficiency $\eta$, which is obtained using $\phi$ in the expression (41), can be represented by the following expression (42).

$$\eta(d, \Delta n, \lambda, m) = \int_0^1 \exp(i\phi(x, d, \Delta n, \lambda, m))\,dx \quad (42)$$

Considering the fact that $\eta$, which can be regarded as the cumulative sum of $\phi$, represents the diffraction efficiency, the following holds true. If the distribution of the phase $\phi$ with respect to a wave source at an arbitrary position of the groove shape is limited within a certain range, $\eta$ increases and $d\eta/d\lambda$ decreases, i.e., the diffraction efficiency increases and the variation in the diffraction efficiency with respect to variation in the wavelength decreases. It is desirable that $\phi$ be distributed within a certain range over the entire range of x ($0 \leq x < 1$). In this case, the diffractive structure is more resistant to variation in the wavelength. In view of the above, even if the distribution of $\phi$ is out of a certain range for any portion of the range of x, as long as the distribution of $\phi$ is in the certain range over substantially the entire range of x, a high diffraction efficiency and a high resistance to variation in the wavelength can be obtained.

Thus, the distribution of $\phi$ is in a certain range if and only if the phase illustrated in FIGS. 24B to 24D and 24F to 24H has a flat distribution. By forming the diffractive structure so that the phase has a flat distribution, the resistance to variations in wavelength and temperature can be increased. Because the diffractive structure described above is formed as illustrated in FIG. 24E so as to flatten the phase, increase in the unwanted diffracted light due to variations in environmental conditions can be prevented.

<Summary of Technique for Preventing Increase in Unwanted Diffracted Light Due to Variations in Temperature and Wavelength>

In the three-wavelength compatible objective lens, the first region 51 in which a predetermined diffractive structure is formed using the technique described above can reduce negative influence of unwanted diffraction signal due to variations in environmental conditions, which has been difficult to achieve with existing techniques. Thus, the diffraction section 50 including the first region 51 and the objective lens 34 including the diffraction section 50 realize an optical pickup that can perform recording of a signal to and reproduction of a signal from a plurality of types of optical discs, including double-layer optical discs, using a single objective lens.

That is, the objective lens 34 according to an embodiment of the present invention includes the first to third regions 51 to 53. The light beam having the wavelength $\lambda 1$ has an aperture diameter corresponding to the first to third regions, the light beam having the wavelength $\lambda 2$ has an aperture diameter corresponding to the first and second regions, and the light beam having the wavelength $\lambda 3$ has an aperture diameter corresponding to the first region. The first region 51 satisfies (k1$i$, k2$i$, k3$i$)=(+1, -2, -3), (1, -1, -2), (0, -1, -2), (0, -2, -3), (2, -1, -2). The first region 51 is a staircase-like diffractive structure having ($N_1$-1) steps and $N_1$ levels having unequal widths. When k1$im$-k1$is$>0, the relationship $|\phi_{i2}| < |\phi_i(x_2)|$ or $|\phi_{iN1}| > |\phi_i(x_{N1})|$ is satisfied. When k1$im$-k1$is$<0, the relationship $|\phi_{i2}| > |\phi_i(x_2)|$ or $|\phi_{iN1}| < |\phi_i(x_{N1})|$ is satisfied. The objective lens 34 realizes three-wavelength compatibility in that the objective lens 34 can appropriately focus a corresponding light beam on the signal recording surface with a single objective lens. The objective lens 34 is resistant to variations in environmental conditions, so that the objective lens 34 prevents servo from becoming unstable when unwanted diffracted light generated by the diffraction section 50 increases due to variations in temperature and wavelength. Thus, recording and reproduction characteristics of the optical pickup 3 including the objective lens 34 is prevented from deteriorating, whereby excellent recording and reproduction characteristics can be realized.

The objective lens 34 according to an embodiment of the present invention has the middle annular zone having the following properties. That is, the second region 52 satisfies (k1$m$, k2$m$)=(0, -1), (1, 0), (0, -2), (1, -1), or the like. The second region 52 is a staircase-like diffractive structure having ($N_2-1$) steps and $N_2$ levels having unequal widths. When k1$mm$−k1$ms$>0 the relationship $|\phi_{m2}|<|\phi_m(x_2)|$ or $|\phi_{mN2}|>|\phi_m(x_{N2})|$ is satisfied. When k1$mm$−k1$ms$<0, the relationship $|\phi_{m2}|>|\phi_m(x_2)|$ or $|\phi_{mN1}|<|\phi_m(x_{N2})|$ is satisfied. The objective lens 34 can reduce the influence of unwanted light of the light beam passing through the middle annular zone. Thus, the objective lens 34 is resistant to variations in environmental conditions, so that the objective lens 34 prevents servo from becoming unstable when unwanted diffracted light generated by the diffraction section 50 increases due to variations in temperature and wavelength. Thus, recording an reproduction characteristics of the optical pickup 3 including the objective lens 34 is prevented from deteriorating, whereby excellent recording and reproduction characteristics can be realized.

When (k1$i$, k2$i$, k3$i$)=(+1, −2, −3), the objective lens has the following properties. That is, the objective lens 34 includes the first to third regions 51, 52, and 53. The light beam having the wavelength $\lambda1$ has an aperture diameter corresponding to the first to third regions, the light beam having the wavelength $\lambda2$ has an aperture diameter corresponding to the first and second regions, and the light beam having the wavelength $\lambda3$ has an aperture diameter corresponding to the first region. The first region 51 satisfies (k1$i$, k2$i$, k3$i$)=(+1, −2, −3), and the first region 51 is a staircase-like diffractive having six steps and seven levels having unequal widths. At least one of the relational expressions $|\phi2|>|\phi(x2)|$, $|\phi3|>|\phi(x3)|$, $|\phi6|<|\phi(x6)|$, and $|\phi7|<|\phi(x7)|$ are satisfied. The objective lens 34 realizes three-wavelength compatibility in that the objective lens 34 can appropriately focus a corresponding light beam on the signal recording surface with a single objective lens. The objective lens 34 is resistant to variations in environmental conditions, so that the objective lens 34 prevents servo from becoming unstable when unwanted diffracted light generated by the diffraction section 50 increases due to variations in temperature and wavelength. Thus, recording and reproduction characteristics of the optical pickup 3 including the objective lens 34 is prevented from deteriorating, whereby excellent recording and reproduction characteristics can be realized.

The objective lens 34 according to an embodiment of the present invention has the following properties besides the configuration of the diffractive structure. This is to prevent the influence of unwanted light by limiting the focal length to a certain range. The first to third regions 51, 52, and 53 included in the objective lens 34 function also in this respect. The light beam having the wavelength $\lambda1$ has an aperture diameter corresponding to the first to third regions, the light beam having the wavelength $\lambda2$ has an aperture diameter corresponding to the first and second regions, and the light beam having the wavelength $\lambda3$ has an aperture diameter corresponding to the first region. The first region 51 satisfies one of the following first to fourth relational expressions. The first expression is a relational expression $n_{d1}|(1/P_{1m})-(1/P_{1s})|\geq27$ μm. The second expression is a relational expression $n_{d1}|(1/P_{1m})-(1/P_{1s})|18$ μm. The third expression is a relational expression $n_{d2}|(1/P_{2m})-(1/P_{2s})|\geq61$ μm. The fourth expression is a relational expression $n_{d2}|(1/P_{2m})-(1/P_{2s})|\leq35$ μm. The objective lens 34 realizes three-wavelength compatibility in that the objective lens 34 can appropriately focus a corresponding light beam on the signal recording surface with a single objective lens. The objective lens 34 is resistant to variations in environmental conditions, so that the objective lens 34 prevents servo from becoming unstable when unwanted diffracted light generated by the diffraction section 50 increases due to variations in temperature and wavelength. Thus, recording and reproduction characteristics of the optical pickup 3 including the objective lens 34 is prevented from deteriorating, whereby excellent recording and reproduction characteristics can be realized. In particular, because the objective lens 34 satisfies at least one of the relational expressions $n_{d1}|(1/P1m)-(1/P1s)|\geq27$ μm and $n_{d2}|(1/P2m)-(1/P2s)|\geq61$ μm, influence of unwanted light can be more effectively avoided. Because the objective lens 34 satisfies both of the relational expressions $n_{d1}|(1/P1m)-(1/P1s)|\geq27$ μm and $n_{d2}|(1/P2m)-(1/P2s)|\geq61$ μm, the influence of unwanted light can be reduced further.

[6. Example of Diffraction Section Used in Optical Pickup According to Embodiment of the Present Invention (Modification of [3])]

Figure 6A:
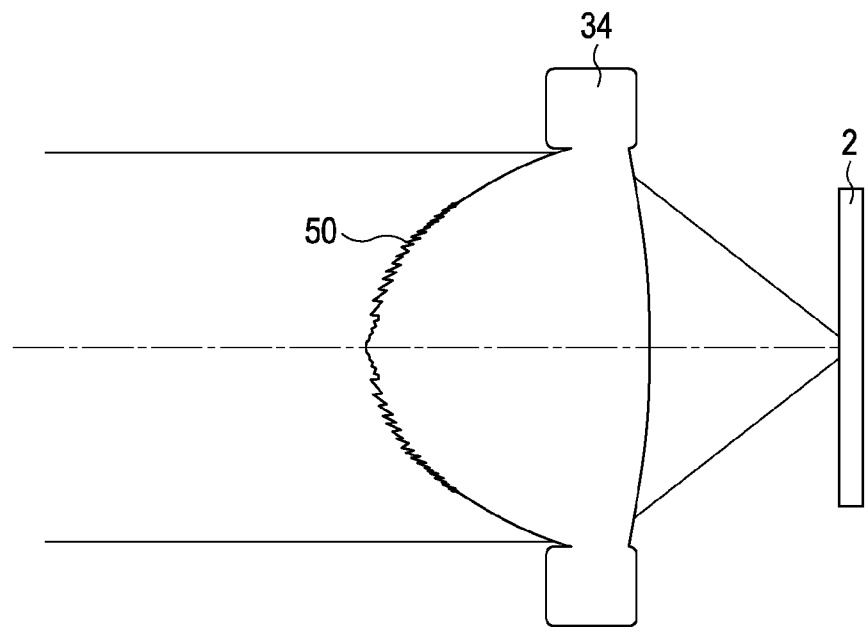
Figure 6B:
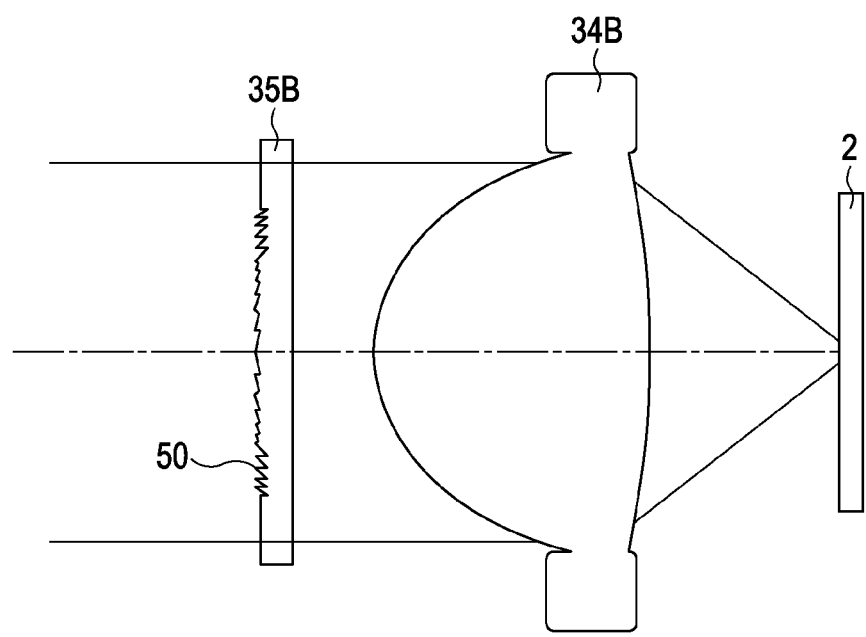

Referring to FIGS. 6A and 6B, an example of the diffraction section 50 used in the optical pickup 3 according to an embodiment of the present invention will be described.

In the section [3], as illustrated in FIG. 6A, the diffraction section 50 including the three regions 51, 52, and 53 is formed on the entry-side surface of the objective lens 34. However, the position of the diffraction section 50 is not limited thereto, and the diffraction section 50 may be formed on the exit-side surface of the objective lens 34. As a further alternative, the diffraction section 50 including the first to third regions 51, 52, and 53 may be formed on an entry-side surface or an exit-side surface of an optical element that is different from the objective lens. In this case, the refractive function of the third region 53 is provided to the objective lens side, and the diffractive function of the first and second regions 51 and 52 is provided to the optical element.

For example, as illustrated in FIG. 6B, the objective lens 34B, which has a curved surface the same as that of the objective lens 34 from which the diffraction section 50 is removed, and the diffractive optical element 35B including the diffraction section 50 that is formed on one surface thereof and disposed on the optical path that is common to the three wavelengths. The objective lens 34B and the diffractive optical element 35B may constitute a focusing optical device.

The objective lens 34 illustrated in FIG. 6A has a surface shape including a reference surface on the entry side, which has a refractive function as an objective lens, and a diffractive surface, which has a diffractive function, formed on the reference surface. On the other hand, when the diffractive optical element 35B illustrated in FIG. 6B is used, the objective lens 34B has a surface shape having a refractive function. In addition, a diffractive structure having a diffractive function is formed on one of the surfaces of the diffractive optical element 35B.

The objective lens 34B and the diffractive optical element 35B illustrated in FIG. 6B function as a focusing optical device in a similar manner as the objective lens 34. When used in the optical pickup 3, the objective lens 34B and the diffractive optical element 35B reduce aberration and the like and realize three-wavelength compatibility of the optical pickup. Moreover, by using the objective lens 34B and the diffractive optical element 35B, the number of components can be reduced, the structure of the optical pickup can be simplified, and reduction in size, high productivity, and cost reduction can be realized. Furthermore, a complex diffractive structure can be formed as compared with the case when the diffractive structure is integrally formed in the objective lens 34. On the other hand, in the case of FIG. 6A, a single element (the objective lens 34) functions as a focusing optical device that appropriately focuses each of the three light beams having different wavelengths on the signal recording surface of the corresponding optical disc so that spherical aberration is not generated. Therefore, by integrally forming the diffraction section 50 in the objective lens 34, the number of optical components and the size of the structure can be further reduced. Because the diffraction section 50 can be made only by forming a three-wavelength compatible diffractive structure for correcting aberration, which has been difficult to realize with existing techniques, on one surface of the objective lens 34, the diffractive structure can be integrally formed with the objective lens 34. Thus, a diffractive surface can be directly formed on the plastic lens. By making the objective lens 34 including the diffraction section 50 from a plastic material, high productivity and cost reduction can be realized. The modification described using FIG. 6B can also be made on the objective lens 34C having the diffraction section 70.

[7. Another Example of Diffraction Section Included in Optical Pickup According to Embodiment of the Present Invention (Modification of [4])]

Figure 7A:
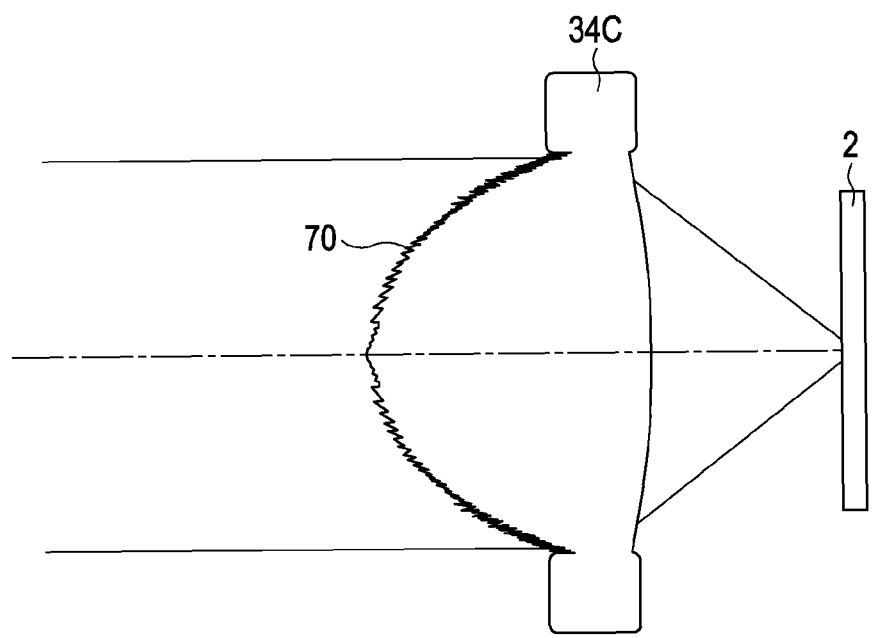
Figure 7B:
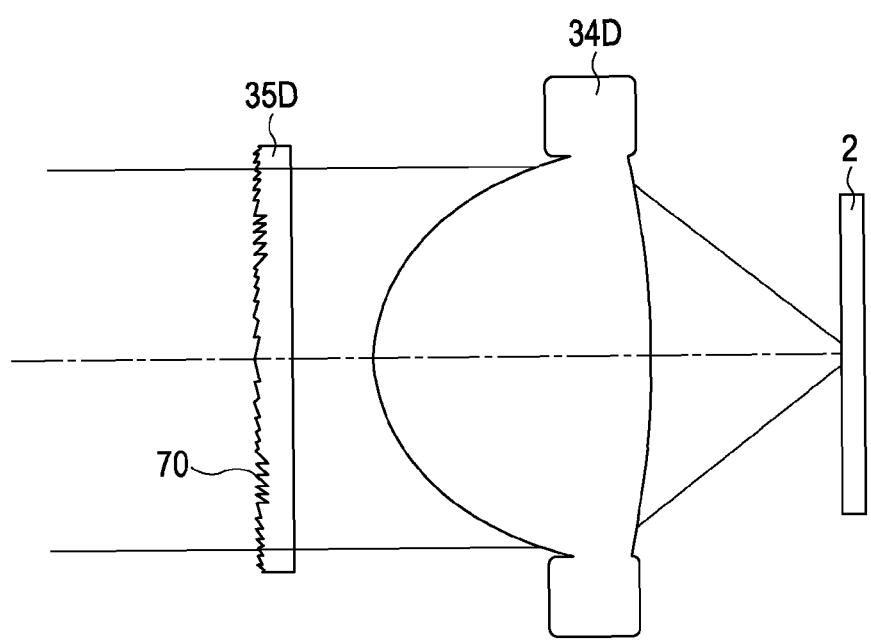

Referring to FIGS. 7A and 7B, the diffraction section 70 included in the optical pickup 3 according to an embodiment of the present invention will be described.

In the section [4] above, as illustrated in FIG. 7A, the diffraction section 70 includes the three regions 51, 52, and 73 formed on the entry-side surface of the objective lens 34C. However, the structure is not limited thereto, and the diffraction section 70 may be formed on the exit-side surface of the objective lens 34C. As a further alternative, the diffraction section 70 including the first to third regions 51, 52, and 73 may be formed on the entry-side or exit-side surface of an optical element that is different from the objective lens.

For example, as illustrated in FIG. 7B, an objective lens 34D, which has a curved surface the same as that of the objective lens 34C from which the diffraction section 70 is removed, and a diffractive optical element 35D including the diffraction section 70 that is formed on one surface thereof and disposed on the optical path that is common to the three wavelengths. The objective lens 34D and the diffractive optical element 35D may constitute a focusing optical device.

The objective lens 34C illustrated in FIG. 7A has a surface shape including a reference surface on the entry side, which has a refractive function as an objective lens, and a diffractive surface, which has a diffractive function, formed on the reference surface. On the other hand, when the diffractive optical element 35D illustrated in FIG. 7B is used, the objective lens 34D has a surface shape having a refractive function. In addition, one surface of the diffractive optical element 35D has a diffractive structure having a diffractive function.

The objective lens 34D and the diffractive optical element 35D illustrated in FIG. 7B function as a focusing optical device in a similar manner as the objective lens 34C. When used in the optical pickup 3, the objective lens 34D and the diffractive optical element 35D reduce aberration and the like and realize three-wavelength compatibility of the optical pickup. Moreover, by using the objective lens 34D and the diffractive optical element 35D, the number of components can be reduced, the structure of the optical pickup can be simplified, and reduction in size, high productivity, and cost reduction can be realized. Furthermore, a complex diffractive structure can be formed as compared with the case when the diffractive structure is integrally formed in the objective lens 34C. On the other hand, in the case of FIG. 7A, a single element (the objective lens 34C) functions as a focusing optical device that appropriately focuses each of the three light beams having different wavelengths on the signal recording surface of the corresponding optical disc so that spherical aberration is not generated. Therefore, by integrally forming the diffraction section 70 in the objective lens 34C, the number of optical components and the size of the structure can be further reduced. Because the diffraction section 70 can be made only by forming a three-wavelength compatible diffractive structure for correcting aberration, which has been difficult to realize with existing techniques, on one surface of the objective lens 34C, the diffractive structure can be integrally formed with the objective lens 34C. Thus, a diffractive surface can be directly formed on the plastic lens. By making the objective lens 34C including the diffraction section 70 from a plastic material, high productivity and cost reduction can be realized.

[8. Optical Pickup According to Embodiment of the Invention]

The optical pickup 3 according to an embodiment of the present invention including the diffraction section 50, which is formed on a surface of the objective lens 34 and the like and includes the first to third regions 51, 52, and 53, can provide an appropriate diffraction efficiency and an appropriate diffraction angle to each of the light beams having the first to third wavelengths passing through each region. The optical pickup 3 including the diffraction section 70, which is formed on a surface of the objective lens 34C and the like and includes the first to third regions 51, 52, and 73, can provide an appropriate diffraction efficiency and an appropriate diffraction angle to each of the light beams having the first to third wavelengths passing through each region. Therefore, the optical pickup 3 can sufficiently reduce spherical aberration generated on the signal recording surface of each of the first to third optical discs 11, 12, and 13 in different formats such as the thickness of the protective layer. Thus, the optical pickup 3 can record a signal to and reproduce a signal from the optical discs 11, 12, and 13 of different types using light beams having three different wavelengths.

Each of the objective lenses 34 and 34C, respectively having the diffraction sections 50 and 70 illustrated in FIGS. 6A and 7A and included in the optical pickup 3, can function as a focusing optical device for focusing an incident light beam at a predetermined position. Likewise, each of the pairs of objective lenses 34B and 34D and the diffractive optical elements 35B and 35D, respectively having the diffraction sections 50 and 70 illustrated in FIGS. 6B and 7B, can function as a focusing optical device. The focusing optical device, which includes the objective lens 34 or 34C and the diffractive optical element 35B or 35D having the diffraction section 50 or 70 formed on one surface thereof, is applicable to an optical pickup for recording an information signal to and/or reproducing information signal from each of the optical discs of three different types by irradiating the optical disc with a light beam. An optical pickup including the focusing optical device can appropriately focus a corresponding light beam on the signal recording surface of each of the three types of optical discs in a state in which spherical aberration is sufficiently reduced. That is, the focusing optical device realizes a three-wavelength compatible optical pickup that uses the objective lens 34, 34B, 34C, or 34D, which is common to the three wavelengths.

The objective lens 34B or 34D and the diffractive optical element 35B or 35D having the diffraction section 50 or 70 illustrated in FIG. 6B or 7B may be integrally attached to the actuator. The diffractive optical element and the objective lens may be integrally formed as a focusing optical unit in order to increase precision and facilitate assembling when attaching the diffractive optical element and the objective lens to the lens holder of the actuator. The focusing optical unit may be made, for example, by integrally attaching the diffractive optical element 35B and the objective lens 34B to the holder while adjusting the positions, the distance therebetween, and the optical axis using a spacer or the like. This structure, in which the diffractive optical element and the objective lens are integrally attached to the driving mechanism, can appropriately focus each of the light beams having the first to third wavelengths on the signal recording surface of the corresponding optical disc in a state in which spherical aberration is reduced even when, for example, the objective lens is moved in the tracking direction.

Referring to FIG. 2, the optical paths of the light beams emitted from the first to third light sources 31, 32, and 33 in the optical pickup 3 will be described. Although a case in which the objective lens 34 is used will be described here, the objective lens 34C may be used in a similar manner. First, the optical path in the case when recording and reproduction of information is performed by emitting the light beam having the first wavelength toward the first optical disc 11 will be described.

When the disc-type determining unit 22 determines that the optical disc 2 is the first optical disc 11, the disc-type determining unit 22 makes the first emitter of the first light source 31 emit the light beam having the first wavelength.

The light beam having the first wavelength, which has been emitted by the first emitter, is divided into three beams by the first grating 39 so that the tracking error signal and the like can be detected, and enters the second beam splitter 37. The light beam having the first wavelength, which has entered the second beam splitter 37, is reflected by a mirror surface 37a of the second beam splitter 37, and exits toward the third beam splitter 38.

The light beam having the first wavelength, which has entered the third beam splitter 38, passes through a mirror surface 38a of the third beam splitter 38, exits toward the collimator lens 42, has the divergence angle thereof changed by the collimator lens 42, and is made to be substantially collimated light. Next, the light beam having the first wavelength is provided with a predetermined phase difference by the quarter wavelength plate 43, is reflected by the raising mirror 44, and exits toward the objective lens 34.

When the light beam having the first wavelength enters the objective lens 34, the first and second regions 51 and 52 of the diffraction section 50, which are formed on the entry-side surface of the objective lens 34, diffract the light beam passing therethrough so that the predetermined order of diffraction becomes dominant. At the same time, the light beam is focused on the signal recording surface of the first optical disc 11 with the refractive power of the curved lens surface of the objective lens 34. At this time, the light beam having the first wavelength that has passed through the first to third regions 51, 52, and 53 is appropriately focused, because the light beam has been diffracted and refracted so as to be in a state in which spherical aberration can be reduced. The light beam having the first wavelength that exits the objective lens 34 has been not only diffracted in a predetermined manner, but also the aperture of the light beam has been limited.

The light beam, which has been focused on the first optical disc 11 and reflected by the signal recording surface of the first optical disc 11, passes through the objective lens 34, reflected by the raising mirror 44, passes through the quarter wavelength plate 43 and the collimator lens 42, is reflected by the mirror surface 38a of the third beam splitter 38, and exits toward the photodetection unit 45.

A light beam, which has been optically split from the light beam on the forward path by the third beam splitter 38, is focused on the light-receiving surface of the photodetection unit 45 by the multilens 46 and is detected by the photodetection unit 45.

Next, the optical path of the light beam having the second wavelength, which is emitted toward the second optical disc 12 so as to perform recording and reproduction of information, will be described.

When the disc-type determining unit 22 determines that the optical disc 2 is the second optical disc 12, the disc-type determining unit 22 makes the second emitter of the second light source 32 emit the light beam having the second wavelength.

The light beam having the second wavelength, which has been emitted by the second emitter, is divided into three beams by the second grating 40 so that the tracking error signal and the like can be detected, and enters the first beam splitter 36. The light beam having the second wavelength, which has entered the first beam splitter 36, passes through a mirror surface 36a of the first beam splitter 36 and the mirror surface 37a of the second beam splitter 37, and exits toward the third beam splitter 38.

The light beam having the second wavelength, which has entered the third beam splitter 38, passes through the mirror surface 38a of the third beam splitter 38, exits toward the collimator lens 42, has the divergence angle thereof changed by the collimator lens 42, and is made to be divergent light. Next, the light beam having the second wavelength is provided with a predetermined phase difference by the quarter wavelength plate 43, is reflected by the raising mirror 44, and exits toward the objective lens 34.

When the light beam having the second wavelength enters the objective lens 34, the first and second regions 51 and 52 of the diffraction section 50, which are formed on the entry-side surface of the objective lens 34, diffract the light beam passing therethrough so that the predetermined order of diffraction becomes dominant. At the same time, the light beam is focused on the signal recording surface of the second optical disc 12 with the refractive power of the curved lens surface of the objective lens 34. At this time, the light beam having the second wavelength that has passed through the first and second regions 51 and 52 is appropriately focused, because the light beam has been diffracted and refracted so as to be in a state in which spherical aberration can be reduced. The light beam having the second wavelength that has passed through the third region 53 is in a state in which the light beam is not focused on the signal recording surface of the second optical disc 12 due to the effect described above, i.e., a state in which the aperture of the light beam is appropriately limited.

Description of the return path of the light beam reflected by the signal recording surface of the second optical disc 12 is omitted, because this return path is the same as that of the light beam having the first wavelength described above.

Next, the optical path of the light beam having the third wavelength, which is emitted toward the third optical disc 13 so as to perform recording and reproduction of information, will be described.

When the disc-type determining unit 22 determines that the optical disc 2 is the third optical disc 13, the disc-type determining unit 22 makes the third emitter of the third light source 33 emit the light beam having the third wavelength.

The light beam having the third wavelength, which has been emitted by the third emitter, is divided into three beams by the third grating 41 so that the tracking error signal and the like can be detected, and enters the first beam splitter 36. The light beam having the third wavelength, which has entered the first beam splitter 36, is reflected by the mirror surface 36a of the first beam splitter 36, passes through the mirror surface 37a of the second beam splitter 37, and exits toward the third beam splitter 38.

The light beam having the third wavelength, which has entered the third beam splitter 38, passes through the mirror surface 38a of the third beam splitter 38, exits toward the collimator lens 42, has the divergence angle thereof changed by the collimator lens 42, and is made to be diverged light.

Next, the light beam having the third wavelength is provided with a predetermined phase difference by the quarter wavelength plate 43, is reflected by the raising mirror 44, and exits toward the objective lens 34.

When the light beam having the third wavelength enters the objective lens 34, the first region 51 of the diffraction section 50, which is formed on the entry-side surface of the objective lens 34, diffracts the light beam passing therethrough so that the predetermined order of diffraction becomes dominant. At the same time, the light beam is focused on the signal recording surface of the third optical disc 13 with the refractive power of the curved lens surface of the objective lens 34. At this time, the light beam having the third wavelength that has passed through the first region 51 is appropriately focused, because the light beam has been diffracted so as to be in a state in which spherical aberration can be reduced. Diffracted light beam generated when the light beam having the third wavelength passes through the second region 52 is in a state in which the diffracted light beam is not focused on the signal recording surface of the third optical disc 13 due to the effect of flaring described above, i.e., a state in which the aperture of the light beam is appropriately limited. The light beam having the third wavelength passing through the third region 53 is in a state in which the light beam is not focused on the signal recording surface of the third optical disc 13 due to the effect of the continuous aspheric surface described above, i.e., a state in which the aperture of the light beam is appropriately limited.

Description of the return path of the light beam reflected by the signal recording surface of the third optical disc 13 is omitted, because this return path is the same as that of the light beam having the first wavelength described above.

In the example describe here, the divergence angles of the light beams having the second and third wavelengths are changed by the collimator lens 42 so that the light beams are diverged relative to a substantially collimated state by adjusting the positions of the second and third emitters. However, the structure is not limited thereto. That is, the light beams having the second and third wavelengths may be made to enter the objective lens 34 in a divergent state or in a convergent state by providing an element that changes the divergence angle in accordance with the wavelength or by providing a driving unit for moving the collimator lens 42 along the optical axis.

In the example described here, the light beam having the first wavelength enters the objective lens 34 in a substantially collimated state, and the light beams having the second and third wavelengths enter the objective lens 34 in a divergent state. However, the structure is not limited thereto. For example, all of the light beams having the first to third wavelengths may enter the objective lens 34 in collimated states, or some or all of the light beams having the first to third wavelengths may enter the objective lens 34 in divergent or convergent states.

The optical pickup 3 according to an embodiment of the present invention includes first to third emitters for emitting the light beams having the first to third wavelengths, the objective lens 34, and the diffraction section 50 formed on a surface of the objective lens 34, the diffraction section 50 being an optical element disposed on the forward optical path. The diffraction section 50 or the like has the first to third regions 51, 52, 53, and 73, among which the first and second regions 51 and 52 are different diffraction grating each having an annular shape and a predetermined depth. The first and second regions 51 and 52 respectively have the first and second diffractive structures, which diffract the light beams having the first to third wavelengths so that diffracted light of the predetermined orders (k1$i$, k2$i$, k3$i$, k1$m$, k2$m$) become dominant. The third regions 53 and 73 have a predetermined refractive function, a diffractive function, and an aperture limiting function as described above. With such a characteristic structure, the optical pickup 3 can appropriately focus a corresponding light beam on the signal recording surface of each of the three types of optical discs using different wavelength. Thus, the optical pickup 3 realizes three-wavelength compatibility with a simple structure using the objective lens 34 and the like common to the three types of optical discs and realizes excellent recording of an information signal to and/or reproduction of an information signal from the optical disc.

That is, the optical pickup 3 according to an embodiment of the present invention can perform recording and reproduction of a signal using light beams having different wavelengths by obtaining an optimal diffraction efficiency and an optimal diffraction angle with the diffraction sections 50 and 70 disposed on the optical path of the light beams having the first to third wavelengths. That is, the optical pickup 3 realizes three-wavelength compatibility for the optical discs 11, 12, and 13 of different types, and increases commonality of optical components such as the objective lens 34. Therefore, the optical pickup 3 enables reduction in the number of components, simplification of the structure, and reduction in size, whereby high productivity and cost reduction are realized.

For the optical pickup 3 according to an embodiment of the present invention, the orders (k1$i$, k2$i$, k3$i$) for the first region 51, which is an inner annular zone, are (1, −2, −3), (1, −1, −2), (0, −1, −2), (0, −2, −3), (2, −1, −2). Therefore, the optical pickup 3 can reduce spherical aberration, optimize the working distance and the focal length, and increase productivity. That is, the optical pickup 3 can make each of the light beams having the first to third wavelengths form an appropriate spot on the signal recording surface of the corresponding optical disc by diffracting the light beam so that the diffracted light with which spherical aberration is appropriately reduced becomes dominant. With the optical pickup 3, increase in size can be prevented, the production process can be simplified, and the diffraction efficiencies for the selected orders of diffraction can be made sufficiently high. Thus, the optical pickup 3 realizes three-wavelength compatibility of the optical pickup including the objective lens 34 common to the three wavelengths and the three types of optical discs, so that information signals can be appropriately recorded on and/or reproduced from the optical discs.

With the optical pickup 3, because the first region 51 (inner annular zone) has a diffractive structure modified from that of equal step width type so as to make the phase flat as illustrated in FIG. 8A. Therefore, as described in the section [5], with the optical pickup 3, the diffractive structure formed in the first region 51 or the second region 52 suppresses generation of unwanted diffracted light due to variations in environmental conditions and thereby the servo is prevented from becoming unstable. The optical pickup 3 realizes excellent recording and reproduction characteristics irrespective of variations in the temperature and the wavelength.

That is, the optical pickup 3 according to an embodiment of the present invention includes the objective lens 34 and the first to third region 51 to 53. The light beam having the wavelength λ1 has an aperture diameter corresponding to the first to third regions, the light beam having the wavelength λ2 has an aperture diameter corresponding to the first and second regions, and the light beam having the wavelength λ3 has an aperture diameter corresponding to the first region. The first region 51 is a staircase-like diffractive structure having ($N_1$−1) steps and $N_1$ levels having unequal widths. When k1$im$−k1$is$>0, the relationship $|\phi_{i2}|<|\phi_i(x_2)|$ or $|\phi_{iN1}|>|\phi_i(x_{N1})|$ is satisfied. When k1$im$−k1$is$<0, the relationship $|\phi_{i2}|>|\phi_i(x_2)|$ or $|\phi_{iN1}|<|\phi_i(x_{N1})|$ is satisfied. The second region 52 is a staircase-like diffractive structure having ($N_2$−1) steps and $N_2$ levels having unequal widths. When k1$mm$−k1$ms$>0, the relationship $|\phi_{m2}|<|\phi_m(x_2)|$ or $|\phi_{mN2}|>|\phi_m(x_{N2})|$ is satisfied. When k1$mm$−k1$ms$<0, the relationship $|\phi_{m2}|>|\phi_m(x_2)|$ or $|\phi_{mN1}|<|\phi_m(x_{N2})|$ is satisfied. When the first region 51 satisfies (k1$i$, k2$i$, k3$i$)=(+1, −2, −3), the first region 51 is a staircase-like diffractive structure having six steps and seven levels having unequal widths. In this case, at least one of the relational expressions $|\phi2|>|\phi(x2)|$, $|\phi3|>|\phi(x3)|$, $|\phi6|<|\phi(x6)|$, and $|\phi7|<|\phi(x7)|$ may be satisfied. The first region 51 may satisfy one of the following four relational expressions. The first expression is a relational expression $n_{d1}|(1/P_{1m})-(1/P_{1s})|\geq27$ μm. The second expression is a relational expression $n_{d1}|(1/P_{1m})-(1/P_{1s})|\leq18$ μm. The third expression is a relational expression $n_{d2}|(1/P_{2m})-(1/P_{2s})|\geq61$ μm. The fourth expression is a relational expression $n_{d2}|(1/P_{2m})-(1/P_{2s})|\leq35$ μm. The optical pickup 3, which has one of the characteristics described above, realizes three-wavelength compatibility in that the optical pickup can appropriately focus a corresponding light beam on the signal recording surface by the objective lens 34 and the diffractive section 50 common to the three wavelengths. The optical pickup 3 is resistant to variations in environmental conditions, so that the optical pickup 3 prevents servo from becoming unstable when unwanted diffracted light generated by the diffraction section 50 increases due to variations in temperature and wavelength. Thus, recording and reproduction characteristics of the optical pickup 3 is prevented from deteriorating, whereby excellent recording and reproduction characteristics is realized.

The optical pickup 3 according to an embodiment of the present invention includes, as an outer annular zone of the diffraction section 50 or 70, the third region 53 having a so-called continuous aspheric surface or the third region 73 having the third diffractive structure. The optical pickup 3 realizes high efficiency of light utilization and three-wavelength compatibility, and limits the aperture in a predetermined manner. In the optical pickup 3, the outer annular zone may have a continuous spherical surface or a diffractive structure in accordance with the structure of the inner annular zone and the middle annular zone, so that the structure of the outer annular zone of the diffraction section is simplified and the production process of an element including the diffraction section is simplified.

The optical pickup 3 according to an embodiment of the present invention include the diffraction section 50 or 70 formed on a surface of an optical element, such as the objective lens 34 or 34C or the diffractive optical element 35B or 35D, disposed on the optical path between an emitter for emitting a light beam and the signal recording surface of an optical disc. Using the diffraction section 50 or 70, the optical pickup 3 can appropriately focus a corresponding light beam on the signal recording surface of each of the three types of optical discs using different wavelengths with a single objective lens. The optical pickup 3 realizes, with a simple structure, three-wavelength compatibility using a single objective lens, and excellent recording of a signal to and/or reproduction of a signal from each of the optical discs.

The optical pickup 3 according to an embodiment of the present invention can avoid the problem of decrease in sensitivity due to increase in the weight of moving parts, because the objective lens 34 or the like is common to the three wavelengths. The optical pickup 3 can avoid the problem in that the objective lens or the like may be attached to the actuator at an inappropriate mounting angle. The optical pickup 3 only includes the diffraction section 50 or 70 formed on one surface thereof. Therefore, in contrast to existing pickups in which diffractive sections for reducing spherical aberration are formed on a plurality of surfaces, the problem of relative positioning of the diffractive sections and the reduction in the diffraction efficiency caused by the presence of the plurality of diffractive sections. That is, the optical pickup 3 simplifies the production process and increases the utilization efficiency of light. The optical pickup 3 realizes the structure in which the diffraction section is formed on one surface of an optical element. By integrally forming the diffraction section with the objective lens, the structure is further simplified, the weight of the actuator is reduced, and the utilization efficiency of light is increased. Existing general optical pickups have a problem in that the adjustment method is complicated because the direction of coma is different in accordance with the format of the disc. When an actuator that can be tilted in the Rad direction is used, it is necessary that the residual coma after adjustment for the Rad direction be equal to or smaller than about 0.030 λrms. In existing pickups including two objective lenses, complicated adjustment has been performed so that this range is satisfied. In contrast, with the optical pickup 3 according to an embodiment of the present invention, the direction in which coma is generated can be substantially the same for the three formats because only one objective lens is used, whereby the aforementioned range is satisfied and adjustment can be easily performed. For the single objective lens according to an embodiment of the present invention, correlation exists between the magnitude of coma for the three formats. Therefore, by suppressing coma for the third and higher order for the wavelength corresponding to one format, the amount of coma for other wavelengths can be controlled, whereby aberration can be easily controlled.

As described above, in the optical pickup 3, the first to third emitters are disposed in the light sources 31, 32, and 33, respectively. However, the structure is not limited thereto. For example, a light source including two of the first to third emitters and a light source including the remaining one of the first to third light emitters may be disposed at different positions.

9. Optical Pickup According to Another Embodiment of the Invention

Next, an optical pickup 60 illustrated in FIG. 38, which is an optical pickup according to another embodiment of the present invention, will be described. The optical pickup 60 includes a light source including a first emitter and a light source including second and third emitters. In the following description, the elements the same as those of the optical pickup 3 are denoted by the same numerals and detailed description are omitted.

As illustrated in FIG. 38, the optical pickup 60 includes a first light source 61 including the first emitter for emitting the light beam having the first wavelength. The optical pickup 60 further includes a second light source 62 including a second emitter for emitting the light beam having the second wavelength and a third emitter for emitting the light beam having the third wavelength. The optical pickup 60 includes the objective lens 34, which functions as a focusing optical device for focusing the light beams emitted by the first to third emitters on the signal recording surface of the optical disc 2. It is assumed that the optical pickup 60 also includes the objective lens 34 having the diffraction section 50 as a focusing optical device. However, the structure of the optical pickup is not limited thereto. Instead of this structure, the focusing optical device may include the objective lens 34B and the diffractive optical element 35B illustrated in FIG. 6B. Alternatively, the focusing optical device may include the objective lens 34C having the diffraction section 70 illustrated in FIGS. 5A and 5B. As a further alternative, the focusing optical system may include the objective lens 34D and the diffractive optical element 35D illustrated in FIG. 7B. Whichever of these focusing optical devices is used in the optical pickup 60, the advantage described below is obtained and the operation effect of the objective lens and the diffraction section described above can be produced.

The optical pickup 60 includes a beam splitter 63, which is an optical path combining unit. The beam splitter 63 combines the optical path of the light beam having the first wavelength emitted from the first emitter of the first light source 61 and the optical paths of the light beams having the second and third wavelengths emitted from the second and third emitters of the second light source 62. The optical pickup 60 includes a beam splitter 64 having a function similar to that of the third beam splitter 38.

The optical pickup 60 includes the first grating 39 and a grating 65 that is disposed between the second light source 62 and the beam splitter 63. The grating 65 has a wavelength dependency so that the grating 65 diffracts the light beams having the second and third wavelengths emitted from the second and third emitters into three beams in order to detect a tracking error signal and the like.

The optical pickup 60 includes the collimator lens 42, the quarter wavelength plate 43, the raising mirror 44, the photodetection unit 45, the multilens 46, and a collimator lens driving unit 66 for driving the collimator lens 42 along the optical axis. The collimator lens driving unit 66 drives the collimator lens 42 along the optical axis so as to adjust the divergence angle of the light beam that has passed through the collimator lens 42 as described above. Thus, the collimator lens driving unit 66 makes each of the light beams enter the objective lens 34 in a desirable state, so that the spherical aberration is reduced and flaring described above can be performed. If the optical disc is a multilayer optical disc having a plurality of signal recording surfaces, the collimator lens driving unit 66 enables the optical pickup 60 to perform recording on and/or reproduction from any of the signal recording surfaces.

In the optical pickup 60 having such a structure, the function of the optical components are the same as those of the optical pickup 3 except for the aforementioned respects. In the optical pickup 60, the optical paths of the light beams having the first to third wavelengths, which are emitted from the first to third emitters, are the same as those in the optical pickup 3 except for the aforementioned respects. That is, the optical pickup 60 functions in the same manner as the optical pickup 3 after the optical paths of the light beams having the first to third wavelengths have been combined by the beam splitter 64. Therefore, detailed description will be omitted.

The optical pickup 60 includes first to third emitters for emitting light beams having the first to third wavelengths, the objective lens 34, which is an optical element disposed on the forward optical path, and the diffraction section 50 formed on one surface of the objective lens 34. The diffraction section 50 includes first to third regions 51, 52, 53, and 73, and the first and second regions 51 and 52 has different diffractive structures each having an annular-zone-like shape and a predetermined depth. The first region 51 is a staircase-like diffractive structure having ($N_1$−1) steps and $N_1$ levels having unequal widths. When k1$im$−k1$is$>0, the relationship $|\phi_{i2}|<|\phi_i(x_2)|$ or $|\phi_{iN1}|>|\phi_i(x_{N1})|$ is satisfied. When k1$im$−k1$is$<0, the relationship $|\phi_{i2}|>|\phi_i(x_2)|$ or $|\phi_{iN1}|<|\phi_i(x_{N1})|$ is satisfied. The second region 52 is a staircase-like diffractive structure having ($N_2$−1) steps and $N_2$ levels having unequal widths. When k1$mm$−k1$ms$>0, the relationship $|\phi_{m2}|<|\phi_m(x_2)|$ or $|\phi_{mN2}|>|\phi_m(x_{N2})|$ is satisfied. When k1$mm$−k1$ms$<0, the relationship $|\phi_{m2}|>|\phi_m(x_2)|$ or $|\phi_{mN1}|<|\phi_m(x_{N2})|$ is satisfied. When the first region 51 satisfies, for example, (k1$i$, k2$i$, k3$i$)=(+1, −2, −3), the first region 51 is a staircase-like diffractive structure having six steps and seven levels having unequal widths. In this case, at least one of the relational expressions $|\phi2|>|\phi(x2)|$, $|\phi3|>|\phi(x3)|$, $|\phi6|<|\phi(x6)|$, and $|\phi7|<|\phi(x7)|$ may be satisfied. The first region 51 may satisfy one of the following first to fourth relational expressions. The first expression is a relational expression $n_{d1}|(1/P_{1m})−(1/P_{1s})|\geq 27$ μm. The second expression is a relational expression $n_{d1}|(1/P_{1m})−(1/P_{1s})|\geq 18$ μm. The third expression is a relational expression $n_{d2}|(1/P_{2m})−(1/P_{2s})|\geq 61$ μm. The fourth expression is a relational expression $n_{d2}|(1/P_{2m})−(1/P_{2s})|\geq 35$ μm. The optical pickup 60, which has one of the characteristics described above, realizes three-wavelength compatibility in that the optical pickup can appropriately focus a corresponding light beam on the signal recording surface of each of the three different types of optical discs using different wavelengths with the single objective lens. Thus, the optical pickup 60 realizes three-wavelength compatibility with a simple structure using the objective lens 34 and the like common to the three types of optical discs and realizes excellent recording of an information signal to and/or reproduction of an information signal from the optical disc. The optical pickup 60 realizes three-wavelength compatibility in that the objective lens 34 can appropriately focus a corresponding light beam on the signal recording surface with the single objective lens. The optical pickup 60 is resistant to variations in environmental conditions, so that the optical pickup 60 prevents servo from becoming unstable when unwanted diffracted light generated by the diffraction section 50 increases due to variations in temperature and wavelength. Thus, recording and reproduction characteristics of the optical pickup 60 is prevented from deteriorating, whereby excellent recording and reproduction characteristics can be realized. The optical pickup 60 also has the advantage the same as that of the optical pickup 3 described above.

In the optical pickup 60, the second and third emitters are disposed in the single light source 62, so that the structure is further simplified and the size is further reduced. In the optical pickup according to an embodiment of the present invention, the first to third emitters may be disposed at substantially the same position in a light source. In such a case, the structure of the optical pickup is further simplified and the size is further reduced.

The optical disc apparatus 1 according to an embodiment of the present invention includes a driving mechanism for holding and rotating an optical disc arbitrarily selected from the first to third optical discs, and an optical pickup for recording an information signal to and/or reproducing an information signal from the optical disc rotated by the driving mechanism. The optical disc apparatus 1 includes the optical pickup 3 or 60 that records an information signal to and/or reproduces an information signal from the optical disc by selectively emitting a plurality of light beams having different wavelengths toward the optical disc that is being rotated. The optical disc apparatus 1, which includes the diffraction section formed on a surface of the optical element disposed on the optical path of each of the light beams having the first to third wavelengths, can appropriately focus a corresponding light beam on the signal recording surface of each of the three types of optical discs using different wavelengths with a single objective lens. Therefore, the optical disc apparatus 1 realizes, with a simple structure, three-wavelength compatibility using a single objective lens and excellent recording and reproducing characteristics irrespective of variations in temperature and variation in wavelength. Thus, the optical disc apparatus 1 realizes a simplified structure, reduction in size, and excellent recording and reproduction characteristics.

The present application contains subject matter related to that disclosed in Japanese Priority Patent Applications JP 2009-145725 filed in the Japan Patent Office on Jun. 18, 2009, JP 2009-194748 filed in the Japan Patent Office on Aug. 25, 2009, JP 2009-279557 filed in the Japan Patent Office on Dec. 9, 2009, and JP 2009-290431 filed in the Japan Patent Office on Dec. 22, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An objective lens for selectively focusing each of a plurality of light beams having one of three wavelengths λ1, λ2, and λ3 on a signal recording surface of a corresponding optical disc, the wavelengths λ1, λ2, and λ3 satisfying at least a relationship λ1<λ2<λ3, the objective lens comprising:
   a diffraction section disposed on an entry-side surface of the objective lens, the diffraction section including:
      a predetermined diffractive structure;
      a first region to diffract a light beam, wherein the first region is disposed in an innermost radius portion and includes a diffractive structure that is a staircase-like structure having ($N_1$−1) steps and $N_1$ levels;
      a second region to diffract a light beam, wherein the second region is disposed outside the first region; and
      a third region disposed outside the second region,
   wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of a light beam having the wavelength λ3 is limited to a diameter corresponding to the first region, and
   wherein the objective lens satisfies $|\phi_{i2}|<|\phi_i(x_2)|$ or $|\phi_i(x_{N1})|$ when k1$im$−k1$is$>0, satisfies $|\phi_{i2}|<|\phi_i(x_2)|$ or $|\phi_i(x_{N1})|$ when k1$im$−k1$is$<0, and satisfies one of relational expressions $n_{d1}|(1/P_{1m})-(1/P_{1s})|\geq 27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|\leq 35$ μm,
   where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelengths λ1 and λ2,
   where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each of the plurality of periods excluding a second level and an $N_1$-th level, and
   where $\phi_{i2}$ and $\phi_{iN1}$, respectively, are the optical-path-difference phase amounts for the starting point positions of the second level and the $N_1$-th level, and $\phi(x_2)$ and $\phi_i(x_{N1})$, respectively, are calculated using the approximated relational expression for a radial position $x_2$ of the starting point of the second level and a radial position $x_{N1}$ of the starting point of the $N_1$-th level.

2. An objective lens for selectively focusing each of a plurality of light beams having one of three wavelengths λ1, λ2, and λ3 on a signal recording surface of a corresponding optical disc, the wavelengths λ1, λ2, and λ3 satisfying at least a relationship λ1<λ2<λ3, the objective lens comprising:
   a diffraction section disposed on an entry-side surface of the objective lens, the diffraction section including:
      a predetermined diffractive structure;
      a first region to diffract a light beam, wherein the first region is disposed in an innermost radius portion and includes a diffractive structure that is a staircase-like structure having ($N_1$−1) steps and $N_1$ levels;
      a second region to diffract a light beam, wherein the second region is disposed outside the first region; and
      a third region disposed outside the second region,
   wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of the light beam having the wavelength λ3 is limited to a diameter corresponding to the first region, and
   wherein the objective lens satisfies $|\phi_{i2}|<|\phi_i(x_2)|$ or $|\phi_{iN1}|>|\phi_i(x_{N1})|$ when k1$im$−k1$is$>0 and satisfies $|\phi_{i2}|>|\phi_i(x_2)|$ or $|\phi_{iN1}|<\phi_i(x_{N1})|$ when k1$im$−k1$is$<0,
   where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, and k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$,
   where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each of the plurality of periods excluding a second level and an $N_1$-th level, and
   where $\phi_{i2}$ and $\phi_{iN1}$ respectively are the optical-path-difference phase amounts for the starting point positions of the second level and the $N_1$-th level, and $\phi_i(x_2)$ and $\phi_i(x_{N1})$, respectively, are calculated using the approximated relational expression for a radial position $x_2$ of the starting point of the second level and a radial position $x_{N1}$ of the starting point of the $N_1$-th level.

3. The objective lens according to claim 2,
wherein the second region includes a diffractive structure that is a staircase-like structure having ($N_2-1$) steps and $N_2$ levels, and
wherein the objective lens satisfies $|\phi_{m2}|<|\phi_m(x_2)|$ or $|\phi_{mN2}|I>|\phi_m(x_{N2})|$ when k1$mm$−k1$ms$>0 and satisfies $|\phi_{m2}|>|\phi_m(x_2)|$ or $\phi_{mN1}|<|\phi_m(x_{N2})|$ when k1$mm$−k1$ms$<0, where, assuming that a positive diffraction order means that an incident light beam is diffracted toward the optical axis, k1$mm$, k2$mm$, and k3$mm$ respectively are orders having highest diffraction efficiencies for the first region for the wavelengths λ1, λ2, and λ3, k1$ms$, k2$ms$, and k3$ms$ are respectively orders of unwanted diffracted light adjacent to the orders k1$mm$, k2$mm$, and k3$mm$ and having a higher diffraction efficiency between orders adjacent to the orders k1$mm$, k2$mm$, and k3$mm$,
where $\phi_m(X)=C_1X^2+C_2X^4+C_3X^6+C_4X^8+C_5X^{10}$ is an approximated relational expression representing an optical-path-difference phase amount for a radial position X, the approximated relational expression being calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each of the plurality of periods excluding a second level and an $N_2$-th level, and
where $\phi_{m2}$ and $\phi_{mN2}$, respectively, are the optical-path-difference phase amounts for the starting point positions of the second level and the $N_2$-th level, and $\phi_m(x_2)$ and $\phi_m(x_{N2})$, respectively, are calculated using the approximated relational expression for a radial position $x_2$ of the starting point of the second level and a radial position $x_{N2}$ of the starting point of the $N_2$-th level.

4. An objective lens for selectively focusing each of a plurality of light beams having one of three wavelengths λ1, λ2, and λ3 on a signal recording surface of a corresponding optical disc, the wavelengths λ1, λ2, and λ3 satisfying at least a relationship λ1<λ2<λ3, the objective lens comprising:
a diffraction section disposed on an entry-side surface of the objective lens, the diffraction section including:
a predetermined diffractive structure;
a first region for diffracting to diffract a light beam, wherein the first region is disposed in an innermost radius portion;
a second region to diffract a light beam, wherein the second region is disposed outside the first region; and
a third region disposed outside the second region,
wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of the light beam having the wavelength λ3 is limited to a diameter corresponding to the first region, and
wherein the objective lens satisfies one of relational expressions $n_{d1}|(1/P_{1m})-(1/P_{1s})|27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|\leq 35$ μm,
where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelengths λ1 and λ2.

5. The objective lens according to claim 4,
wherein the objective lens satisfies at least one of the relational expressions $n_{d1}|(1/P_{1m})-(1/P_{1s})|27$ μm and $n_{d2}|(1/P_{2m})(1/P_{2s})|\geq 61$ μm.

6. The objective lens according to claim 4,
wherein the objective lens satisfies both of the relational expressions $n_{d1}|(1/P_{1m})-(1/P_{1s})|\geq 27$ μm and $n_{d2}|(1/P_{2m})-(1/P_{2s})|61$ μm.

7. An optical pickup comprising:
an objective lens that a plurality of light beams enter, each light beam in the plurality of light beams having one of three wavelengths satisfying at least a relationship λ1<λ2<λ3; and
a diffraction section disposed on a surface of an optical element disposed on optical paths of the light beams having one of the three wavelengths λ1, λ2, and λ3 or on a surface of the objective lens, the diffraction section selectively focusing each of the light beams having one of the three wavelengths λ1, λ2, and λ3 on a signal recording surface of a corresponding optical disc using the objective lens, the diffraction section including:
a first region to diffract a light beam, wherein the first region is disposed in an innermost radius portion and includes a diffractive structure that is a staircase-like structure having ($N_1-1$) steps and $N_1$ levels,
a second region to diffract a light beam, wherein the second region is disposed outside the first region; and
a third region disposed outside the second region,
wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of a light beam having the wavelength λ3 is limited to a diameter corresponding to the first region, and
wherein the optical pickup satisfies $|\phi_{i2}|<|\phi_i(x_2)|$ or $|\phi_{iN1}|>|\phi_i(x_{N1})|$ when k1$im$−k1$is$>0, satisfies $|\phi_{i2}|>|\phi(x_2)|$ or $|\phi_{iN1}|<|\phi(x_{N1})|$ when k1$im$−k1$is$<0, and satisfies one of relational expressions $n_{d1}|(1/P_{1m})-(1/P_{1s})|\geq 27$ μm, $n_{d1}|(1/P_{1m})-(1/P_{1s})|\leq 18$ μm, $n_{d2}|(1/P_{2m})-(1/P_{2s})|\geq 61$ μm, and $n_{d2}|(1/P_{2m})-(1/P_{2s})|\leq 35$ μm,
where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelengths λ1 and λ2, where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each of the plurality of periods excluding a second level and an $N_1$-th level, and where $\phi_{i2}$ and $\phi_{iN1}$ respectively, are the optical-path-difference phase amounts for the starting point positions of the second level and the $N_1$-th level, and $\phi_i(x_2)$ and $\phi_i(x_{N1})$, respectively, are calculated using the approximated relational expression for a radial position $x_2$ of the starting point of the second level and a radial position $x_{N1}$ of the starting point of the $N_1$-th level.

8. An optical pickup comprising:
an objective lens that a plurality of light beams enter, each of the plurality of light beams having one of three wavelengths satisfying at least a relationship λ1<λ2<λ3; and
a diffraction section disposed on a surface of an optical element disposed on optical paths of the light beams having one of the three wavelengths λ1, λ2, and λ3 or on a surface of the objective lens, the diffraction section selectively focusing each of the light beams having one of the three wavelengths λ1, λ2, and λ3 on a signal recording surface of a corresponding optical disc using the objective lens, the diffraction section including:
a first region for diffracting a light beam, wherein the first region being disposed in an innermost radius portion and includes a diffractive structure that is a staircase-like structure having $(N_1-1)$ steps and $N_1$ levels;
a second region for diffracting a light beam, wherein the second region is disposed outside the first region; and
a third region disposed outside the second region,
wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of a light beam having the wavelength λ3 is limited to a diameter corresponding to the first region, and
wherein the optical pickup satisfies $|\phi_{i2}|<|\phi_i(x_2)|$ or $|\phi_{iN1}|>|\phi_i(x_{N1})|$ when k1$im$−k1$is$>0 and satisfies $|\phi_{i2}|>|\phi_i(x_2)|$ or $|\phi_{iN1}|<|\phi_i(x_{N1})|$ when k1$im$−k1$is$<0,
where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, and k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength λ1 owing to the diffractive structure in the first region and by connecting estimated phase amounts for starting point positions of levels in each of the plurality of periods excluding a second level and an $N_1$-th level, and where $\phi_{i2}$ and $\phi_{iN1}$, respectively, are the optical-path-difference phase amounts for the starting point positions of the second level and the $N_1$-th level, and $\phi_i(x_2)$ and $(X_{N1})$, respectively, are calculated using the approximated relational expression for a radial position $x_2$ of the starting point of the second level and a radial position $x_{N1}$ of the starting point of the $N_1$-th level.

9. An optical pickup comprising:
an objective lens that a plurality of light beams enter, each of the plurality of the light beams having one of three wavelengths satisfying at least a relationship λ1<λ2<λ3; and
a diffraction section disposed on a surface of an optical element disposed on optical paths of the light beams having one of the three wavelengths λ1, λ2, and λ3 or on a surface of the objective lens, the diffraction section selectively focusing each of the light beams having the one of three wavelengths λ1, λ2, and λ3 on a signal recording surface of a corresponding optical disc using the objective lens, the diffraction section including:
a first region for diffracting a light beam, wherein the first region is disposed in an innermost radius portion;
a second region for diffracting a light beam, wherein the second region is disposed outside the first region; and
a third region disposed outside the second region,
wherein the first, second and third regions are formed so that an aperture of a light beam having the wavelength λ1 is limited to a diameter corresponding to the first, second and third regions, an aperture of a light beam having the wavelength λ2 is limited to a diameter corresponding to the first and second regions, and an aperture of a light beam having the wavelength λ3 is limited to a diameter corresponding to the first region, and
wherein the optical pickup satisfies one of relational expressions $n_{d1}|(P/P_{1m})-(1/P_{1s})|\geq 27$ μm, $n_{d1}|(1/P_{1m})-(1/P_{1s})|<18$ μm, $n_{d2}|(1/P_{2m})-(1/P_{2s})|\geq 61$ μm, and $n_{d2}|(1/P_{2m})-(1/P_{2s})|\rightarrow 35$ μm,
where, assuming that a positive diffraction order means that an incident light beam is diffracted toward an optical axis, k1$im$, k2$im$, and k3$im$ respectively are orders having highest diffraction efficiencies for the first region for the wavelengths λ1, λ2, and λ3, k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelengths λ1 and λ2.

10. An optical disc apparatus comprising:
an optical pickup for recording an information signal to and/or reproducing an information signal from an optical disc of one of a plurality of types, the optical disc being rotated, by selectively irradiating the optical disc with a corresponding one of a plurality of light beams having different wavelengths, the optical pickup including:

an objective lens that the plurality of light beams enters, each of the plurality of light beams having one of three wavelengths satisfying at least a relationship $\lambda 1 < \lambda 2 < \lambda 3$; and a diffraction section disposed on a surface of an optical element disposed on optical paths of the light beams having one of the three wavelengths $\lambda 1$, $\lambda 2$, and $\lambda 3$ or on a surface of the objective lens, the diffraction section selectively focusing each of the light beams having one of the three wavelengths $\lambda 1$, $\lambda 2$, and $\lambda 3$ on a signal recording surface of a corresponding optical disc using the objective lens, the diffraction section including:

a first region for diffracting a light beam, wherein the first region is disposed in an innermost radius portion and includes a diffractive structure that is a staircase-like structure having $(N_1-1)$ steps and $N_1$ levels;

a second region for diffracting a light beam, wherein the second region is disposed outside the first region; and a third region disposed outside the second region, wherein the first, second and third regions are formed so that an aperture of a light beam having the wavelength $\lambda 1$ is limited to a diameter corresponding to the first, second and third regions, an aperture of a light beam having the wavelength $\lambda 2$ is limited to a diameter corresponding to the first and second regions, and an aperture of a light beam having the wavelength $\lambda 3$ is limited to a diameter corresponding to the first region, and wherein the optical pickup satisfies $|\phi_{i2}|<|\phi_i(x_2)|$ or $|\phi_{iN1}|>|\phi_i(x_{N1})|$ when $k1im-k1is>0$, satisfies $|\phi_{i2}|>|\phi_i(x_2)|$ or $|\phi_{iN1}|<|\phi_i(x_{N1})|$ when $k1im-k1is<0$, and satisfies one of relational expressions $n_{d1}|(1/P_{1m})-(1/P_{1s})| \geqq 27$ µm, $n_{d1}|(1/P_{1m})-(1/P_{1s})| \leqq 18$ µm, $n_{d2}|(1/P_{2m})-(1/P_{2s})| \geqq 61$ µm, and $n_{d2}|(1/P_{2m})-(1/P_{2s})| \leqq 35$ µm, where, assuming that a positive diffraction order means that an incident light beam is diffracted toward an optical axis, $k1im$, $k2im$, and $k3im$ respectively are orders having highest diffraction efficiencies for the first region for the wavelengths $\lambda 1$, $\lambda 2$, and $\lambda 3$, $k1is$, $k2is$, and $k3is$ are respectively orders of unwanted diffracted light adjacent to the orders $k1im$, $k2im$, and $k3im$ and having a higher diffraction efficiency between orders adjacent to the orders $k1im$, $k2im$, and $k3im$, $P_{1m}$, $P_{2m}$, $P_{1s}$, and $P_{2s}$ respectively are total lens powers applied to light beams of the orders $k1im$, $k2im$, $k1is$, and $k2is$ with a diffractive power of the diffraction section and refractive powers of the entry-side surface and an exit-side surface of the objective lens, and $n_{d1}$ and $n_{d2}$ respectively are refractive indices of an optical disc for the wavelengths $\lambda 1$ and $\lambda 2$, where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength $\lambda 1$ owing to the diffractive structure in the first region and by connecting estimated phase amounts for starting point positions of levels in each period excluding a second level and an $N_1$-th level, and where $\phi_{i2}$ and $\phi_{iN1}$, respectively, are the optical-path-difference phase amounts for the starting point positions of the second level and the $N_1$-th level, and $\phi_i(x_2)$ and $\phi_i(x_{N1})$, respectively, are calculated using the approximated relational expression for a radial position $x_2$ of the starting point of the second level and a radial position $x_{N1}$ of the starting point of the $N_1$-th level.

11. An optical disc apparatus comprising:

an optical pickup for recording an information signal to and/or reproducing an information signal from an optical disc of one of a plurality of types, the optical disc being rotated, by selectively irradiating the optical disc with a corresponding one of a plurality of light beams having different wavelengths, the optical pickup including:

an objective lens that the plurality of light beams enters, each of the plurality of light beams having one of three wavelengths satisfying at least a relationship $\lambda 1 < \lambda 2 < \lambda 3$; and a diffraction section disposed on a surface of an optical element disposed on optical paths of the light beams having one of the three wavelengths $\lambda 1$, $\lambda 2$, and $\lambda 3$ or on a surface of the objective lens, the diffraction section selectively focusing each of the light beams having one of the three wavelengths $\lambda 1$, $\lambda 2$, and $\lambda 3$ on a signal recording surface of a corresponding optical disc using the objective lens, the diffraction section including:

a first region for diffracting a light beam, wherein the first region is disposed in an innermost radius portion and includes a diffractive structure that is a staircase-like structure having $(N_1-1)$ steps and $N_1$ levels;

a second region for diffracting a light beam, wherein the second region is disposed outside the first region; and a third region disposed outside the second region, wherein the first, second and third regions are formed so that an aperture of a light beam having the wavelength $\lambda 1$ is limited to a diameter corresponding to the first, second and third regions, an aperture of a light beam having the wavelength $\lambda 2$ is limited to a diameter corresponding to the first and second regions, and an aperture of a light beam having the wavelength $\lambda 3$ is limited to a diameter corresponding to the first region, and wherein the optical pickup satisfies $|\phi_{i2}|<|\phi_i(x_2)|$ or $|\phi_{iN1}|>|\phi_i(x_{N1})|$ when $k1im-k1is>0$ and satisfies $|\phi_{i2}|>|\phi_i(x_2)|$ or $|\phi_{iN1}|<|\phi_i(x_{N1})|$ when $k1im-k1is<0$, where, assuming that a positive diffraction order means that an incident light beam is diffracted toward an optical axis, $k1im$, $k2im$, and $k3im$ respectively are orders having highest diffraction efficiencies for the first region for the wavelengths $\lambda 1$, $\lambda 2$, and $\lambda 3$, and $k1is$, $k2is$, and $k3is$ are respectively orders of unwanted diffracted light adjacent to the orders $k1im$, $k2im$, and $k3im$ and having a higher diffraction efficiency between orders adjacent to the orders $k1im$, $k2im$, and $k3im$, where $\phi_i(X)=C_1X^2+C_2X^4+C_3X^6+C_4X^8+C_5X^{10}$ is an approximated relational expression representing an optical-path-difference phase amount for a radial position X, wherein the approximated relational expression is calculated by adding back an integer multiple of a phase for each of a plurality of periods of the staircase-like structure to an optical-path-difference phase amount for the wavelength $\lambda 1$ owing to the diffractive structure in the first region and by connecting estimated phase amounts for starting point positions of levels in each period excluding a second level and an $N_1$-th level, and where $\phi_{i2}$ and $\phi_{iN1}$, respectively, are the optical-path-difference phase amounts for the starting point positions of the second level and the $N_1$-th level, and $\phi_i(x_2)$ and $\phi_i(x_{N_1})$, respectively, are calculated using the approximated relational expression for a radial position $x_2$ of the starting point of the second level and a radial position $x_{N_1}$ of the starting point of the $N_1$-th level.

12. An optical disc apparatus comprising:
an optical pickup for recording an information signal to and/or reproducing an information signal from an optical disc of one of a plurality of types, the optical disc being rotated, by selectively irradiating the optical disc with a corresponding one of a plurality of light beams having different wavelengths, the optical pickup including:
  an objective lens that the plurality of light beams enters, each of the plurality of light beams having one of three wavelengths satisfying at least a relationship $\lambda 1 < \lambda 2 < \lambda 3$; and
  a diffraction section disposed on a surface of an optical element disposed on optical paths of the light beams having one of the three wavelengths $\lambda 1$, $\lambda 2$, and $\lambda 3$ or on a surface of the objective lens, the diffraction section selectively focusing each of the light beams having one of the three wavelengths $\lambda 1$, $\lambda 2$, and $\lambda 3$ on a signal recording surface of a corresponding optical disc using the objective lens, the diffraction section including:
    a first region for diffracting a light beam, wherein the first region is disposed in an innermost radius portion;
    a second region for diffracting a light beam, wherein the second region is disposed outside the first region; and
    a third region disposed outside the second region,
  wherein the first, second and third regions are formed so that an aperture of a light beam having the wavelength $\lambda 1$ is limited to a diameter corresponding to the first, second and third regions, an aperture of a light beam having the wavelength $\lambda 2$ is limited to a diameter corresponding to the first and second regions, and an aperture of a light beam having the wavelength $\lambda 3$ is limited to a diameter corresponding to the first region,
  wherein the optical pickup satisfies one of relational expressions $n_{d1}|(1/P_{1m})-(1/P_{1s})| \geqq 27$ μm, $n_{d1}|(1/P_{1m})-(1/P_{1s})| \leqq 18$ μm, $n_{d2}|(1/P_{2m})-(1/P_{2s})| \geqq 61$ μm, and $n_{d2}|(1/P_{2m})-(1/P_{2s})| \leqq 35$ μm,
  where, assuming that a positive diffraction order means that an incident light beam is diffracted toward an optical axis, k1$im$, k2$im$, and k3$im$ respectively are orders having highest diffraction efficiencies for the first region for the wavelengths $\lambda 1$, $\lambda 2$, and $\lambda 3$, k1$is$, k2$is$, and k3$is$ are respectively orders of unwanted diffracted light adjacent to the orders k1$im$, k2$im$, and k3$im$ and having a higher diffraction efficiency between orders adjacent to the orders k1$im$, k2$im$, and k3$im$, $P_{1m}$, $P_{2m}$, $P_{1s}$, and $P_{2s}$ respectively are total lens powers applied to light beams of the orders k1$im$, k2$im$, k1$is$, and k2$is$ with a diffractive power of the diffraction section and refractive powers of the entry-side surface and an exit-side surface of the objective lens, and $n_{d1}$ and $n_{d2}$ respectively are refractive indices of an optical disc for the wavelengths $\lambda 1$ and $\lambda 2$.

\* \* \* \* \*